July 27, 1943.   A. H. WILLIAMS   2,325,455
ENVELOPE HANDLING MACHINE
Filed Oct. 2, 1940   20 Sheets-Sheet 1

Inventor
A. H. Williams
By Mason Fenwick & Lawrence
Attorneys

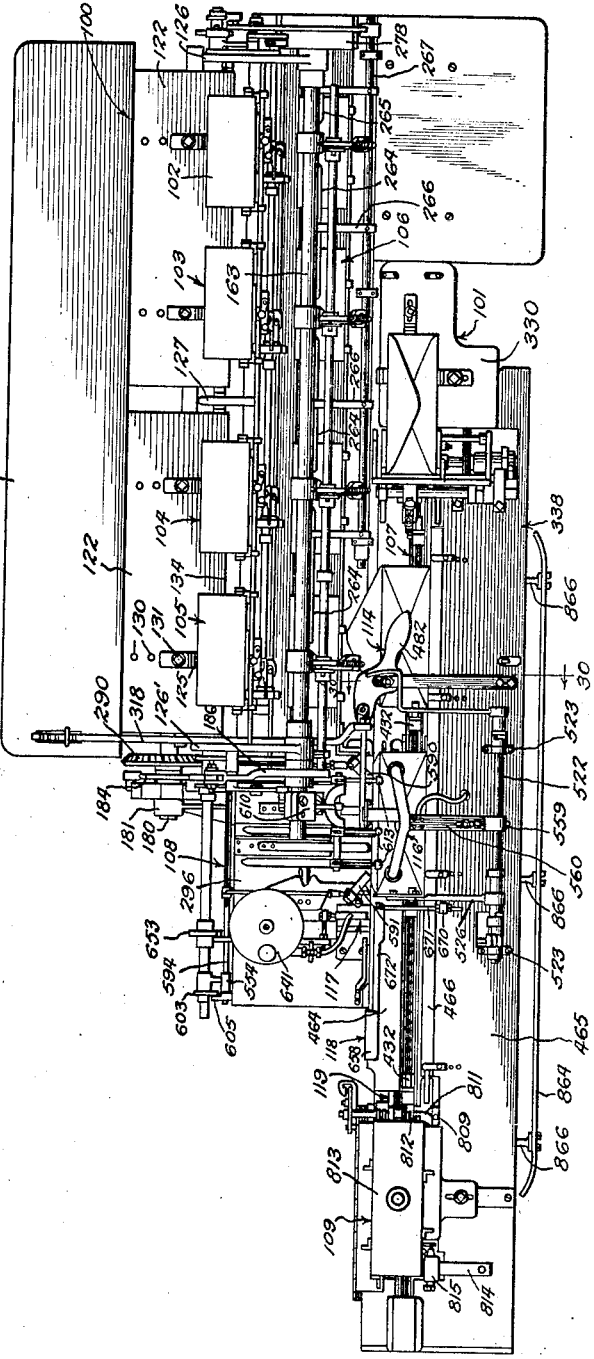

July 27, 1943.  A. H. WILLIAMS  2,325,455
ENVELOPE HANDLING MACHINE
Filed Oct. 2, 1940  20 Sheets-Sheet 3
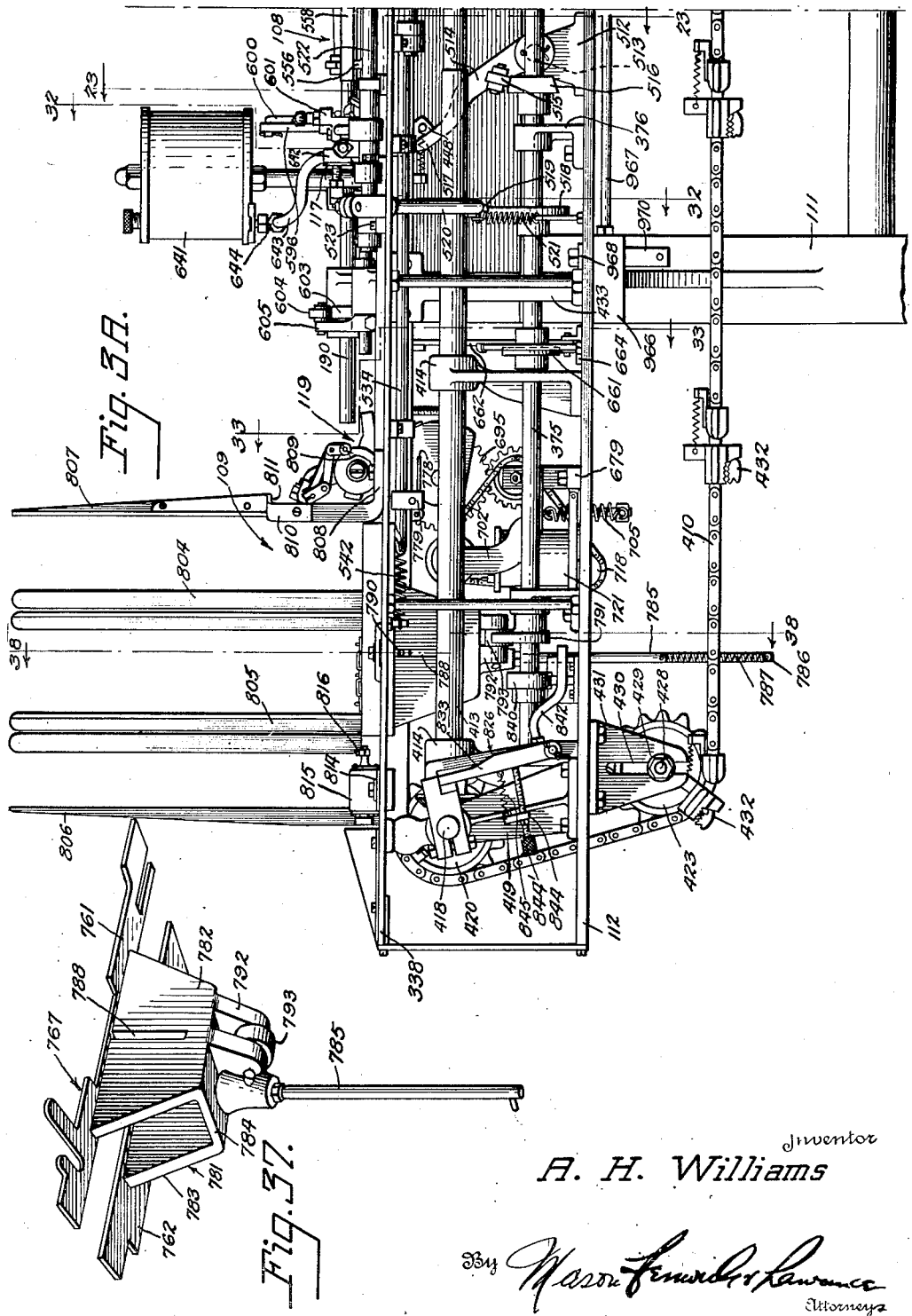

July 27, 1943.    A. H. WILLIAMS    2,325,455
ENVELOPE HANDLING MACHINE
Filed Oct. 2, 1940    20 Sheets-Sheet 4

Inventor
A. H. Williams
By Mason, Fenwick & Lawrence
Attorneys

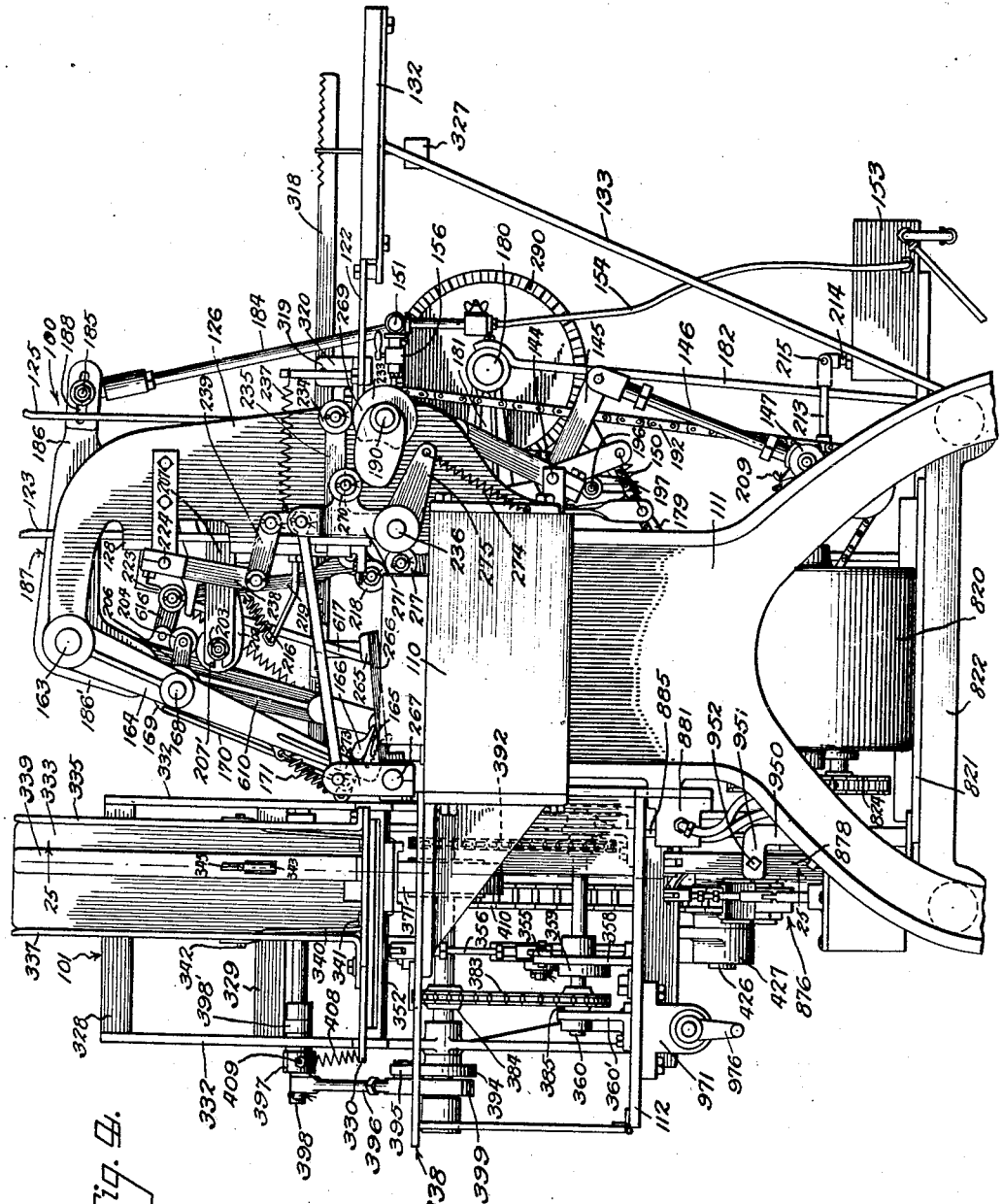

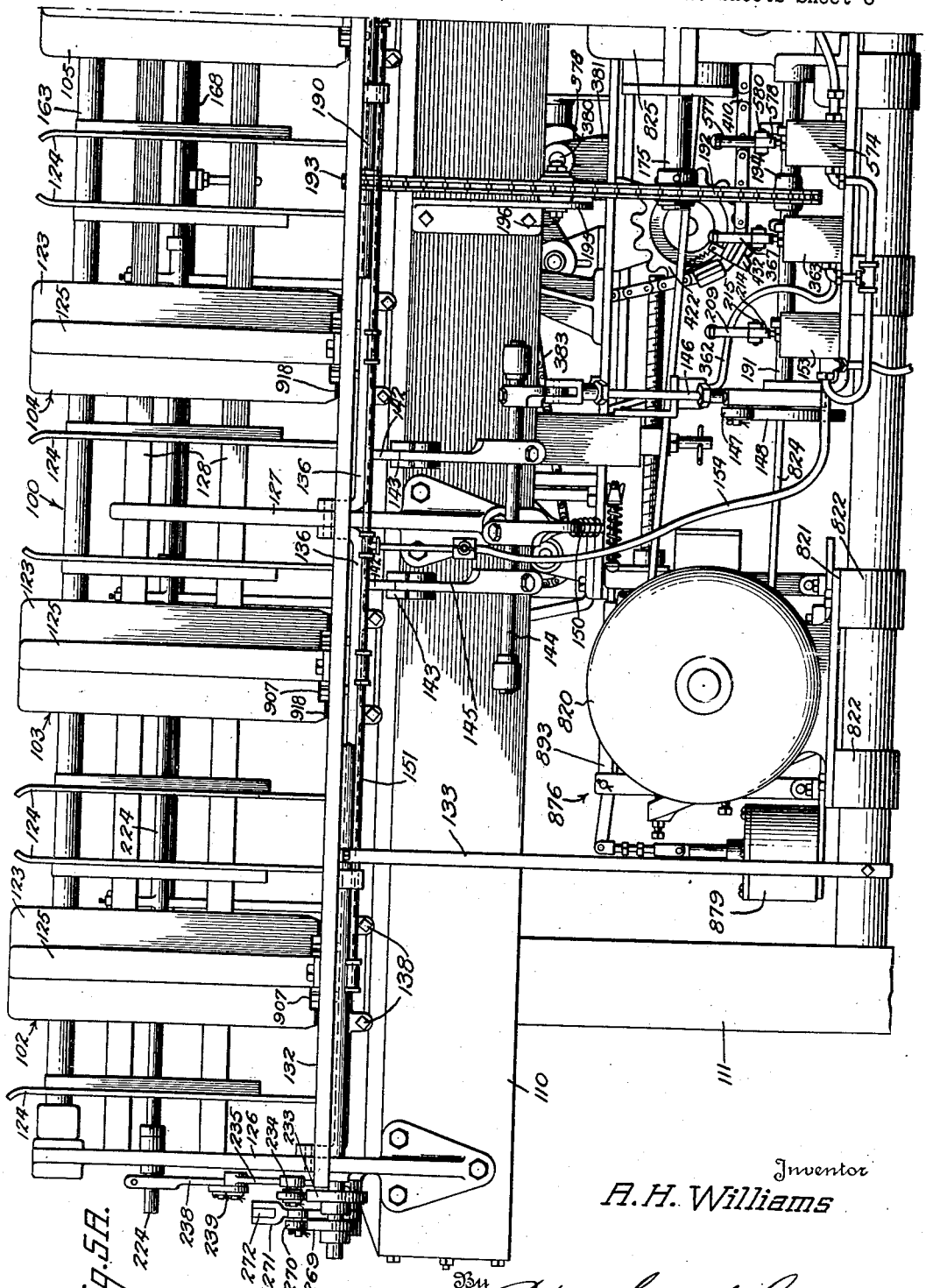

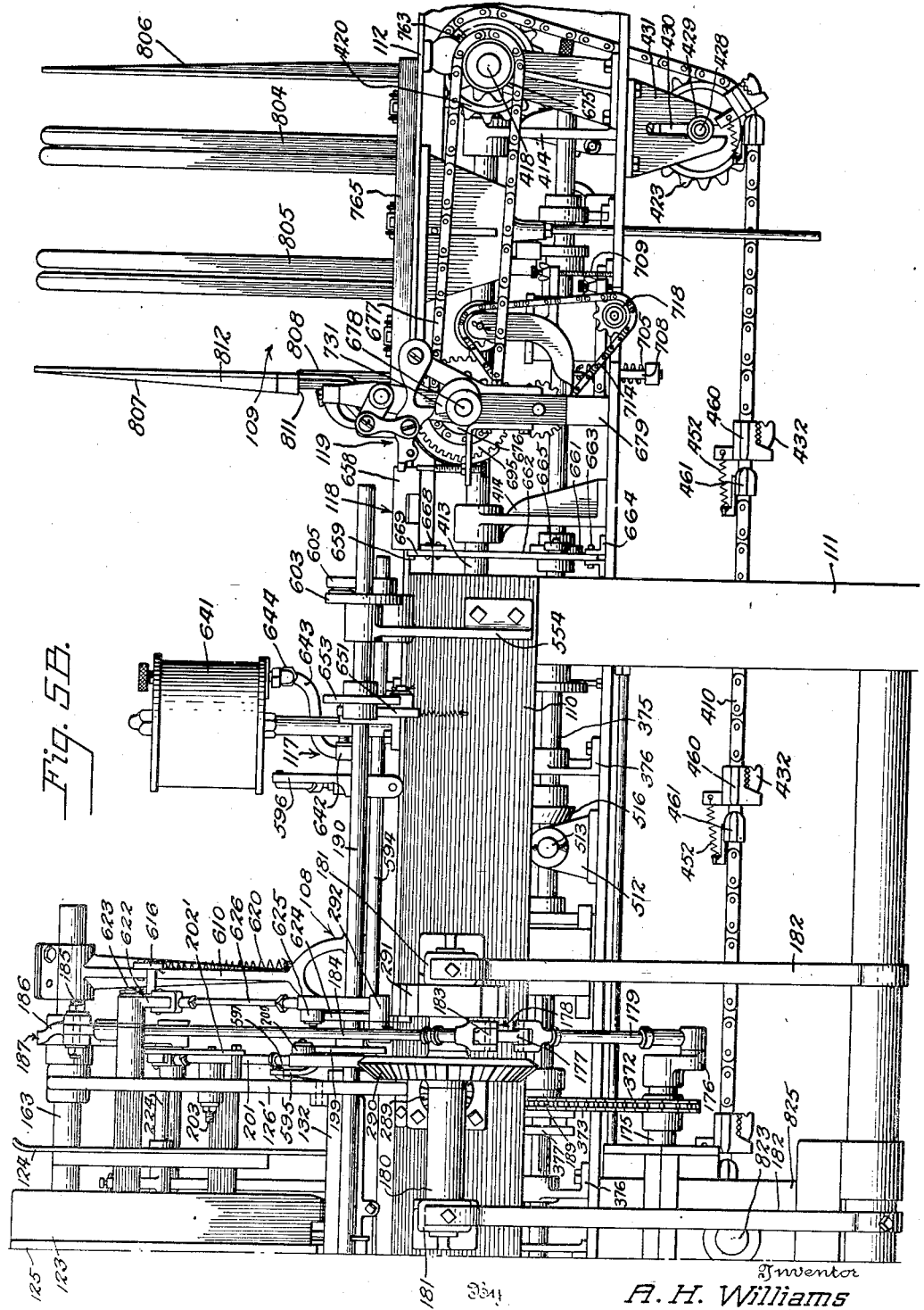

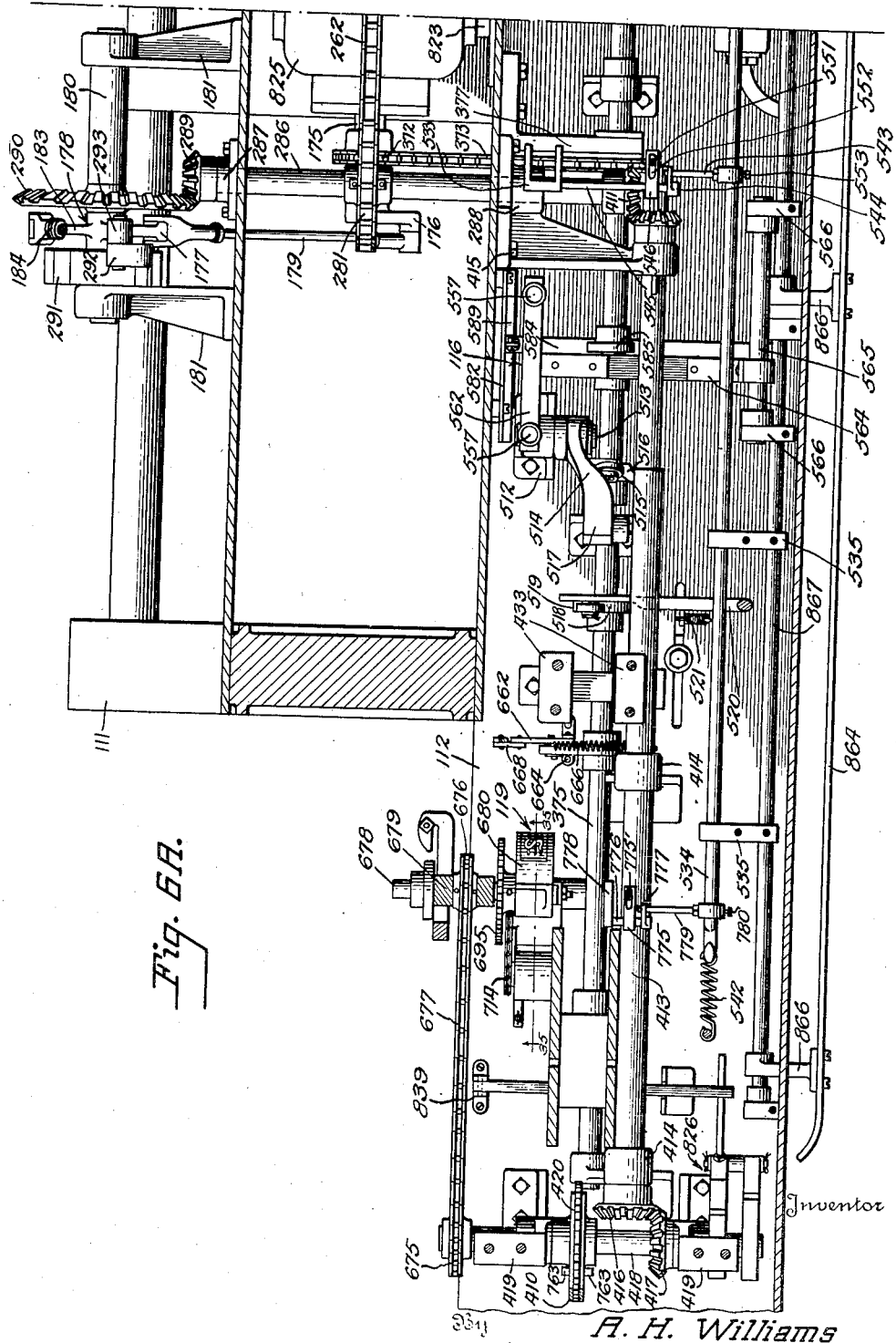

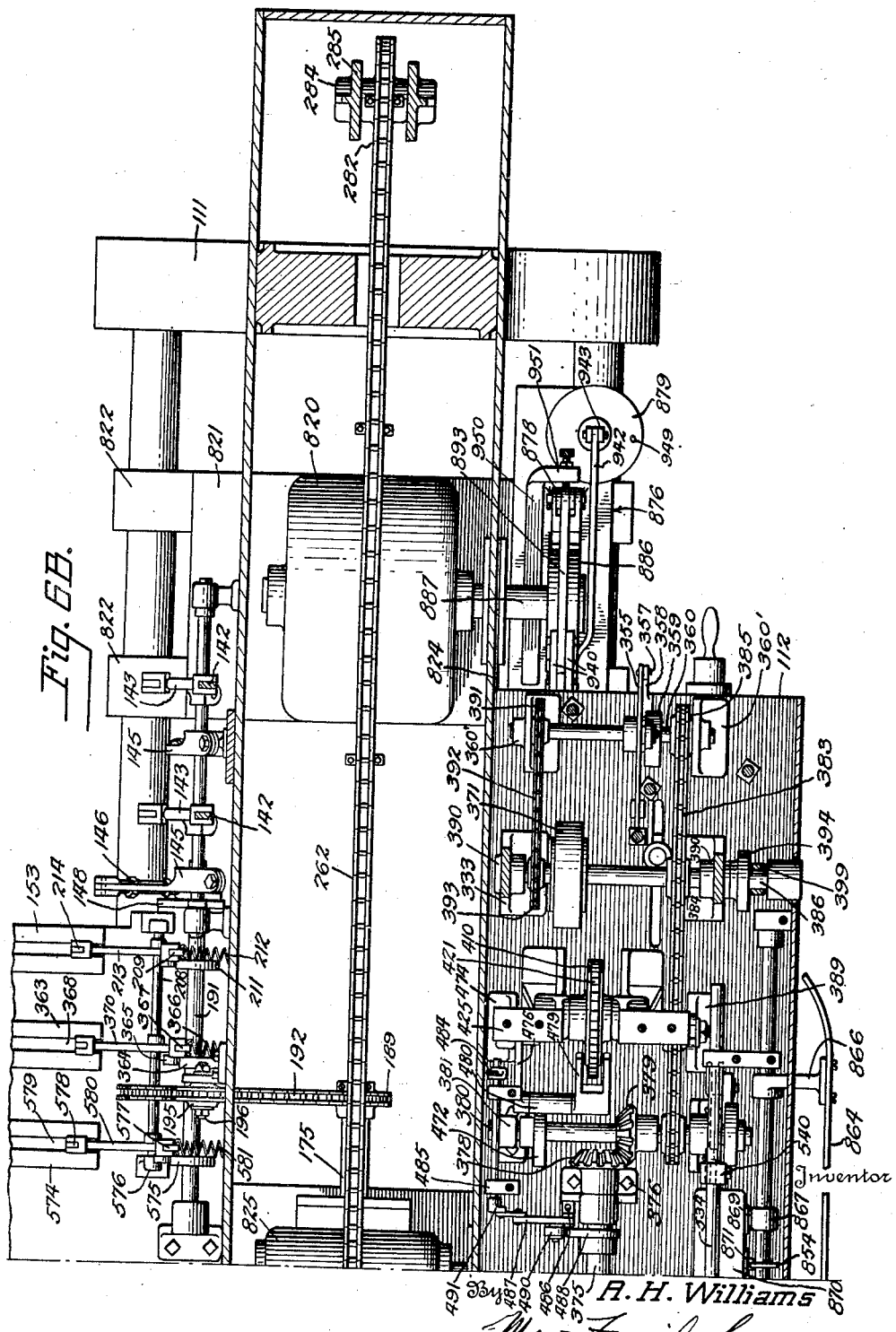

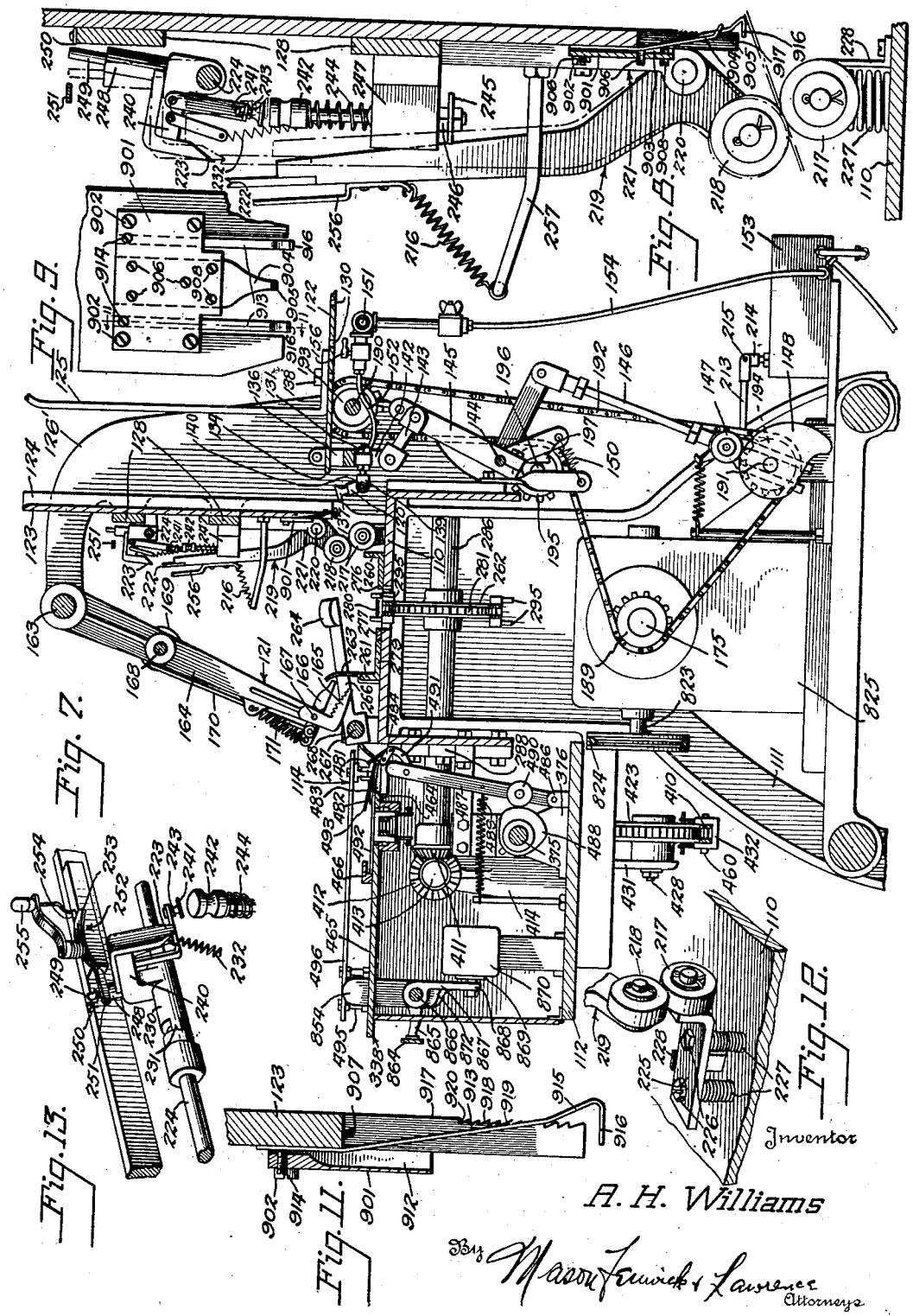

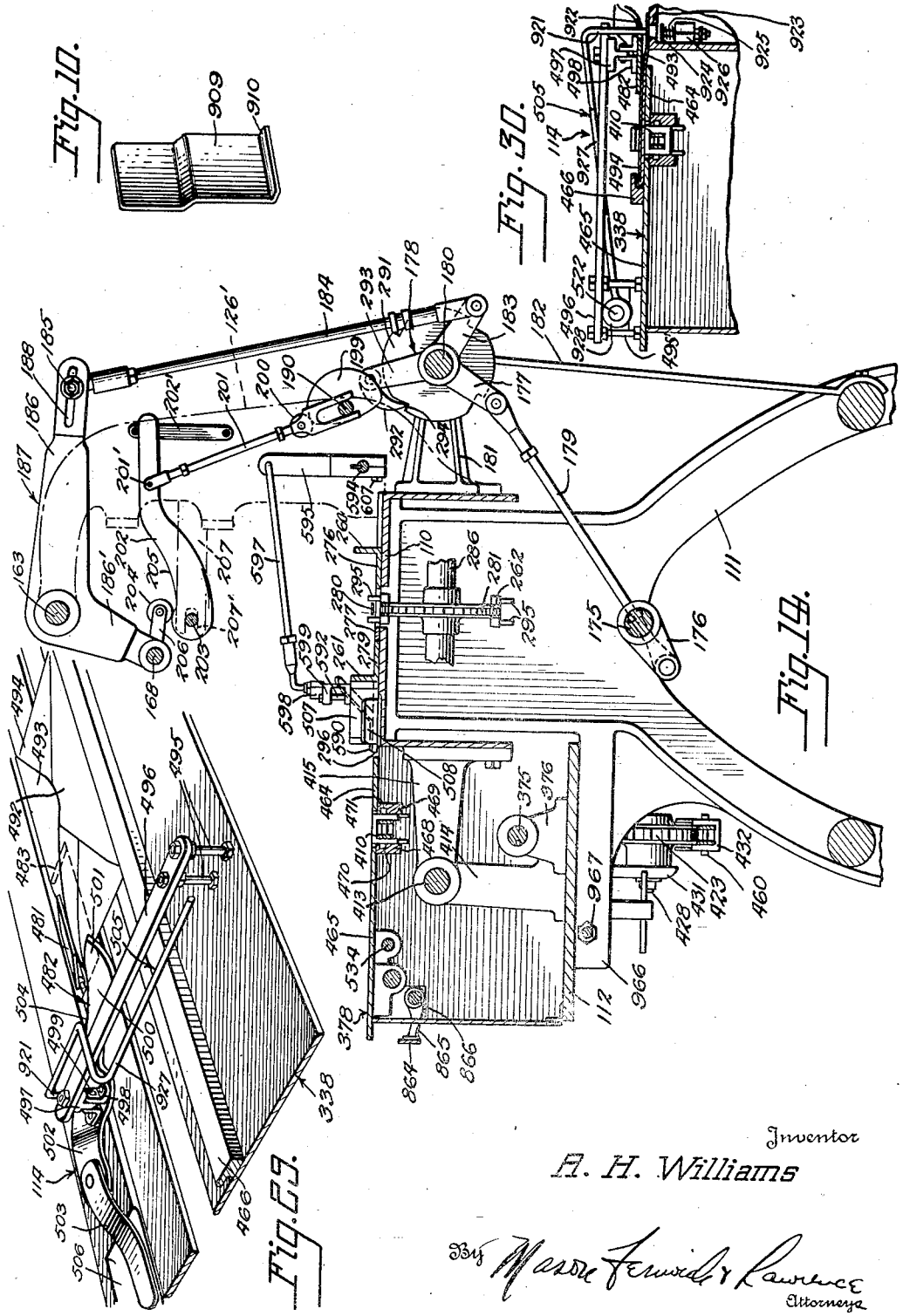

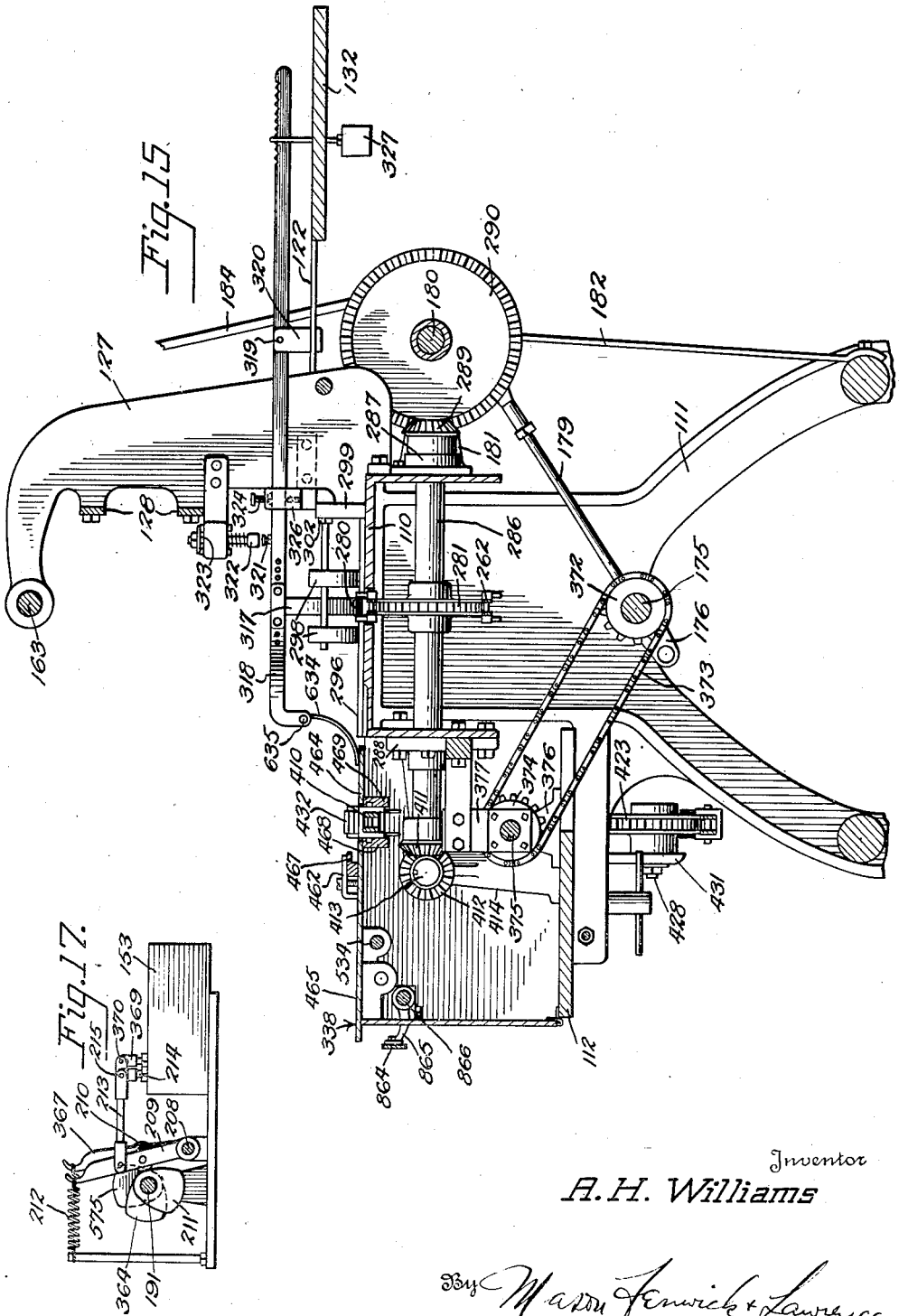

July 27, 1943.　　　A. H. WILLIAMS　　　2,325,455
ENVELOPE HANDLING MACHINE
Filed Oct. 2, 1940　　　20 Sheets-Sheet 13
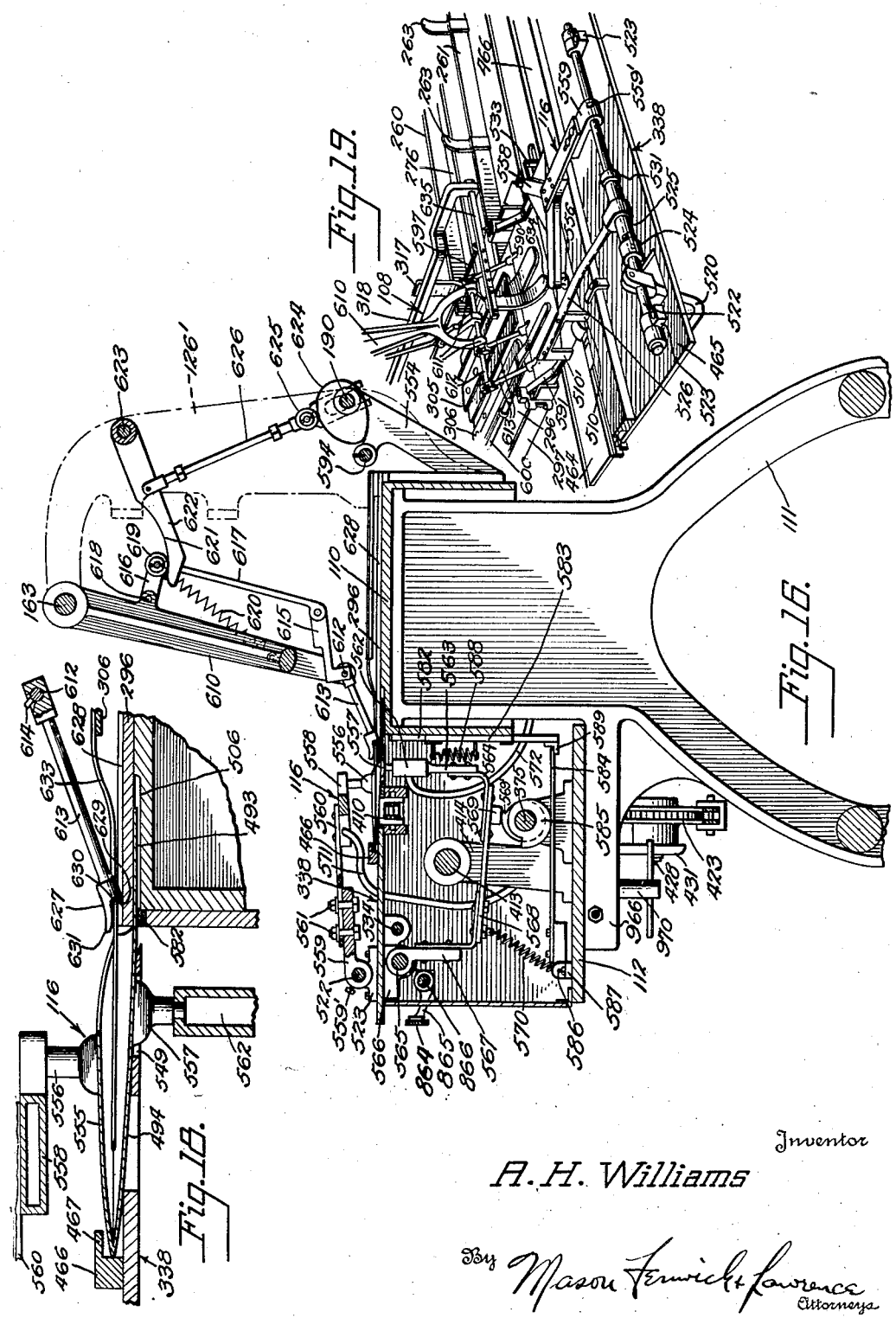
Inventor
A. H. Williams
By Mason Fenwick Lawrence
Attorneys

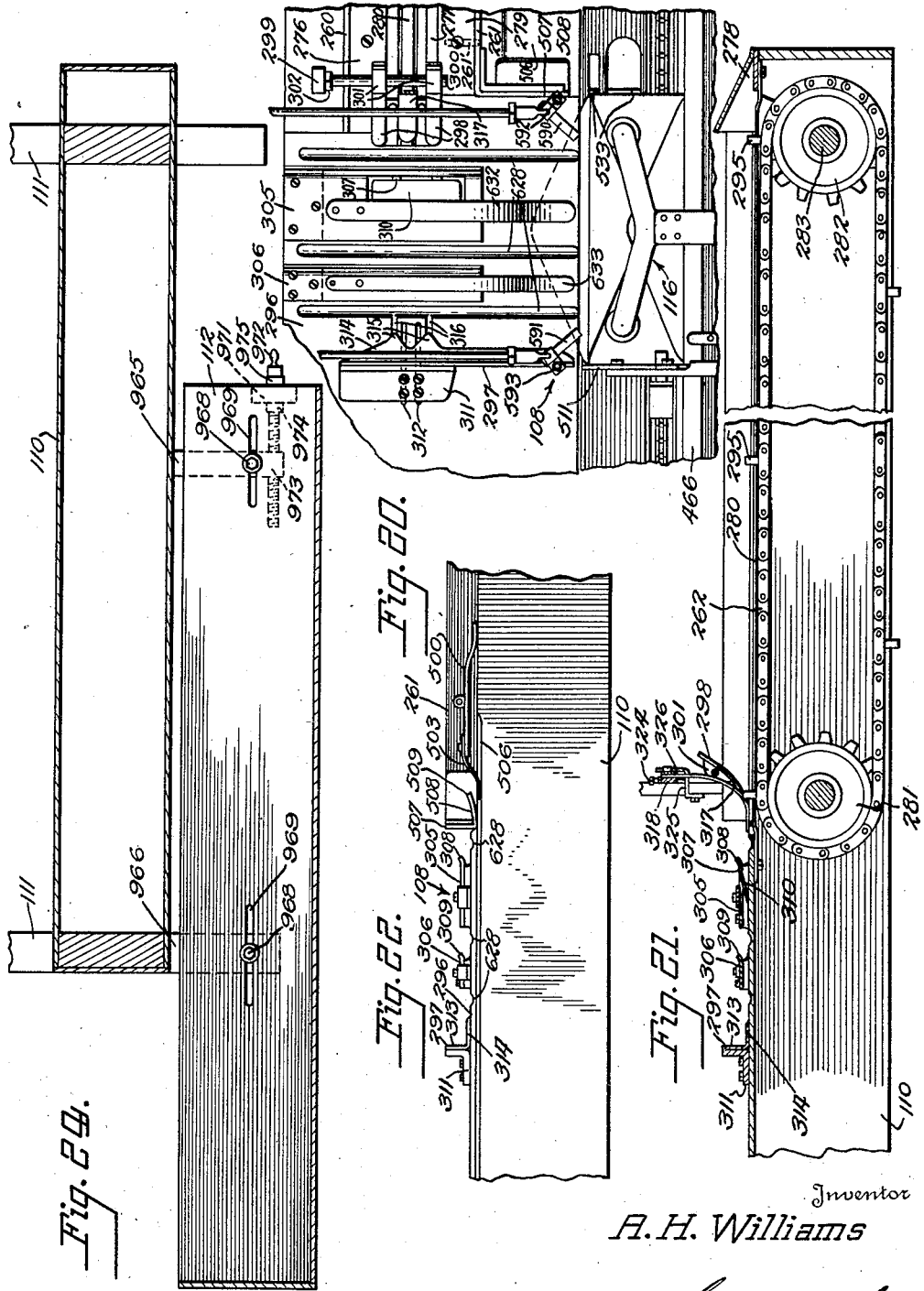

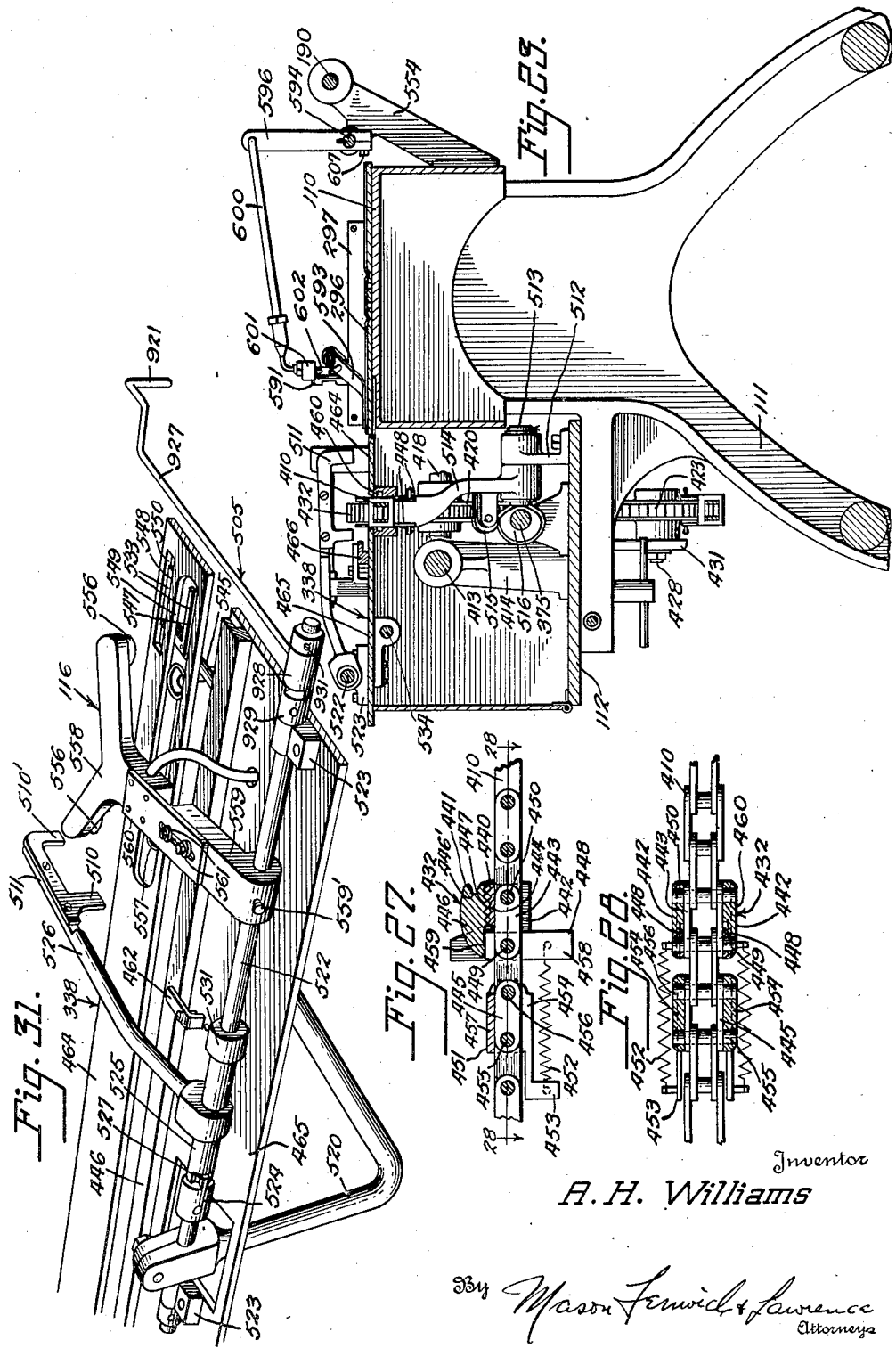

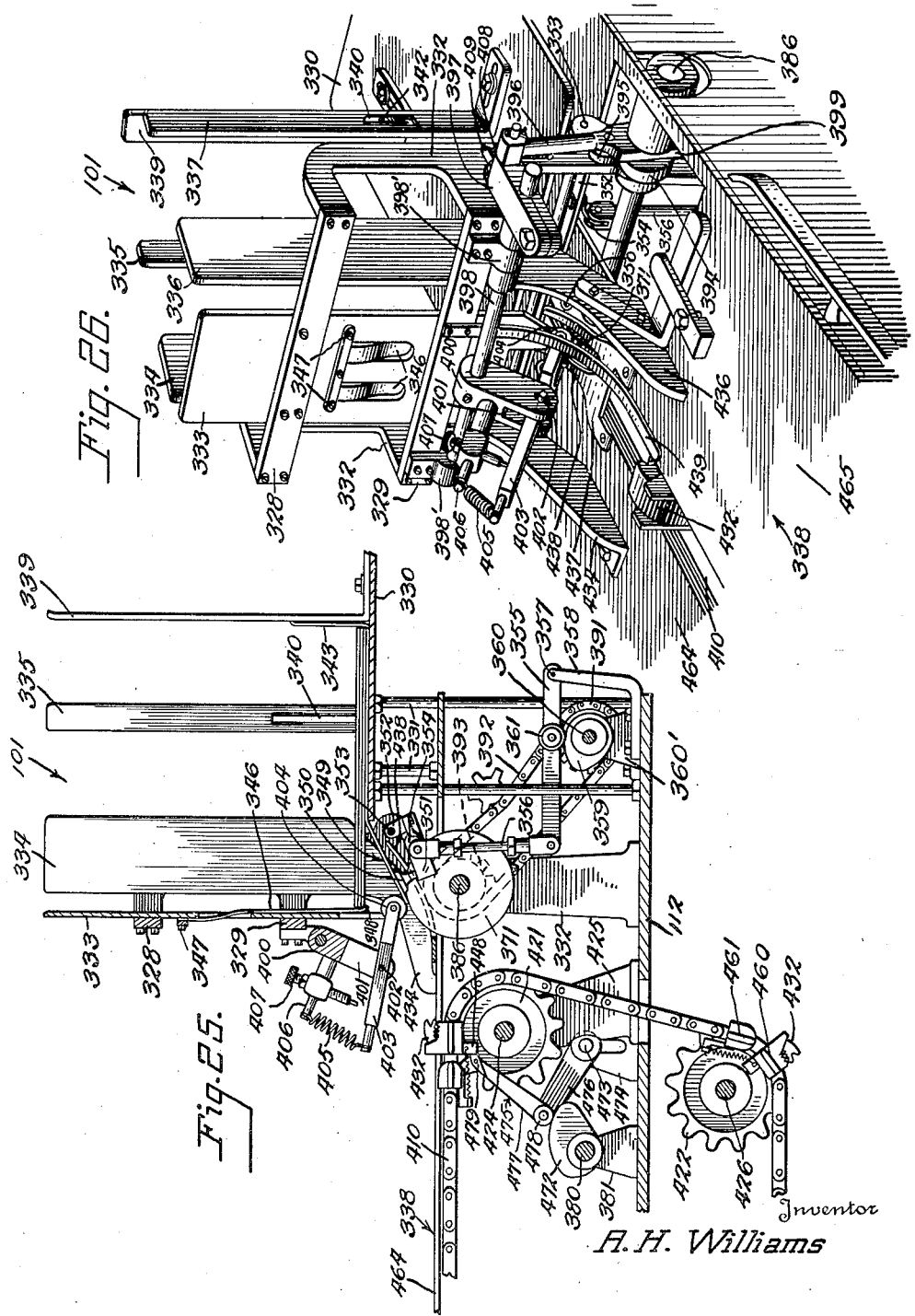

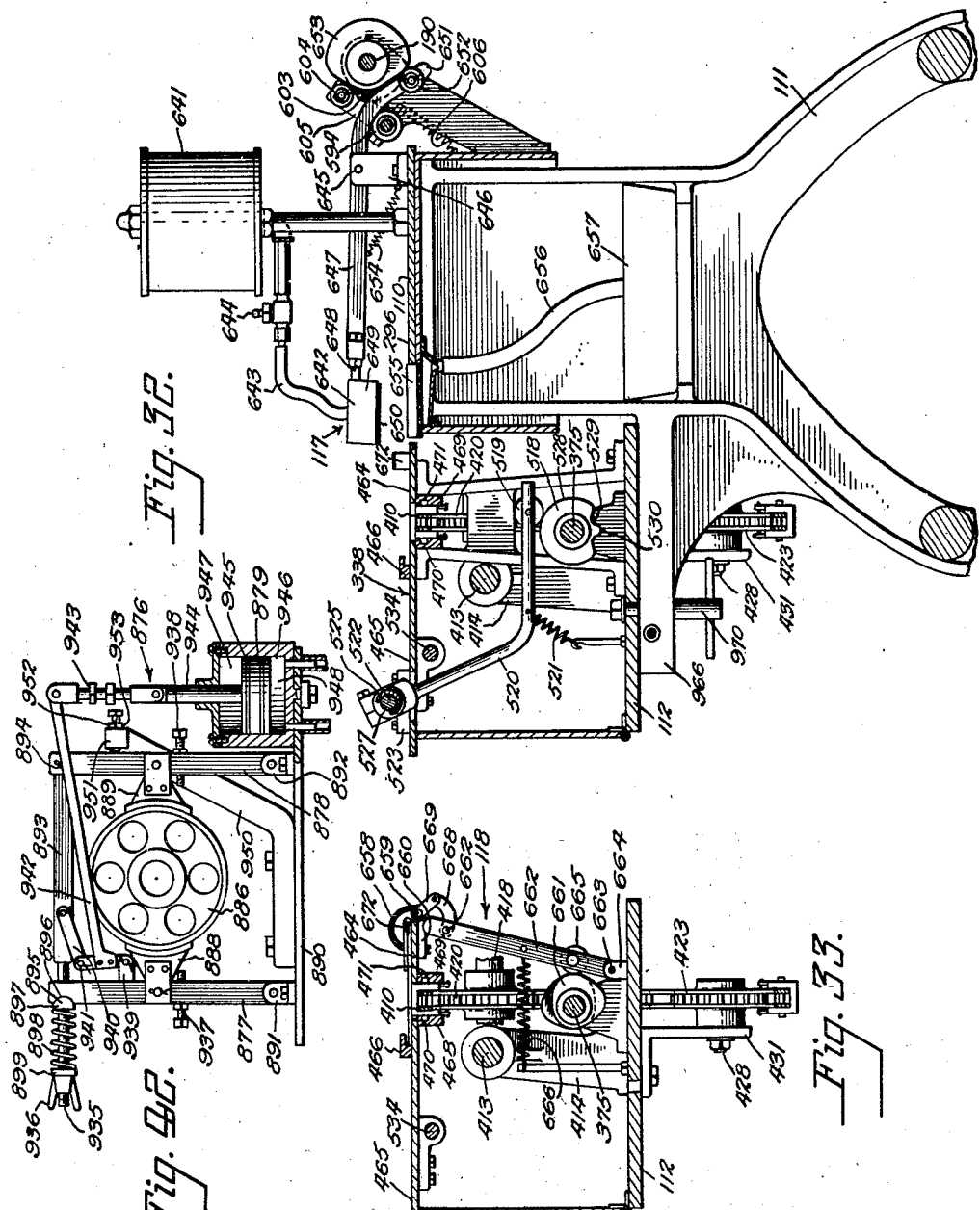

July 27, 1943.  A. H. WILLIAMS  2,325,455
ENVELOPE HANDLING MACHINE
Filed Oct. 2, 1940  20 Sheets-Sheet 18
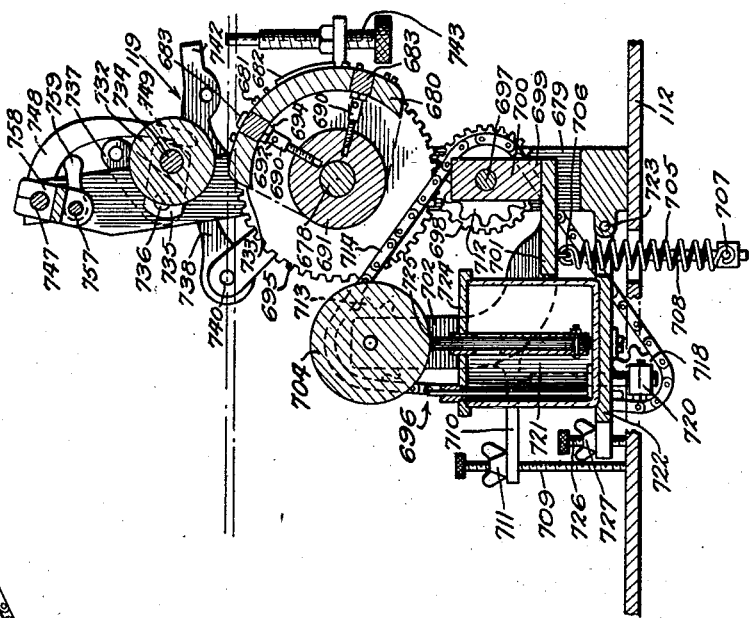
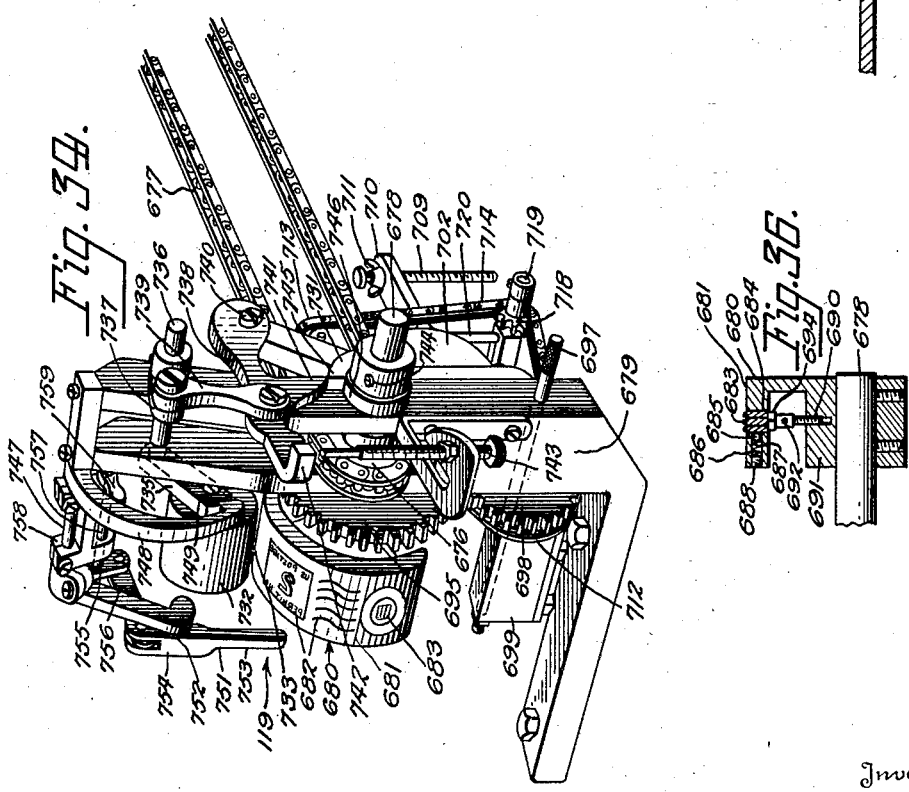
Inventor
A. H. Williams
By Mason Fenwick & Lawrence
Attorneys July 27, 1943.  A. H. WILLIAMS  2,325,455
ENVELOPE HANDLING MACHINE
Filed Oct. 2, 1940  20 Sheets-Sheet 19
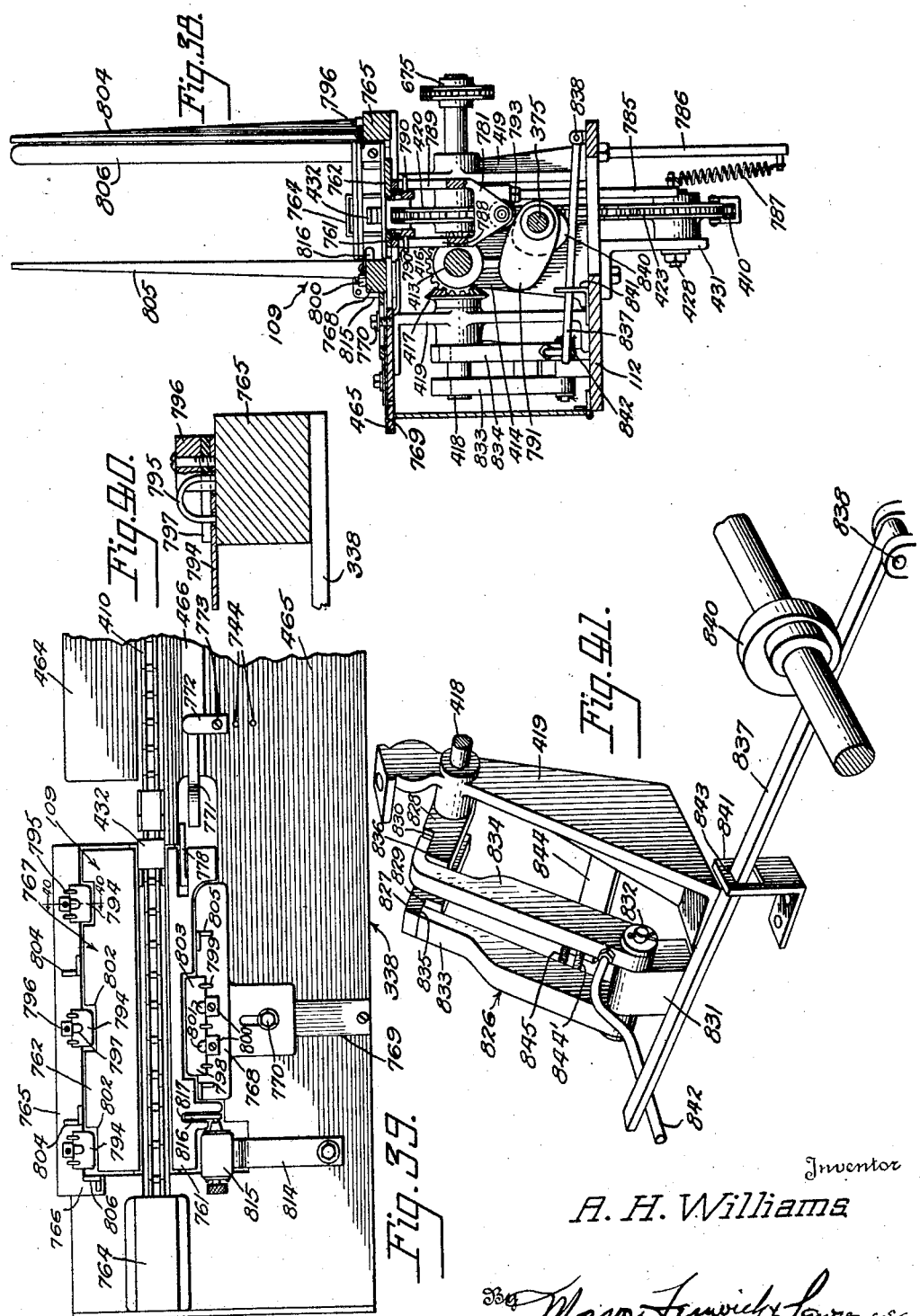
Inventor
A. H. Williams

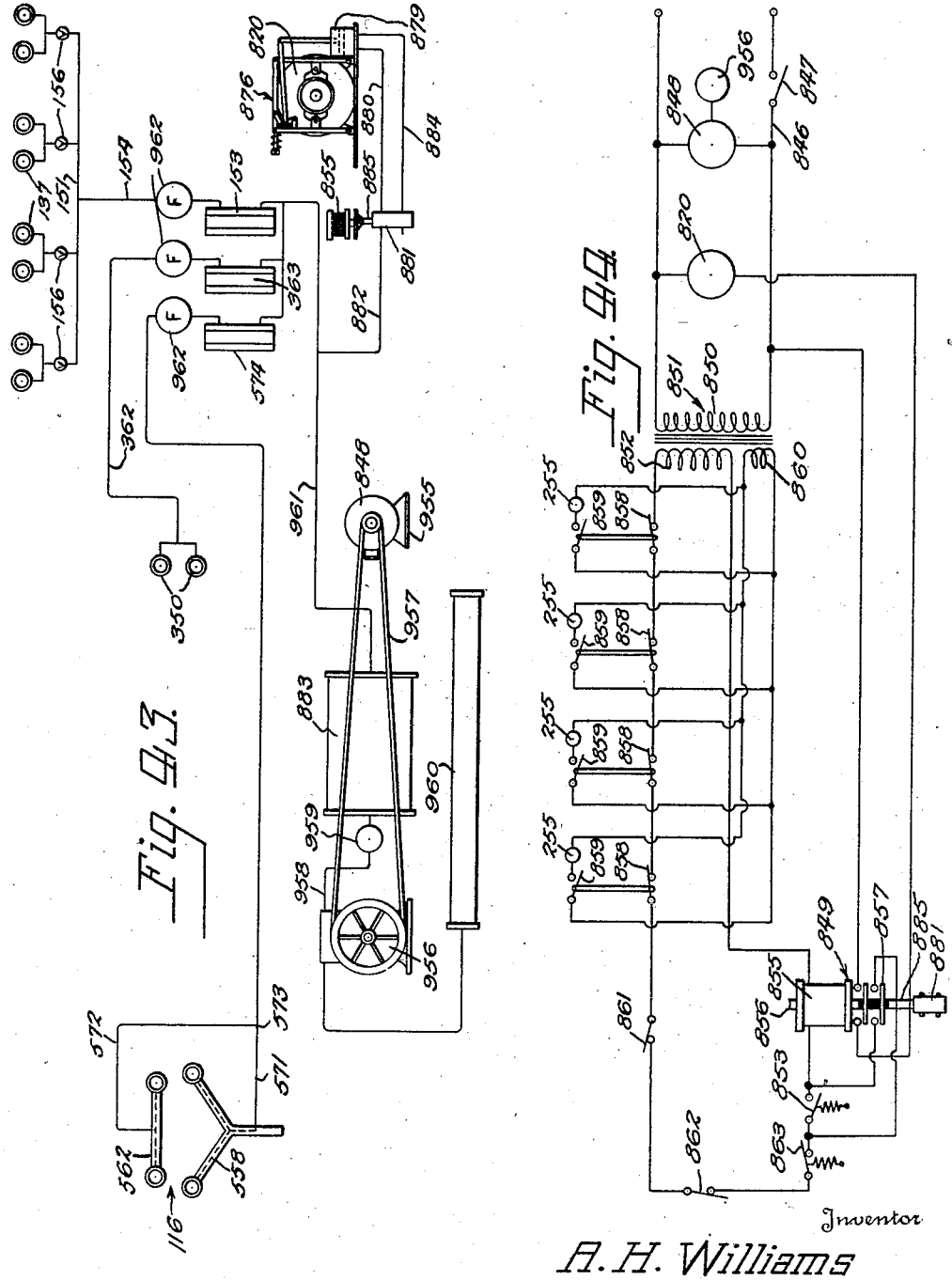

Patented July 27, 1943

2,325,455

UNITED STATES PATENT OFFICE 2,325,455

ENVELOPE HANDLING MACHINE

Albert H. Williams, Maplewood, N. J., assignor to Inserting and Mailing Machine Company, Phillipsburg, N. J., a corporation of New Jersey Application October 2, 1940, Serial No. 359,430

14 Claims. (Cl. 93—6)

This invention pertains to envelope handling machines which project successive inserts into successive envelopes, and stack the filled envelopes ready for mailing.

In the preferred practice of the invention, as shown, it comprises a machine providing a plurality of insertion supply stations to accommodate several different pieces of material to comprise the composite insert to be incorporated in each envelope, and mechanism to select a piece of material from each station, gather the material from the several stations, and transport it to an inserting station where it is inserted into the envelope. The machine simultaneously selects successive envelopes, and transports them to the inserting station where the insert is projected into the envelope. The envelope is thereafter transported to a deposit station filled, sealed and stamped ready for mailing.

One important characteristic of the machine is that the envelope handling mechanism, including all the mechanism which functions to select the envelopes and transport them to the inserting station and beyond to the deposit station, is mounted on one bed plate, and the insertion handling mechanism is mounted on another bed plate, the two bed plates being relatively movable to adjust the machine to accommodate envelopes of different sizes. The envelope handling mechanism pulls the successive envelopes through the machine, registering with the forward end of each envelope. The insertion gathering mechanism pushes the insertions, and thus registers with the rearward edge of the insertions. The adjustment of the envelope handling mechanism relative to the insertion handling mechanism, therefore, automatically comprises an adjustment between the front edge of the envelope and the rear edge of the material inserted in the envelope and accordingly affords adjustment to the size of the envelope.

Pneumatic mechanism is provided for selecting insertions at each insertion supply station, and similar pneumatic mechanism is provided at the envelope supply station to select successive envelopes. In addition, pneumatic means are provided at the inserting station to draw the panels comprising the front and back portions of the envelope away from each other, and above and below the plane occupied by the insert material at the inserting station, to open the envelope to receive the insert and to hold the envelope open in the plane of the insert during the inserting operation. These various pneumatic means are valve actuated and operated in timed relation to each other, to their several mechanical movements, and to the other operations of the machine.

Mechanism is provided to open the flaps of the envelopes in their passage from the envelope supply station to the inserting station. At the inserting station mechanism is provided to hold the flap of the envelope out of the way of the insert material. Positioned in the path of the envelope after it leaves the inserting station, there is mechanism to moisten the flap to gum it, followed by flap closing and sealing mechanism. Additional means are provided to apply a postage stamp to each envelope. Each of these mechanisms is operated in timed relationship to each other and in timed relationship to the mechanism for transporting the envelopes stepwise from station to station, being timed as well to the operation of the various mechanism for selecting insertions, gathering them and transferring them to the insertion transporting mechanism. The inserting mechanism, i. e., the mechanism to project the inserts into the envelopes, also operates in timed relationship with the rest of the machine.

The machine is equipped with stop mechanisms, operable when the various mechanisms fail to function properly. A brake, preferably pneumatically operated, cooperates with the stop mechanism to prevent overriding of the machine when it fails to operate satisfactorily.

The machine, therefore, is fully automatic to take envelopes from a source of supply and a plurality of insertions from a plurality of sources of supply, to assemble the envelope and the various insertions and to deposit the assembled material ready for mailing. The several mechanisms, per se, for performing the various steps hereinbefore noted, as well as the mechanisms in combination with each other, present novelty, as will be clear from the more detailed description of the machine to follow.

This being the invention expressed in general terms, for further details attention is now directed to the accompanying drawings, in which:

Figure 2 is a plan view of the machine in general;

Figure 1:
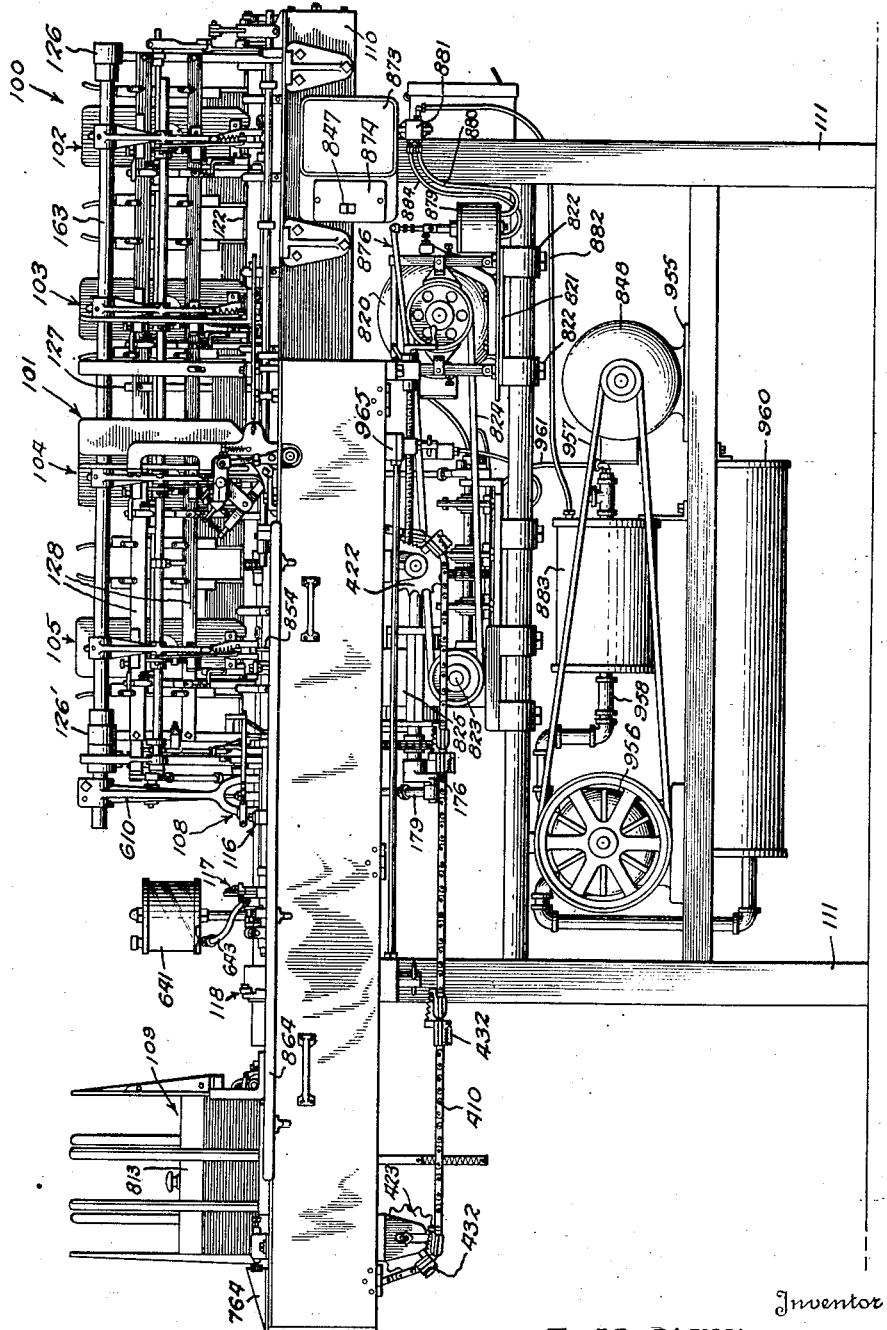
Figure 1 is a front elevation, showing the machine in general.
Figure 5B:
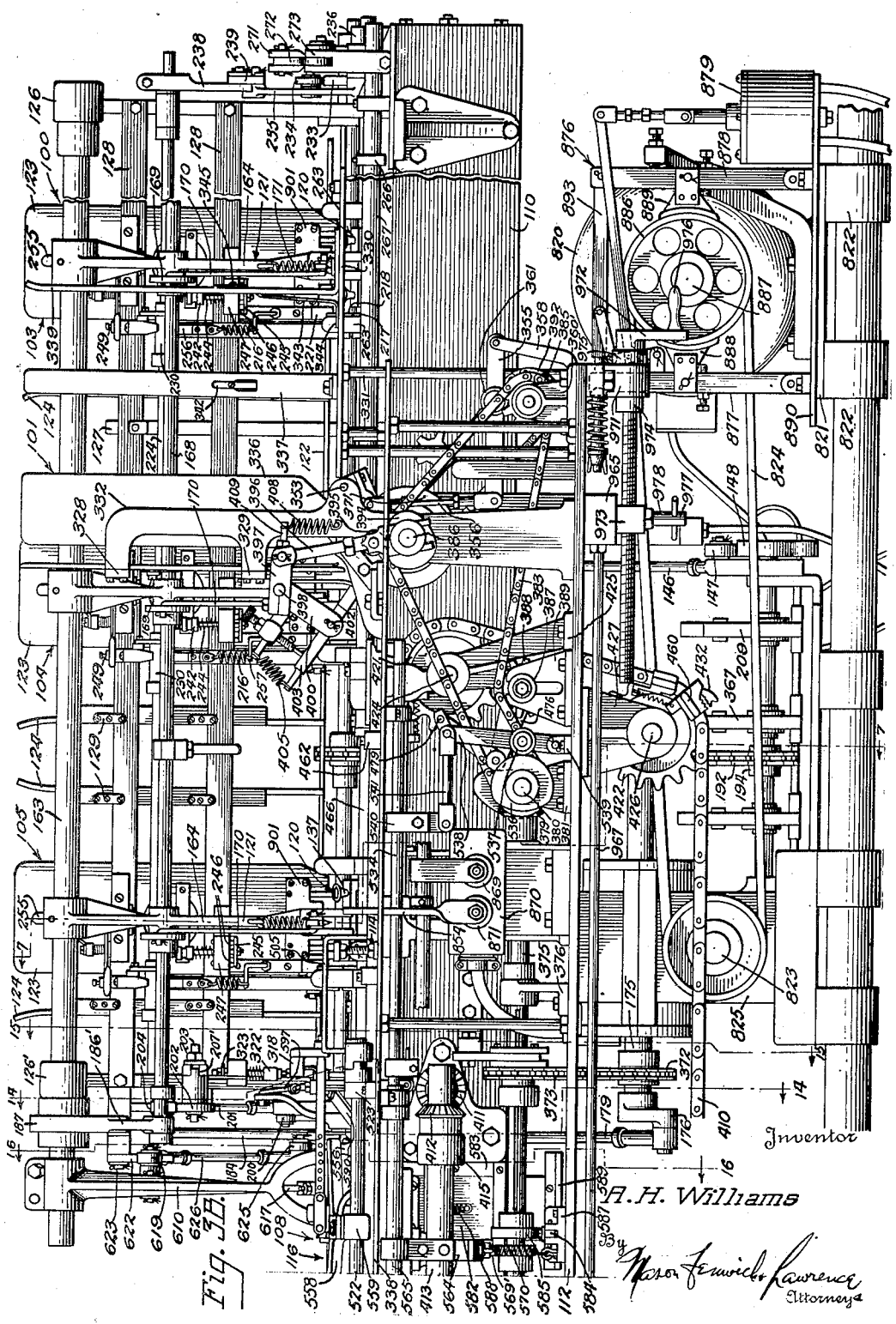

Figures 3A and 3B, together present a front elevation on a larger scale, with parts removed to make the showing more clear;

Figure 4 is an end elevation viewed from the right in Figure 1;

Figures 5A and 5B present a rear elevation of the machine;

Figures 6A and 6B present a horizontal cross section taken in plane below the envelope and insertion transporting tables, to illustrate the drive mechanism in plan view;

Figures 7 is a cross sectional elevation taken on line 7—7 of Figure 3B;

Figure 8 is a detail elevation of parts shown in Figure 7;

Figure 9 is a detailed elevation, viewed from the front of the machine, of mechanism cooperating in the selection of insertions;

Figure 10 is a perspective view of a modified form of the insertion supply holder shown in Figure 9;

Figure 11 is a cross sectional elevation taken on line 11—11 of Figure 9;

Figure 12 is a perspective view showing details of construction of parts shown at the bottom of Figure 8;

Figure 13 is a perspective view showing details of construction of parts shown at the top of Figure 8;

Figure 14 is a cross sectional elevation taken on line 14—14 of Figure 3B;

Figure 15 is a cross sectional elevation taken on line 15—15 of Figure 3B;

Figure 16 is a cross sectional elevation taken on line 16—16 of Figure 3B;

Figure 17 is an elevation, partly in section, showing detailed construction of vacuum controlled mechanism comprising parts shown in the lower right hand corner of Figure 4;

Figure 18 is an elevation, partly in section, showing details of the inserting mechanism and its operation, comprising parts shown in Figure 16;

Figure 19 is a perspective view illustrating operation of the inserting mechanism;

Figure 20 is a plan view illustrating the inserting station;

Figure 21 is a longitudinal cross sectional elevation showing the insertion transporting chain;

Figure 22 is an elevation, longitudinally of the machine with the envelope transporting mechanism removed, and showing details of construction of mechanism at the inserting station;

Figure 23 is a cross sectional elevation taken on line 23—23 of Figure 3A;

Figure 24 is a diagrammatic cross sectional plan view illustrating the bed plate construction for adjusting the machine to envelopes of different sizes;

Figure 25 is a cross sectional elevation, longitudinally of the machine, taken on line 25—25 of Figure 4, showing the envelope supply mechanism;

Figure 26 is a perspective view of parts shown in Figure 25, illustrating the envelope supply;

Figure 27 is a longitudinal cross sectional elevation, showing details of the envelope transporting mechanism;

Figure 28 is a cross sectional plan view taken on line 28—28 of Figure 27;

Figure 29 is a perspective view showing details of construction of the envelope flap opening mechanism and its operation;

Figure 30 is a cross sectional elevation taken on line 30—30 of Figure 2 showing details of construction of the envelope detector and flap opening mechanism;

Figure 31 is a perspective view showing details of construction and operation of the envelope opener;

Figure 32 is a cross sectional elevation taken on line 32—32 of Figure 3A;

Figure 33 is a cross sectional elevation taken on line 33—33 of Figure 3A;

Figure 34 is a perspective view showing details of construction of the envelope stamping mechanism;

Figure 35 is a longitudinal cross section of the envelope stamping mechanism taken on line 35—35 of Figure 6A;

Figure 36 is a cross sectional view through the printing die;

Figure 37 is a perspective view showing details of construction of the deposit platen support;

Figure 38 is a cross sectional elevation taken on line 38—38 of Figure 3A;

Figure 39 is a detailed plan view of the deposit station;

Figure 40 is a cross sectional elevation taken on line 40—40 of Figure 39;

Figure 41 is a perspective view of the details of construction of the backlash pickup mechanism;

Figure 42 is a detail view of the brake mechanism shown at the right in Figures 1 and 3B;

Figure 43 is a schematic view illustrating the circuit of the pneumatically operated mechanism of the machine; and Figure 44 is a wiring diagram of the electrical apparatus of the machine.

THE MACHINE IN GENERAL

Referring to the drawings:

They show a machine for handling envelopes, and inserts which are placed in the envelopes. With special reference to Figures 1 and 2, there is the insert supply station, designated generally by 100, and the envelope supply station, designated generally by 101.

The machine provides for the insertion of a plurality of pieces of material in each envelope, the machine shown being equipped to supply as high as four different pieces of insertion material, one from each of the four insertion supply stations 102, 103, 104 and 105. The insertions are gathered from station to station, the gathering mechanism traveling past the supply stations 102, 103, 104 and 105 in a line designated generally by 106. The envelopes travel along a line parallel thereto indicated generally 107. The insertions and the envelopes are thus transported in parallel paths to a station indicated generally at 108, where they are juxtaposed. This is the inserting station where the successive inserts are successively projected laterally into successive envelopes.

Beyond the inserting station the envelopes continue on the same line 107 they have been following to the deposit station indicated generally at 109.

The mechanism for handling the insertions until they are projected into the envelopes, including the inserting station at 108, is mounted on the bed plate 110, Figure 1, which is the main bed plate of the machine fixed to the supporting legs 111. The envelope handling mechanism, including the envelope supply station 101, the mechanism for transporting the envelopes from the supply station 101 to the deposit station 109 through the inserting station at 108, as well as the deposit station at 109, is mounted on a movable bed plate 112. See Figures 3A, 3B, and the end view, Figure 4. This construction permits the entire envelope handling assembly and the insertion handling assembly to be moved parallel relative to each other to adjust the machine for handling envelopes of various sizes. The manner in which this is accomplished will appear more clearly from detailed description to follow.

At each insertion supply station, 102, 103, 104 and 105, a piece of the insertion material is selected from the supply and carried laterally of the line of insertion travel, by mechanism which will be described more fully in detail hereinafter, to a transporting table along the line 106. It is pushed along the table, by mechanism described more fully hereinafter, to the next succeeding insertion supply station, where another piece of insertion material is transferred to the table to join those already there. At each insertion supply station there is mechanism to select a piece of the insertion material and place it on the insertion transporting table, the mechanisms at the several stations, according to the embodiment shown, being similarly constructed. If less pieces of insertion material are to be inserted in the envelopes than there are supply stations available, a simple adjustment is provided to render any insertion supply station not required inoperative. The insertion material is accumulated and is transported in the manner explained until it reaches the inserting station indicated at 108 where it forms the composite insert which is projected into the envelope.

Simultaneously with the operation of the insertion gathering and transportation as described, an envelope is selected from the supply station at 101, by mechanism to be described more fully in detail hereinafter, and fed to an envelope transporting table along the line 107. This transporting mechanism pulls the envelope to the inserting station at 108 where the envelope comes to a position of rest and the insert is projected into it. After receiving the insert the envelope is pulled along the same line at 107 to the deposit station 109.

The peculiarity that the envelopes are pulled and the insertions are pushed enables the adjustment of the machine to envelopes of various sizes as hereinbefore mentioned. The envelope pulling mechanism registers with the forward edge of the envelope and the insertion pushing mechanism registers with the rear edge of the insertion, the relative distances between them being determinate of the size of the envelope.

In its passage from the supply station at 101 to the inserting station at 108, means 114, described more fully in detail hereinafter, are provided to open the flaps of the envelopes and to guide them below the table or platen 296, where they will be out of the way of the insert material as it is projected into the envelopes.

At the station 108 pneumatic means illustrated generally at 116, is provided to open the envelopes to permit the inserts to be projected into them.

After the envelope leaves the inserting station at 108, the flap passes in proximity to a moistener, illustrated generally at 117, where the gum is moistened. As the envelope continues to move toward the deposit station 109 it passes a flap closer, illustrated generally at 118, and described in detail hereinafter. At 119 the envelope receives a postage stamp as it passes into the deposit station at 109.

INSERTION SUPPLY STATION

At each supply station 102, 103, 104 and 105 there is an insertion selector 120, Figure 7, and a gripper member 121, which select and engage insertions and transfer them to the transportation mechanism. In accordance with the embodiment shown the selectors 120 and the grippers 121 are alike at each station 102, 103, 104 and 105. They receive the insertions from supply tables 122, where the material is stacked, confined within the forward partition 123, end partitions 124, and back partition 125.

The upright brackets 126 and 126' mounted on the main bed plate 110 at the respective ends thereof, and bracket 127 in between, Figures 2, 5A and 5B, provide a support for the mechanisms at the insertion stations, and the various mechanisms above the bed plate 110 which cooperate in handling insert material. Longitudinal support rails 128 are fixed to the upright brackets 126, 126' and 127, and the partitions 123 and 124 are carried thereby. The forward partitions 123, one at each insertion station, are attached to the rails 128 in fixed position. The end partitions 124, channeled to provide angles which engage the forward corners of the insertion material, are mounted slidable along the rails 128 to adjust them in accordance with the length of the insertion material at the incident station, the end partitions 124 being held in position of adjustment by the screw held stops 129. The back partitions 125 are mounted on the tables 122 adjustable toward or away from the partition 123 to accommodate narrower or wider insertions. The screw threaded holes 130, spaced to afford the adjustment, receive the hold down screws 131 to fix the partitions 125 to its table 122 in position of adjustment.

The tables 122, one for each two insertion supply stations, are attached to the back table 132 and extend forwardly therefrom. The table 132 is supported by brace rods 133, extending upwardly and rearwardly from the legs of the machine, Figure 4.

As will be seen, the adjustments of partitions 124 and 125 are independent at the several supply stations 102, 103, 104 and 105 to accommodate different size insertions at the various stations.

*Insertion selectors*

The table 122, Figure 7, extends forward a distance short of the partition 123, as shown, and provides a gap between the edge 134 and the partition 123 in which the selectors 120 operate. Each selector, one at each supply station, comprises a pair of vacuum cups 137, movable upwardly into the plane of the table 122 in the space between the edge 134 and the forward partition 123.

Between the end bracket 126 and the middle bracket 127, and between the middle bracket 127 and the other end bracket 126', are two U-shaped bracket levers 136, Figures 5A and 5B, which carry the selectors 120. The vacuum cups 137 are rigidly attached to the U-shaped bracket lever 136, and are adjustable with reference to the gap in the table 122. A pair of bolts 138, adjustable longitudinally, carry the clevis 139. The bolt 140 holds the vacuum cups 137 fixed to the clevis 139 by means of nuts, as shown, which are releasable to adjust the angular disposition of the vacuum cups 137. By means of the bolts 138 and 140 the vacuum cups can be adjusted so that they reach the plane of the table 122 in their extreme upward movement and also that they describe the same plane as the plane of the table.

Attached to each U-shaped lever is a downwardly directed arm 142 which carries a connecting rod 143, Figure 7, pivoted thereto. Pivoted at 144 is the bell crank lever 145, one arm of which is pivotally connected to the connecting rod 143. The other arm of the bell crank lever 145 is pivotally connected to the push rod 146, which carries the cam follower 147. The cam follower 147 is actuated by the cam 148 on the lower back cam shaft 191, which rotates once for each cycle of the machine. The tension spring 150 functions to urge the bell crank lever 145 in the clockwise direction in Figure 7 to urge the cam follower 147 against the face of the cam 148.

Each pair of vacuum cups 137 is connected to the manifold 151, Figures 5A and 5B, by the flexible hose connection 152, Figure 7. The manifold 151 is connected to the control valve 153 by the vacuum line 154. See also Figure 17. Because the selectors 120 at each of the insertion stations 102, 103, 104 and 105, when in operation, are operated simultaneously, the valve control for the vacuum cups 137 at all stations is by means of the single valve 153. The valve 153 is operated intermittently, once during each cycle of the machine, and in timed relationship with the movement of the vacuum cups 137. A pet cock 156, one for each insertion supply station, is positioned at the inlet into the manifold 151, to render the vacuum cups 137 at that particular insertion supply station inoperative or operative at will.

As the vacuum cups 137 reach the upper extent of their movement and attain the plane of the table 122 with the cups in contact with the lowermost insertion in the supply, the valve 153 operates to apply suction to the cups 127. The vacuum cups 137 then begin to descend under action of the cam 148 carrying the lowermost insertion with them and deflecting the insertion out of the plane of the table, 122 into position to be engaged by the gripper, indicated generally at 121. When the insertion attains the position to be engaged by the gripper 121, the valve 153 closes, releasing the vacuum on the cups 137.

Mounted on the forward face of the forward partition 123, in engagement with the surface opposite the insertion engaging wall, and at the lower end of the partition 123, is the holding panel 901, attached to partition 123 by means of the screws 902. See Figures 9 and 11. The holding panel 901 is located intermediate of the width of the partition 123. See Figures 1 and 3B.

The holding panel 901 is provided with a middle guideway 903 which receives the vane 904 to support the forward edges of the supply of insertions. When the vacuum cups 137 of the insertion selector 120 engage and deflect the lowermost insertion in the supply from the stack, as hereinbefore described, the selected insertion is drawn past the projecting tip 905 of the vane 904. The vane, shown in Figures 7, 8 and 9, preferably comprises clock spring steel extending into the guideway 903 and held in position in face to face engagement with the forward face of the partition 123 by means of set screws 906. The flexible end of the vane 904 extends downwardly beyond the lower edge 907 of the forward partition 123 and beyond the lower extremity of the guideway 903. In the embodiment shown in Figures 7 and 8, the vane 904 is tapered toward a narrow end to afford the desired flexibility and is deflected to provide the tip 905 which underrides the stack of insertion material supporting the forward edge thereof. Adjusting screws 908 are operable to press the lower end of the vane 904 rearwardly toward the supply of insertions. The screws 908 cooperate with the lowermost screw 906 to adjust the spring tension with which the forward edges of the insertions are held by tip 905.

The vane 904, shown in Figures 7, 8 and 9, is of resilient material to enable it to yield under the force of the selected insertion being drawn downwardly out of the stack by the vacuum cups 137 when they operate to deflect the selected insertion out of the plane of the table 122. The vane 904 is employed when the insertions are of a rigid nature, for example, when they comprise pamphlets or folders of considerable thickness. When the insertions, at any given station 102, 103, 104, 105, are of a flexible nature, for example, when the insertions comprise paper of a single thickness such as bank cheques, the vane 904 at that station is replaced by the vane 909 of rigid construction, shown in Figure 10. The vane 909 is held in the guideway 903 in a manner similar to the vane 904 by means of the set screws 906. The vane 909 projects downwardly below the lower edge 907 of the partition 123 in a manner similar to vane 904, and terminates with a ledge 910 similar to the tip 905 of the vane 904. Ledge 910 functions for the same purpose as tip 905 to support the forward edge of the supply of insertions. The vane 909 at its end, including the ledge 910, is wider than the vane 904 for maximum rigidity and is preferably not tapered at all as is the vane 904. Adjusting screws 908 are operable to engage the vane and press it toward the supply material in a manner similar to the adjustment of the vane 904.

The holding panel 901 is also provided with a pair of guideways 912 positioned on opposite sides of the guideway 903 and adapted to accommodate each a hold-down member 913. See Figure 11. Set screws 914 through the holding panel 901 are adjustable to each engage and hold a hold-down member 913 in face to face relationship with the forward surface of the partition 123. The hold-down members are constructed of resilient material, preferably comprising clock spring steel, deflected at their lower ends rearwardly at 915 below the stack of insertions resting on the table 122. At the extreme lower terminus of each hold-down member 913 it is bent forwardly to provide the insertion positioning surface 916. The set screws 914 can be retracted to permit movement of the hold-down members 913 in the guideways 912 for adjusting the position of the holding surfaces 916 vertically relative to the plane of the table 122. The hold-down members operate to hold the selected insertion in the proper position of deflection to be engaged by the gripper member 121 as it moves rearwardly to engage, and forwardly to withdraw, the selected insertion from the stack in a manner to be described more fully hereinafter. As the lowermost selected insertion is engaged and actuated downwardly by the vacuum cups 137, its forward edge rides along the smooth deflected surfaces 915. The hold-down members 913, because of their flexible nature, yield to any excessive stress by the insertion as it is deflected out of the plane of the table 122. While the insertion selectors continue to move downwardly to their lowermost limit of movement, and after the insertion has been deflected below the level of the holding surface 916, the valve 153 operates to release the vacuum applied by the cups 137, and the insertion is permitted to spring upwardly into engagement with the holding surface 916, where it is exactly positioned to be taken by the gripper 121.

The forward partition 123 projects downwardly on either side of the hold-down members 913, to provide apron-like engaging surfaces 917 for the forward edges of the insertions in the supply. The insertions have a tendency, because of their resilient nature and because of their repeated actuation by the selector 120, to ride up the surface of the forward partition 123 until they are out of the way of the vacuum cups 137 in their extreme upper limit of movement. To obviate this condition the rearward surfaces of the downwardly projecting aprons 917 are provided with serrations 918, Figures 8 and 11. The serrations 918 preferably provide upper facets 919 angularly disposed, and lower facets 920 disposed in horizontal planes, the facets 919 permitting the stack of insertions in the supply to ride down the rearward face of the partition 123 with the least resistance, and the facets 920 resisting upward climbing of the insertions along the surface of the partition 123.

The insertion grippers

The gripper, shown generally at 121, Figure 7, oscillates with the shaft 163 mounted pivotally in the end brackets 126 and 126', the shaft 163 oscillating once during each cycle of the machine. The downwardly directed arm 164, one forward of each insertion supply station, is keyed to the shaft 163 and carries the fixed and movable jaw members 165, 166, respectively. The jaw 165 is fixed to the arm 164; the jaw 166 pivots in the arm 164 at 167.

Pivoted in the arms 164 and extending through the several arms 164 at the several supply stations, is the shaft 168 common to all. The shaft 168 oscillates once during each cycle of the machine to actuate the movable jaw 166 into and out of engagement with the fixed jaw 165 in timed relationship with the oscillation of the arm 164 and with the rest of the machine. Incident to each arm 164 and each insertion supply station, is the jaw actuating crank disc 169 keyed to the shaft 168. The connecting rod 170 transmits movement from the crank disc 169 to the movable jaw 166 to move the jaw away from the fixed jaw 165 against the action of the tension spring 171. The spring 171 insures firm engagement between the jaws 165 and 166 regardless of lost motion which may have developed due to wearing of the parts.

Each arm 164, one at each insertion supply station, oscillates toward and away from the insertion supply, and is so timed in its movement to reach the proximity of the table after the vacuum cups 137 have selected the lowermost insertion from the supply on the table, deflected it downwardly, and positioned it in engagement with the holding surface 916 in the path of the gripper member 121. When the arm 164 has moved to position the jaws 165 and 166 respectively below and above the related insertion, the shaft 168 is oscillated to close the movable jaw 166 against the fixed jaw 165 to engage and grip the insertion. The shaft 163 thereupon swings in the opposite direction, to pull the selected insertion out of the stack. The arm 164 swings to the left to the position shown in Figure 7, passing over the insertion transporting mechanism, which travels along the line 106. While the arm 164 moves toward the insertion transporting mechanism, the jaw actuating shaft 168 is oscillated to move the movable jaw 166 away from the fixed jaw 165 to release the insertion and permit it to fall onto the table of the insertion transporting mechanism.

Insertion selector and gripper operating mechanism

The selectors 120 and grippers 121 are operated from the main drive shaft 175 of the machine, which rotates once for each cycle of the machine. Keyed to the main drive shaft 175 is the crank 176, Figure 14, connected to the arm 177 of the three-armed lever 178 by the connecting rod 179. The three-armed lever 178 is mounted to rotate on the back drive shaft 180.

The drive shaft 180 is mounted in the bearing brackets 181 supported by the main bed plate 110, Figures 4 and 14, and additionally supported by the braces 182 extending to the legs of the machine. The back drive shaft 180 is rotated by the three-armed lever 178 acting as a pawl actuator, in a manner and by a mechanism hereinafter described, for a purpose which is unimportant in the understanding of the immediate subject matter. For our present purpose it is sufficient to note that the three-armed lever oscillates freely on the back drive shaft 180, as illustrated in Figure 14, to oscillate the gripper carrying shaft 163. The arm 183 of the three-armed lever has the connecting rod 184 pivotally connected thereto, the opposite end of the connecting rod 184 being pivoted at 185 to one arm 186 of the bell crank lever 187 keyed to the gripper carrying shaft 163.

The pivot 185 is adjustable longitudinally of the arm 186, slidably in the guideway 188, to regulate the extent of oscillation of the shaft 163 and govern the throw of the gripper arm 164. It will be clear from the structure that the arm 164 makes a complete oscillation once during each rotation of the main drive shaft 175.

Upper and lower back cam shafts 190 and 191, respectively, are driven by the sprocket chain 192 over the sprockets 193 and 194, on shafts 190 and 191, respectively. See Figures 4, 5A, 6B and 7. The chain 192 is driven from the main drive shaft 175, the drive including driving sprocket 189, keyed to the shaft 175, and the idler sprocket 195 which rotates on the bearing 196, Figure 4, slidable in the guideways 197 for adjustment to take up slack in the chain. The cam 148, Figure 7, on the lower back cam shaft 191, operates the insert selectors 120 by oscillating the vacuum cups 137 in the manner hereinbefore described. The upper back cam shaft 190 operates the gripper and gripper jaws, the operation being in timed relationship with selectors 120.

The cam 199, Figure 14, mounted on the upper back cam shaft 190, actuates the cam follower 200 against its weight and the weight of mechanism it carries. The cam follower 200 is mounted to rotate on the pusher rod 201, which is pivoted at 201' to the wiper cam lever 202 and oscillates the wiper cam on its pivot 203. The cam follower roller 204 rides on the surface 205 of the wiper cam 202 each time the shaft 163 oscillates. The wiper cam follower 204 is mounted on the lever arm 206 keyed to the shaft 168, which shaft pivots in the arm 186' of the bell crank lever 187, and also pivots in the several arms 164, at each of which there is positioned a jaw actuating crank disc 169 keyed to the shaft 168.

The pivot 203 of the wiper cam lever 202 is mounted in the bearing bracket 207, Figure 4, slidably in the slot 207', to adjust the position of the pivot 203 and regulate the movement of the wiper cam surface 205 to time the opening and closing of the jaws 165, 166 to the swing of the arm 164. The wiper cam lever 202 is held to its plane of movement by the guide bar 202', Figure 14.

The drive of the upper and lower cam shafts 190 and 191 is one-to-one with reference to the main drive shaft 175. This affords the timed relationship between the operation of the various mechanisms as hereinbefore described, which function to select an insertion and transfer it to the insertion transporting means in proper timing with the rest of the machine.

The valve 153 is operated from the lower back cam shaft 191, Figures 5A, 6B and 17. Pivoted at 208 is the lever arm 209 which carries the cam follower 210 actuated by the cam 211 against the tension of spring 212. The cam 211 is fixed to the cam shaft 191. Pivotally connected to the lever 209 is the connecting rod 213, the opposite end of which is pivotally connected to the valve slide member 214 through the pivot member 215. The cam 211 is so shaped, and so positioned circumferentially of the shaft 191, that it applies vacuum to the cups 137 and shuts off the vacuum in timed relationship with the operation of the selector mechanism, as hereinbefore described more fully.

Micrometric adjustment stop

Attention is now directed especially to Figures 7, 8, 12 and 13, which show the stop mechanism, one for each insertion supply station 102, 103, 104 and 105, adjustable micrometrically for stopping the machine in the event any but the desired insertion is taken to be fed to the envelopes. The stop mechanism operates responsive to an erroneous selection of insertions at the supply station, and before the insertions have progressed further toward the inserting station.

The stop mechanism comprises the lower backing roller 217 and the upper follower roller 218, each insertion supply station being equipped with a set thereof. The rollers 217, 218 are positioned in the path the insertion takes when transferred by the jaws 165, 166 from the holding surface 916 to the transporting mechanism along the line 106. The lower roller 217 is adjustably mounted in fixed position; the upper roller 218 is mounted to swing toward and away from the roller 217 on the two-armed lever 219 pivoted at 220 in the bearing bracket 221 fixedly mounted on the front face of the partition 123. The roller 218 is urged toward the roller 217 by the tension spring 216.

The roller 218 is mounted on the short arm of the lever 219. At the far end of the long arm is the knife edge receiving groove 222. The knife edge 223 is mounted to pivot on the rock shaft 224 which extends along the machine throughout the several insertion supply stations. The rock shaft 224 oscillates once during each cycle of the machine to oscillate the knife edge 223 with it upwardly out of range of the lever 219, and downwardly into engagement with the knife edge receiving groove 222. If the knife edge 223 misses the groove 222 in any oscillation, it operates to stop the machine and at the same time it lights an indicator light 255 to call attention to the insertion supply station which requires attention.

The rollers 217 and 218 are ball bearinged for easy rotation. The follower roller 218, describing an arc around the pivot 220 as a center, is held spaced away from the roller 217 a distance measured by the micrometric thickness of the insertion passing between the two rollers. This spacing is exactly sufficient to place the knife edge receiving groove 222 in the path of the knife edge 223 when no more nor less than the desired insertion passes between the rollers 217, 218. The ratio between the long and short arms of the lever 219 is high; in practice a ratio of between six- and seven-to-one is found satisfactory. By this means a slight actuation of the roller 218, such as is caused by a thickness of paper passing between the rollers, is sufficient to cause a sufficiently extensive lateral displacement of the knife edge receiving groove 222. When more or less than the desired amount of insertions pass between the rollers 217 and 218, for example, when the selector 120 fails to select an insertion, or when the gripper jaws 165, 166 fail to take the insertion, or when the gripper jaws carry two or more pieces of insertion material through the rollers 217 and 218, the groove 222 is deflected to one side or the other of the path of the knife edge 223 in its downward movement.

The lower roller 217 is mounted adjustably, as illustrated in Figures 8 and 12, on the bracket 225. Screws 226 attach bracket 225 to the main bed plate 110. The bracket 225 is supported on the compression springs 227, the screws 226 operating to compress the spring to hold the bracket 225 in adjusted position spaced from the bed plate 110, and the roller 217 is in position of adjustment relative to roller 218. Guide bracket 228 fixed to the bed plate 110 provides a vertical guiding surface for the bracket 225 and a surface to support the bracket 225 against the pressure of the roller 218. The screws 226 provide the only adjustment necessary to regulate the stop mechanism responsive to a predetermined insertion. This stop mechanism is especially important when but a single insertion of any particular supply is to be placed in each envelope, and it provides an accurate detector responsive to micrometric variations in paper thickness which is reliable, for example, when statements of account, or cheques are to be mailed to a plurality of addresses.

The knife edge 223 is mounted on the arm 240 of the pivot member 230 to rotate on the shaft 224. See Figures 8 and 13. The stop 231 is fixed to the shaft 224, as shown, in a manner to afford lost motion between the pivot member 230 and the shaft in the rotation of the shaft in the counterclockwise direction in Figure 8. The knife edge 223 is actuated with the shaft 224 in the counterclockwise direction, Figure 8, by the tension spring 232 which urges the pivot member 230 into engagement with the stop 231. As the shaft 224 oscillates beyond the point of engagement of the knife edge 223 with the knife edge receiving groove 222, the member 230 is held against further rotation while the shaft continues to rotate in the pivot member 230 until it reaches its extreme extent of rotation.

Now referring to Figure 4, the cam 233, mounted on the upper rear cam shaft 190, operates to oscillate the shaft 224. The cam follower 234 is mounted on one arm of the lever 235 pivoted on the pin 236. The cam actuates the follower against the tension of the spring 237, which engages the other arm of the lever 235. The lever 238 fixed to the rock shaft 224 is connected to the lever 235 by connecting rod 239 to complete the mechanism between the cam 233, the rock shaft 224, and the knife edge 223.

Attached to the arm 240 of the pivot member 230 is the downwardly directed plunger 241, Figures 7, 8 and 13, in line with the push button 242. The plunger 241 is adjustable toward or away from the push button 242, as shown, by the screw and nut construction 243. The push button 242 is spring actuated by compression spring 244, to actuate the contact member 245 into engagement with the terminals 246 of the relay switch 247. When the knife edge 223 misses the groove 222 in any stroke, the plunger 241 actuates the push button 242, to break contact between the contact member 245 and the terminals 246, to open the circuit to the relay and stop the machine.

Extending upwardly from the pivot member 230 is the finger 248 with the pin 249 positioned to be engaged by the hook 250, Figure 13. The finger 248 is so positioned as to engage one arm 251 of the lever 252, when the knife edge 223 misses the groove 222. The other arm 253 of the lever 252 is then brought in contact with the terminal 254 to close the circuit to the electric light 255. The finger 248 is insulated to prevent grounding when it engages the contact lever 252.

So long as the knife edge 223 engages the groove 222 in each counterclockwise oscillation of the pivot member 230, the plunger 241 is withheld from engagement with the push button 242 and the finger 248 is withheld from engagement with the arm 251 of the lever 252. If for some reason, as previously described, for example, when an undesired insertion selection is made, the knife edge 223 misses the groove 222, and with continued movement of the rock shaft 224 the arm 240 will continue to move downwardly under tension of the spring 232 to cause the relay switch to open to stop the machine. Simultaneously, the finger 248 actuates the arm 251 of the lever 252 to close the circuit of the electric light 255 to indicate which insertion supply station requires attention.

When it is desired to render any insertion supply station 102, 103, 104 or 105 inoperative, the hook 250 is positioned to engage and hold the pin 249 to prevent oscillation of the incident pivot member 230 with the rock shaft 224. In this manner the plunger 241 is withheld against engaging and actuating the button 242 to operate the relay switch, and the finger 248 is withheld from actuating the lever 252 to close the circuit of the light 255.

Attached to the long arm of the lever 219 is the abutment member 256, Figure 8, in position in the path of the gripper arm 164. Each time the gripper arm is oscillated with the shaft 163 in the counterclockwise direction, Figure 8, to engage the next succeeding insertion taken by the selector 120 from the insertion supply, the arm 164 engages the abutment member 256 to lift the roller 218 against the tension of the spring 216 out of contact with the roller 217. The rod 257, mounted fixed to bearing bracket 221, carries one end of the spring 216, the other end of the spring being fixed to the lever 219, as shown in Figure 8.

By mechanism described, the roller 218 is held out of contact with roller 217 during each stroke of the arm 164 to the right until after the arm has begun to swing in the clockwise direction, Figure 8, and until the gripper jaws 165 and 166 have carried the insertion to a position between the rollers 217, 218. By this means the leading edge of the insertion does not strike the rollers 217, 218, and this averts danger of the insertion becoming injured.

If it is desired to put any insertion supply station out of operation, the hook 250 is moved into engagement with the pin 249 to hold the knife edge 223 in its extreme upward position. The rock shaft 224, thereafter, oscillates idly at that particular insertion supply station. The vacuum line pet cock 156 of that station is closed to cut off vacuum supply to the cups 137, and no insertions are placed on the table 122. The selector 120 and the gripper 121 at that station perform their mechanical movements idly.

If insertions are placed in a supply station, and the pet cock 156 turned to apply vacuum to the cups 137, the machine will operate in the normal manner with the stop mechanism rendered inoperative by the hook 250 engaging the pin 249. The machine may be so operated if it is not necessary to insure that an exactly predetermined number of any particular insertions be projected into each envelope.

INSERTION TRANSPORTATION MECHANISM

Mounted on the main bed plate 110, Figure 7, are the rear and front guide rails 260 and 261, respectively, which provide a channel to contain the insertions while they are being transported along the line 106 to the inserting station at 108. The near guide rail 260 is fixed. The front guide rail 261, guided by slots 261', is movable toward and away from the rail 260 as seen in Figure 20, to adjust the channel to the width of insert material. The rails 260 and 261 encompass the insert supply position 100, and extend from a position forwardly of the insertion supply station 102, past the several stations 103, 104 and 105. As illustrated, the rear rail 260 extends farther into the inserting station at 108 than the forward rail 261, to provide a rearward stop for the inserts to hold them in position to be acted upon by the inserting mechanism. As will appear more clearly hereinafter, the terminus of the rail 261 provides a guideway laterally of the line 106 for the inserts during the inserting operation. Positioned in a gap in the main bed plate 110, and also extending throughout the insert supply station 102, is the sprocket chain 262 which transports the insertions to the inserting station, and for this purpose the upper leg of the chain 262 lies approximately in the plane of the main bed plate 110. See Figure 21.

The gripper 121 oscillates transversely across the channel defined by the guide rails 260 and 261, carrying a piece of insertion with it in each travel to the left in Figure 7. The gripper jaws 165, 166 open as they move to the left to release the material and let it fall into the channel while the gripper continues its movement to its extreme leftward position. In the actual operation of the machine the jaws 165 and 166 open after they pass the rail 260 and before they have reached the guide rail 261, the insertion material thus released continuing to travel under its own momentum until it strikes the guide rail 261 where it comes to rest. Projecting upwardly from the guide rail 261 are the stop members 263 comprising a pair positioned at each insertion supply station. The stop members 263 project upwardly, as shown, to prevent the insertion material overriding the rail 261, and to direct it to fall into the channel formed by the guide rails 260 and 261.

As the material falls into the channel formed by the rails 260 and 261, hold-down members 264 and 265, move downwardly to engage the material and hold it in the channel formed by rails 260 and 261. The hold-down members 264, 265 are disposed end to end with a slight gap between them and this gap is approximately at the center of each supply station midway of the length of the insertion. See Figure 2. This gap is wide enough to permit the gripper arms 164, and the jaws 165, 166 to oscillate freely across the channel without interference from the hold-down members. As noted in Figure 2, there are three hold-down members 264, respectively, between stations 105 and 104, 104 and 103, and 103 and 102. The member 265 is stubbed to accommodate the remaining portion of end station 102. A similar stub hold-down is not necessary to accommodate the remaining portion of the last station 105 because of downwardly directed guide means provided at that place which will be described fully hereinafter. The hold-down members extend practically throughout the extent of the insertion supply position 100, the adjacent ends of the several members being deflected upwardly, as shown, enough to prevent the insertions from becoming fouled in their travel along the line 106.

The hold-down members 264 and 265 are attached to the ends of arms 266, all of which arms are keyed to the rock shaft 267. After the arms 266 are positioned to the proper circumferential adjustment on the shaft 267, they are fixedly attached thereto by means of set screws 268. Shaft 267 is operated to oscillate to lift the hold-downs 264, 265 away from the channel between rails 260 and 261 in timed relationship with the oscillation of the arm 164, once in each cycle of the machine by means of the cam 269, Fig. 4, on the upper back cam shaft 190. The cam 269 actuates the cam follower roller 270 mounted on the lever 271 loosely mounted on pivot pin 236. The connecting rod 272, connects the lever 273, fixed to the rock shaft 267, with the lever 271. Tension spring 274 between one arm 275 of the lever 271 and the machine frame operates to hold the follower roller 270 against the cam 269 and to urge the hold-downs 264, 265 toward the bottom of the channel between the rails 260 and 261.

The base 276 of the rail 260 extends into close proximity with the chain on the side toward the rear, and the rail 277 fixedly mounted to the bed plate 110 confines the chain on the other side. The rail 261 is positioned forward of the rail 260 beyond the chain confining rail 277, and is adjustable toward and away from the rail 277, to adjust the width of the channel between rails 260 and 261, as hereinbefore described in connection with Figure 20. Elements 276 and 277 thus function to enclose the sprocket chain 262 to prevent insertion material from becoming fouled in moving parts of the machine. The rail 277 functions to eliminate a gap between the movable chain and the base 279 of the front guide rail 261, which gap would otherwise result from adjustment spacing the rail 261 away from the rail 260. The gap formed by the space between rail 277 and rail base 279 cannot be a source of trouble because there are no moving parts therein. To further avoid fouling of insertion material I provide the shield band 280, attached, as illustrated in Figure 21, to under surface of the bed plate 110 at its opposite ends, which band 280 rests on the top surface of the sprocket chain 262 with the insertion actuating pins 295 projecting up on opposite sides of the band. The band 280 is preferably of flexible material, for example, clock spring steel, and extends throughout the scope of travel of the top leg of the sprocket chain 262, which slides along the bottom surface of the band 280. The construction described effectively prevents insertion material from becoming fouled in the moving parts of the machine.

The chain 262 is further housed by the shield 278 fixed to the bed plate 110 at the end of the machine, to prevent injury to the machine operator by inadvertent contact with the chain.

*Insertion transportation drive*

The sprocket chain 262 rides on the drive sprocket 281, Figure 21, and the idler sprocket 282. The idler sprocket 282 is mounted on the shaft 283 in bearings 284, Figure 6B, in the bearing brackets 285 fixed to the under surface of the main bed plate 110. The drive sprocket 281 is keyed to cross drive shaft 286, mounted on the main bed plate 110 in bearings 287, 288, Figure 6A, which shaft 286 extends from the rear to the front of the machine. The rear end of the shaft 286 carries the bevel pinion 289, which meshes with the bevel gear 290 keyed to back drive shaft 180. There is a four-to-one gear ratio between the gears 290 and 289 to provide a drive whereby the cross drive shaft 286 makes one complete revolution for each quarter revolution of the back drive shaft 180.

The shaft 180 is driven by the ratchet 291, Figure 14, and is operated to rotate by means of the pawl 292 mounted on the arm 293 of the three-armed lever 178. The three-armed lever 178 is driven in the manner hereinbefore described from the main drive shaft 175 through the crank 176 and connecting rod 179. There are four teeth 294 in the ratchet 291, and the pawl 292 swings the distance between successive teeth with each oscillation of the three-armed lever 178, or with each turn of the crank 176. Therefore, the shaft 180 turns through one-fourth of a revolution during a complete rotation of the main drive shaft 175 and, accordingly, the cross drive shaft 286 makes one complete revolution during a revolution of the main drive shaft 175.

However, rotation of the back drive shaft 180, and with it the cross drive shaft 286, is intermittent and takes place during the actuating stroke of the pawl carrying arm 293, or during approximately one half of each revolution of the main drive shaft 175. During the remainder of each revolution of the main drive shaft 175 the shafts 180 and 286 do not rotate, and the sprocket chain 262 is stationary. Thus, each revolution of the main drive shaft 175 comprises one cycle of the machine and a cycle of the operation of each of the principal elements of the machine.

The chain 262 is timed to the movement of the gripper arm 164 which is also driven from the three-armed lever 178. The timing is such that the chain 262 moves while the arm 164 swings toward the insertion supply table, this being its idle stroke. During the active forward swing of the arm 164, when it carries a piece of insertion material from the supply to the transporting chain 262, the chain is stationary and positioned ready to receive the insertion. Each time the cross drive shaft 286 moves it makes one complete revolution, and rotates the drive sprocket 281 one complete revolution. One revolution of the drive sprocket 281 advances the chain 262 the distance between insertion supply stations 102, 103, 104 and 105.

The chain 262 is equipped with pins 295 which project upward from the chain in pairs, one on each side of the shield band 280. One pin of each pair rides between the band 280 and the chain guide rail 277. The other pin rides between the band 280 and the base 276 of the rail 260. The pairs of pins 295 project upwardly far enough to engage the edge of the insertion positioned in the groove formed between the rails 260 and 261 to push the insertion as the chain 262 advances. The pairs of pins 295 are fixed to links spaced apart the distance between envelope supply stations and so positioned as to come to rest between adjacent stations 102, 103, 104 and 105 whenever the chain 262 comes to rest.

Thus, each time the chain 262 moves it advances insertions supplied to it from each station 102, 103, 104 and 105 by the gripper 121 to the next succeeding supply station. The insertion received from station 102 is advanced to station 103, where an insertion from station 103 is placed upon it by the gripper 121 during its next forward movement. Two insertions originating from stations 102 and 103 in successive cycles are advanced from station 103 to 104, where an additional insertion from 104 is placed upon them by the gripper 121 during its next forward movement. Three insertions at station 104, originating in three successive cycles from stations 102, 103 and 104, are advanced to station 105, where an additional insertion from station 105 is placed upon them by the gripper 121 during its forward movement in the next succeeding cycle. The four insertions, thus gathered from the several stations 102, 103, 104 and 105 in four successive cycles, are advanced from station 105 to the platen 296 at the inserting station at 108, in a manner which will be described more fully hereinafter.

While the chain 262 is in motion the shaft 163 is rotating in the counterclockwise direction in Figure 7, actuating the grippers 121, one at each insertion supply station 102, 103, 104 and 105, rearwardly toward the insertions being held by the surface 916 of the hold-down members 913, in position for the respective fixed and movable jaws 165 and 166 to pass above and underneath it. The low portion of the cam 199 now permits the wiper cam lever 202 to fall, which causes the jaws 165 and 166 to close and grip the insertion.

In its rearward position the gripper arm 164 at each insertion supply station, by engagement with the abutment member 256, holds the roller 218 out of contact with the roller 217, and maintains the rollers separated until the lever 164 has moved forwardly out of engagement with the abutment member 256. By that time the insertion has been carried to a position between the rollers 217 and 218. Failure of the gripper at any station 102, 103, 104 or 105 to withdraw an insertion from the supply on the table 122 will position the knife edge receiving groove 222 out of the path of the knife edge 223 on one side of it. In this case the knife edge 223 passes to the right of the groove 222, in Figure 8. If a gripper withdraws more than one insertion from its supply on the table 122, or if one or more insertions at any station are bunched between the rollers 217 and 218, the groove 222 is positioned out of the path of the knife edge on the other side of it. In this case the knife edge 223 passes to the left of the groove 222, in Figure 8. In either event, when a knife edge 223 misses the groove 222 on either side thereof, the machine stops and a light 255 at the incident station gives notice of the location of the trouble.

The grippers 121 begin to move to the left in Figure 7 when the shaft 163 begins its clockwise oscillation and this takes place when the back drive shaft 180, Figure 14, has ceased to rotate and the chain 262 has come to rest positioned ready to receive an insertion from each insertion supply station 102, 103, 104 and 105. When the insertions pass through and beyond the rollers 217, 218, the cam 199 operates to lift the wiper cam lever 202 which then operates to open the jaws 165, 166, to permit the insertions to fall into the insertion transporting channel formed by the rails 260 and 261. The grippers 121 continue their movement to the left in Figure 7 and meantime the selectors 120 move up, under action of the cam 148, to place the vacuum cups 137 into engagement with the lowermost insertions in the stack at each supply station 102, 103, 104 and 105. The cam 211 now operates the valve 153 to apply suction to the several sets of cups 137 which thus engage the lowermost insertion in the stack at the several supply stations to deflect them downwardly out of the plane of the table 122. As the insertions are deflected below the surfaces 916 of the hold-down members 913, the valve 153 is operated by the cam to release the vacuum applied to the cups 137, and the insertions spring into position of engagement with the surface 916, ready to be taken by the gripper jaws 165, 166 when they next move to the right in Figure 7.

After the arms 164 attain their extreme position to the left in Figure 7, incident to the shaft 163 completing its clockwise stroke, the shaft 180 begins to rotate simultaneously as the shaft 163 begins to swing in the counterclockwise direction. Thus, the chain 262 advances insertions from the several stations 102, 103, 104 and 105, a distance equal to the distance between stations, advancing insertions from each station to the next succeeding station, this operation taking place during the idle stroke of the grippers 121 to the right in Figure 7.

*Inserts delivered to inserting station*

Whenever the chain 262 moves to advance insertions from station to station, the accumulated insertions at the last station 105, which comprise the composite insert to be projected into the envelope, are transported to the inserting station at 108. The lugs or pins 295 on the chain 262 project the insert material out of the end of the channel formed by the rear and front guide rails 260, 261 and the material slides onto the platen or table 296. See Figures 2, 19, 20, 21 and 22. It will be noted in Figures 6A and 21 that the sprocket chain 262 extends to the inserting station at 108 but not into it, and that the pins 295 push the inserts before them onto the platen 296. In the operation of the machine the chain 262 moves quite rapidly, and with sufficient speed to throw the insert, which slides across the platen 296 under its own momentum until it strikes the laterally disposed stop rail 297.

In its passage from the channel formed by the guide rails 260, 261 to the platen 296 the insert passes below the spaced apart hold-down fingers 298, which function as a continued hold-down beyond the hold-down members 264 and 265, previously described. The fingers 298 operate to guide the successive inserts downwardly against the top surface of the platen 296. They are supported by the upright bracket 299, fixed to the main bed plate 110 of the machine, which carries the pin 300 forwardly directed across the path the inserts take in passage to the platen 296. The lugs 301, attached to the fingers 298, engage the pin 300 rigidly to hold the fingers 298 in the position shown in Figures 15, 20 and 21. The fingers 298 are preferably constructed of resilient material, for example, clock spring steel, and being downwardly directed curved in the direction of travel of the inserts they project across the edge of the platen 296. So positioned the fingers 298 bear lightly and yieldingly against the top surface of the platen and direct the inserts into engagement therewith. The pin 300 is fastened to the upright bracket 299 by means of the lock nut 302, as shown, which affords rotary adjustment to determine the pressure of the fingers 298 against the surface of the platen 296.

The hold-down fingers 298 operate to guide the insert material below the overriding panels 305 and 306, Figures 20 and 21. The panels 305 and 306 are fixedly mounted on the platen 296 at its rearward edge, and project forward, spaced above the platen across the path of the inserts as they enter the inserting station. The approach edges of both panels 305 and 306 are flared upwardly as at 308 and 309, respectively, to insure that the insert material will pass below them without bunching. The panel 305 is equipped with a flutter gripper 310 loosely pivoted at 307, as shown in Figures 20 and 21, the weight of which flutter gripper rests upon the successive inserts and engage each insert after it passes below the panels 305 and 306 to prevent its rebounding from its impact with the stop rail 297.

The stop rail 297 is mounted fixed to the angle bracket 311 which is adjustable on the platen 296 in the direction of the approach of the insert material in a manner shown in Figure 20, by means of the screw and slot construction 312 shown. This adjustment is very important in the adjustment of the machine to accommodate envelopes of different sizes, as will be described more fully hereinafter. The stop rail 297 is angle-shaped to provide the upright abutment surface 313 and a horizontal panel 314 which lies flat on the surface of the platen 296. The panel 314 is formed with fingers 315 downwardly deflected into grooves 316 in the top of the platen 296 directed toward the approaching inserts, in the manner shown in Figure 20. The fingers 315 operate to guide the insert material up off the face of the platen 296 onto the panel 314 and against the stop rail 297.

Detector stop at inserting station

As each insert passes from the channel formed by the guide rails 260, 261 onto the platen 296 in the manner described, it passes underneath the detector finger 317, Figures 20 and 21, which operates to stop the machine if it is deflected out of normal position. Such deflection takes place when the insert passes out of the desired course defined by the various elements hereinbefore described, as for example, when it strikes the edge of one of the overriding panels 305, 306, which causes the insert to bunch up. The detector finger 317 is downwardly directed and curved in the direction of travel of the insertions, as shown, engaging the platen 296 between the hold-down fingers 298. In the embodiment shown the deflector is of flexible material, in the instant case comprising clock spring steel.

The detector finger 317 is fixed to the forwardly projecting lever 318, Figure 15, pivoted at 319 in the upright bracket 320 fixed to the table which comprises an extension of the insertion supply tables 122. The lever 318 is provided with the plunger 321 in line with the push button 322 of the relay switch 323. The lever 318 is equipped with the set screw and lock nut construction 324 which, as best seen in Figures 15 and 21, is positioned to engage the cross leg 325 of the abutment bracket 326 fixed to the end bracket 126, to limit the downward movement of the detector finger 317 and to adjust it relative to the surface of the platen 296.

The lever 318 projects rearwardly beyond the pivot 319 to counterbalance the forward detector finger carrying arm, and the rearwardly directed arm is provided with a weight 327 adjustable along its length to regulate the sensitivity of the detector.

The mechanism thus far described functions to gather insertions from the several supply stations 102, 103, 104 and 105, and to transport them to the inserting station at 108, Figures 1 and 2, in position as inserts ready to be projected into the envelopes. Before presenting the mechanism which functions to deliver the successive inserts into the successive envelopes, the description will revert to the envelope handling portion of the machine and will be directed to the mechanism for selecting envelopes and transporting them successively to the inserting station at 108, in readiness to receive the inserts.

Envelope Supply

The envelopes are transported in a line at 107, Figure 2, parallel to the line of travel of the insert material at 106, the envelopes beginning their travel at a supply station designated generally at 101.

The supply station comprises a table 330, Figures 1, 2, 3B, 4, 25 and 26, mounted on support posts 331 in a plane spaced above the plane of the envelope handling bed plate 112. Upright brackets 332, also mounted on the envelope handling bed plate 112, Figures 3B, 4, 25 and 26, carry upper and lower cross pieces 328 and 329, respectively, which support the leading partition 333 attached thereto, the partition 333 being the one in the direction in which the envelopes travel away from the supply stack on the table 330. Rearward side partitions 334 and 335, leading and trailing respectively, appearing to the right in Figure 4, are mounted to rest on supply table 330 in fixed position. Forward side partitions 336 and 337, leading and trailing respectively, are adjustable toward and away from partitions 334 and 335 to accommodate envelopes of different widths. The rearward leading side partition 334 is mounted upright fixed to the envelope carrier table 338, which table will be described more fully hereinafter. The rearward trailing side partition 335 is fixed to the top of the envelope supply table 330. The forward leading partition 336 is mounted on the envelope carrier table 338 adjustable toward and away from the opposite rearward leading partition 334. The forward trailing partition 337 is mounted on the envelope supply table 330, adjustable toward and away from the opposite rearward trailing partition 335. The trailing partition 339 of the supply is mounted on the envelope supply table 330 movable toward and away from the leading partition of the supply 333, for adjustment in accordance with the length of envelopes to be used.

The upright partitions 333, 335, 337 and 339, are equipped with leaf springs to apply a slight pressure to the four several edges of the stacked envelopes to cause envelopes to be removed from the stack against a slight friction. Oppositely disposed trailing side partitions 335 and 337 carry the springs 340, downwardly disposed along the inside faces of the partitions, as shown, and each describing a right angle at its lower terminus, comprising a leg 341, Figure 4, lying along the top surface of the table 330. The upper ends of the leaf springs 340 are projected through their respective partitions and attached thereto at 342 on the outside surfaces of the partitions. A similar spring 343, having a similar terminal leg 344, Figure 3B, is attached to trailing partition 339, the upper end of the spring passing through the partition and being fastened to the outer face thereof at 345, in a manner similar to springs 340. The leading partition 331 is equipped with two springs 346, the upper ends of which pass through the partition and are attached to the outer surface thereof at 347, in a manner similar to the other springs. The lower end of the springs 346, however, terminate in a slight deflection 348 which holds the leading edge of the lowermost envelope in the stack yieldingly against the downward pull by the selector to be described.

The envelope supply table 330 is positioned in a plane somewhat above the plane of the envelope carrier table 338, and extends short of the leading partition 333 leaving a gap in the table in which the envelope selecting and feeding mechanisms operate, in a manner to be described fully hereinafter.

The envelope carrier table 338, on which the envelopes are transported from the envelope supply station at 101 to the inserting station at 108 and beyond to the deposit station at 109 is positioned spaced above the envelope handling bed plate 112, in a plane commensurate with the plane of the insertion transporting line 106 and the platen 296. The envelopes are selected, one at a time, from the bottom of the supply stack on the supply table 330, and are brought down successively to the envelope carrier table 338 where they are fed to the envelope transporting mechanism which transports them through the inserting station 108 to the deposit station at 109.

*Envelope selector*

Mounted on the envelope bed plate 112 is the envelope selector, designated generally 349, comprising vacuum cups 350, Figure 25, there being a pair of cups mounted on the arm 351 attached to the bracket lever 352 which is pivotally mounted in the upright brackets 333 on the pivot pin 353. See also Figures 3B, 4 and 26. The arm 354, also attached to the bracket lever 352 is connected to the cam follower lever 355 by means of the connecting rod 356, the length of which can be adjusted as shown. The cam follower lever 355 is pivoted at 357 on the bearing bracket 358 fixed to the envelope carrier bed plate 112. The cam 359, fixed to cam shaft 360, rotates once for each cycle of the machine in a manner to be described hereinafter, and actuates the cam follower roller 361 mounted on the lever 355 to lift the vacuum cups 350 upwardly into the plane of the top surface of the table 330, against the weight of the assembly suspended between pivots 353 and 357, the weight being sufficient for the vacuum cups to recede from the plane of the table 330 when the roller 361 rides on the low part of the cam 359.

The vacuum cups 350 are connected through the vacuum line 362 to the valve 363. See Figures 5A and 6B. The valve 363 is controlled by the cam 364, on the lower back cam shaft 191, Figure 17, through the actuation of cam follower 365 against the tension of the spring 366, which urges the cam follower 365 into engagement with the face of the cam 364, and actuates the lever 367, pivoted on the pin 208. The lever 367 is connected to the valve slide member 368, and the pivot member 369 attached thereto, by means of the connecting rod 370.

The vacuum cups 350 are valve controlled as described to apply a vacuum to the bottom envelope of a pile resting on the table 330 at the time when the vacuum cups 350 reach the top of their stroke and to deflect this lowermost envelope downwardly, as illustrated in Figure 25, with the downward stroke of the vacuum cups and the bracket lever 352, until the leading end of the envelope engages the surface of the feed roller 371.

*Envelope selector and feed drive*

The selector mechanism described, and the feed mechanism including the feed roller 371, are driven from the main drive shaft 175 of the machine, by the sprocket 372 keyed thereto, Figurges 3B, 5B, 6A and 15. The sprocket 372 drives the chain 373, which drives the sprocket 374 splined to the shaft 375.

The shaft 375 is the main camshaft for the envelope handling mechanism, and extends along the movable envelope handling bed plate 112, to rotate in bearings 376 which are mounted fixed to the bed plate spaced apart at intervals along its length, as illustrated in Figures 3A, 3B, 6A and 6B. The sprocket 374 rotates in the thrust bearing 377 fixed to the forward side wall of the main bed plate 110, Figure 15, which holds the driven sprocket 374 in the plane of the driver sprocket 372. This construction enables the shaft 375 to slide in the sprocket 374, as the movable bed plate 112 is moved longitudinally relative to the fixed bed plate 110.

The sprockets 372 and 374 have the same number of teeth so that the cam shaft 375 rotates once for each rotation of the main drive shaft 175 of the machine, and once for each cycle of the machine. Fixed to the end of the shaft 375 is the bevel gear 378 which meshes with the bevel gear 379 keyed to the cross shaft 380, the drive being at a one-to-one ratio. The cross shaft 380 is mounted to rotate in bearings 381, best seen in Figures 3B and 6B, fixed to the movable bed plate 112.

Also keyed to the cross shaft 380 is the drive sprocket 382 which drives the chain 383, which in turn drives the sprockets 384 and 385, each being driven at a one-to-one ratio with the drive shaft 380 from the sprocket 382 and sprocket chain 383. The sprocket 385, as illustrated in Figure 4, is keyed to the countercross shaft 360, which is the cam shaft for the selector actuating cam 359, and which rotates in bearings 360' fixed to the movable bed plate 112. Mounted to rotate in the bearing 387 is the idler sprocket 388 for the chain 383, its bearing 387 being slidable in the slot of the bearing bracket 389, as shown in Figure 3B, to take up slack in the sprocket chain 383. The bearing bracket 389 is fixed to the movable bed plate 112, as shown. The cross shaft 386 is mounted to rotate in the bearings 390 in the bearing brackets 333, which brackets also carry the leading partition 332 as hereinbefore described.

The shaft 386, which carries the roller 384 keyed thereto, also carries the feed roller 371, but the feed roller is not keyed to the shaft. Instead it rotates freely on the shaft 386 under drive from the cam cross shaft 360, in this case operating as a back shaft for the drive from shaft 380.

The driving sprocket 391 is keyed to the shaft 360 to rotate therewith, and drives the chain 392 and the driven sprocket 393 which rotates freely on the shaft 386. The sprocket 393 is fixed to the feed roller 371, and they rotate in unison. The sprocket 393 has a different number of teeth than the sprocket 391, in the instant embodiment of the invention the sprocket 393 having one more tooth than sprocket 391, the actual tooth ratio between 393 and 391 being twenty-one-to-twenty. This enables the roller 371 to rotate at a slightly different time, actually slightly slower, than its bearing shaft 386 which, as hereinbefore explained, is driven to rotate once during each cycle of the machine. This throws the feed roller 371 slightly out of time with the rest of the machine to distribute its wear in a manner as will be understood more fully hereinafter.

*Envelope feed mechanism*

Mounted on the shaft 386, and fixed thereto, is the cam 394, Figure 3B, which actuates the cam follower roller 395 mounted to rotate on the connecting rod 396 which is pivoted to the crank arm 397, fixed to the pivot pin 398, which pin 398 oscillates in bearings 398' mounted on the lower cross pieces 329. The connecting rod 396 is guided to move longitudinally by the guideways 399, straddling the shaft 386. Fixed to the pivot pin 398 is the lever arm 400 providing a clevis 401 carrying a pivot 402 for the lever 403. The lever 403 carries the roller 404, freely rotatable at one end, the roller 404 being adapted to engage the feed roller 371 in opposed relationship therewith for feeding successive envelopes.

At its end extending away from the pivot 402 in the direction opposite to the roller 404 the lever 403 receives one end of the tension spring 405, the opposite end of the spring being fixed to the pin 406 which projects from the side of the lever arm 400. The pin 406 carries the adjusting screw and set nut 407, projecting in position to engage the swinging arm 403 to limit the position of the roller 404 in one direction of swing of the lever 403. The tension spring 405 actuates the roller 404 toward the roller 371 and into firm engagement therewith.

The cam 394 operates the swinging arm 400 in the counterclockwise direction in Figures 3B and 25, once during each cycle of the machine. The tension spring 408 attached at one end to the pin 409 which extends from the end of the crank arm 397, and attached at its other end to the upright bracket 333, operates to urge the cam follower roller 395 against the surface of the cam 394 and tends to rotate the pivot pin 398 in a clockwise direction to urge the roller 404 to swing to the left in Figures 3B and 25.

As hereinbefore explained, the shaft 380 rotates once during each cycle of the machine, and the pivot pin 398 is therefore oscillated back and forth by the cam 394 once during each cycle of the machine. When the lever arm 400 is to the left, in the position of Figure 3B, the roller 404 is to the left of the feed roller 371, and held suspended out of contact therewith by the adjustment screw 407. As the lever arm 400 swings in the counterclockwise direction, the roller 404 engages the feed roller 371 and rolls across its surface during continued swing of the lever arm 400 in the counterclockwise direction. The roller 404 pivots with the swinging arm 403 on the pivot 402, as illustrated in Figure 25, as it rides over the high portion of the surface of roller 371. The lever arm 400 continues to swing in the counterclockwise direction under action of the cam 394, until the roller 404 passes beyond the center line of the feed roller 371, and is held out of contact with the surface of the feed roller 371 by the swinging arm 403 engaging the adjusting screw 407 under tension of the spring 405. The counterclockwise swing of the lever arm 400 is timed to occur when there is no envelope in contact with the surface of the feed roller 371.

During the hereinbefore described operation, the cam 359 has been operating to move the vacuum cups 350 up into the gap between the table 330 and the leading partition 333, and in contact with the lowermost envelope in the supply stack on the table. The valve 363 has also operated to apply vacuum to the cups 350, to engage the selected envelope. The cups have also been lowered, carrying the lowermost envelope with it, which envelope has been deflected into contact with the surface of the roller 371, as illustrated in Figure 25. The pivot pin 398 now begins its clockwise stroke, responsive to the cam 394 and under action of the spring 408, to swing the lever arm 400 to the left in Figure 25. This brings the roller 404 into engagement with the feed roller 371, to the right of its line of center and below its crest, to grip the deflected envelope between the roller 371 and 404. The roller 371, which is constantly driven in the manner hereinbefore described, now advances the envelope, pulling it out of the stack on the table 330, and advancing the envelope into position to be engaged by the envelope transporting mechanism. The roller 404 rides to the left in Figure 25, over the crown of the roller 371, to cooperate therewith to feed the envelope to the transporting mechanism, the roller 404 coming out of contact with roller 371 when the envelope has been fed to the transporting mechanism.

In each direction of movement of the roller 404, to the left and right in Figure 25, it strikes the roller 371 a blow which subjects the feed roller to wear. The roller 371 is thrown out of time with the cycle of operation of the rest of the machine, by the twenty-one-to-twenty gear ratio between the driven and driver sprockets 393 and 391, respectively, as hereinbefore described, to cause the roller 404 to strike the roller 371 at a different point in its circumference in successive blows. The wear of the roller 371 is thus distributed uniformly throughout its circumference.

The described envelope feed mechanism presents one practical embodiment thereof. Other feed mechanism could be substituted. For example, a feed mechanism similar to that employed for feeding insertions, and including a gripper mechanism similar to the gripper mechanism 121 hereinbefore described, could be used for feeding envelopes. Conversely, a feed mechanism similar to that employed for feeding envelopes and comprising a roller similar to 371, could be substituted to feed insertions at one, more or all the insertion supply stations, 102, 103, 104 and 105. For certain types of work it is especially desirable to employ the roller type of feed mechanism at one or the other insertion supply stations, an illustrative example being when insertion material is folded in certain peculiar ways.

ENVELOPE TRANSPORTING MECHANISM

*Envelope transporting mechanism drive*

The envelope transporting mechanism includes the chain 410, which transports the envelopes successively through the machine. The chain 410 is driven intermittently in time with the drive of the insertion transporting means and from the same driving source.

The cross drive shaft 286, as hereinbefore described, is driven from the bevel gear 290, Figure 15, through the bevel pinion 289, and, as hereinbefore explained, the gear 290 is driven intermittently through one-fourth of a turn to drive the pinion 289 and the shaft 286 through one complete rotation. The cross drive shaft 286 projects forwardly through the main bed plate 110 to a position above the envelope handling bed plate 112, and carries the bevel gear 411 keyed thereto at its forward end. The gear 411 meshes with the gear 412, which is splined to the shaft 413 to slide longitudinally thereof, the shaft 413 extending longitudinally of the envelope handling bed plate 112 to the left of the cross shaft 286. See Figures 3A, 3B and 6A. The shaft 413 rotates in bearings 414 fixed to the movable bed plate 112, and in the slide bearing 415 fixed to the main bed plate 110, the bearing 415 providing a thrust surface for the bevel gear 412 to hold it in mesh with gear 411. Held between the thrust surface of bearing 415 and the gear 411 with which it meshes, the gear 412 slides longitudinally of shaft 413 as the bed plate 112 is moved longitudinally of the bed plate 110. Thus, as the movable bed plate 112 moves longitudinally relative to the fixed bed plate 110, it carries the bearings 414 and the shaft 413 with it, the shaft sliding longitudinally in the bearing 415 and in the bevel gear 412.

Fixed to the end of the shaft 413 opposite the gear 412, at the left end of the machine, Figures 3A and 6A, is the bevel gear 416 which drives the bevel gear 417 fixed to the cross shaft 418. The cross shaft 418 rotates in the bearings 419 which are fixed to the movable bed plate 112, Figure 3A. See also Figures 38 and 41. The cross shaft 418 carries the sprocket 420 keyed thereto, which sprocket 420 drives the chain 410. The chain also passes over the driven sprocket 421 and the lower idler sprockets 422 and 423.

The driven sprocket 421 is keyed to the shaft 424, Figures 3B, 6B and 24, which rotates in bearings 425 fixed to the movable bed plate 112. The idler sprocket 422 at the right, Figure 3B, rotates on the stub shaft 426 mounted in bearing brackets 427 suspended from the bottom surface of the movable bed plate 112. The idler sprocket 423 to the left, Figure 3A, rotates on the stub shaft 428 which is mounted adjustably slidable in the slots 430 of the bearing bracket 431 fixed to the bottom surface of the movable bed plate 112. The adjustment of the shaft 428 in the slots 430 enables slack to be taken up in the chain 410. The top leg of chain 410 rides over the driving and driven sprockets 420 and 421, respectively, from right to left along the line of travel of the envelopes 107, held in this path by mechanism to be described.

It will be clear that the chain 410 is driven intermittently because it is driven from the gear 290, and that spaced along the chain are sets of jaws 432, each of which engage the leading edge of an envelope fed to it by the roller 371, to transport it through the machine. See Figure 25. The intermittent motion of the chain 410 is such that each time the chain stops a set of jaws 432 is positioned, as shown in Figure 25, in position to receive an envelope. Another set is positioned at the inserting station at 108 and another set is at the deposit station at 109. Due to the timing of the machine there is an additional set of jaws between the feeding station and the inserting station, and another additional set of jaws between the inserting station and the deposit station. These intermediate stops, however, are idle.

*Envelope passage from supply to transporting*

Supported on the movable bed plate 112 by legs 433, and by the bearings 419 and 425, is the envelope carrier table 338, the legs 433 and bearings 419 and 425 spacing the table 338 a predetermined distance above the movable bed plate 112, in a plane commensurate with the plane of the fixed bed plate 110.

Fixed to the top surface of the table 338, Figures 25 and 26, is the lower guide 437 with the arms 438 which projects in the direction opposite to envelope travel, and which straddles the feed roller 371, as shown. The arms 438 expose a predetermined limited portion of the periphery of the roller 371 to the contact with the envelopes. The guide 437 underrides the envelopes and guides the leading edge of each envelope toward the surface of the table 338, and into the jaws 432, Figure 25. Fixed to the cross piece 332 and projecting downwardly therefrom is the upper guide 439 which overrides each envelope and guides the leading edge thereof to the surface of the table 338, and into the set of jaws 432. The upper guide 439 is preferably resilient and, in the instant practice of the invention, comprises a length of clock spring steel, which curves in the direction of travel of the envelope and bears against the surface of the table 338 to hold the envelope down with slight pressure.

The leading side partitions 334 and 336, at the envelope supply station, are provided with the projections 434 and 436 which extend downwardly and in the direction in which the envelopes travel, and rest on the table 338 on each side of the feed station to act as guides for the opposite side edges of the envelopes as they pass through the rollers 371 and 404.

As hereinbefore explained, the roller 371 rotates continuously and, with the roller 404 operating opposed to it as described, it draws the envelope off of the surface of the table 330 projecting the leading edge of the envelope downwardly and forwardly towards the transporting table 338, the envelope being guided laterally by the projections 434 and 436. The upper guide 439 and lower guides 437 and 438, guide the leading edge of the envelope at the proper angle to slide along the surface of the table 338 and into the set of jaws 432, which are open at this time in the cycle of operation of the machine. The rollers 371 and 404 continue to project the envelope well into the jaws, which close at this instant through the action of mechanism to be described hereinafter. During the projection of the envelope into the jaws 432, the roller 404 has been riding across the crown of the roller 371 until it passes out of engagement with roller 371 when the leading edge of the envelope has attained the desired advanced position in the set of jaws 432.

*Gripper jaw structure*

Each set of envelope gripping jaws 432, shown in detail in Figures 27 and 28, comprise the jaw 440, fixed with reference to a link 443 of the sprocket chain 410 to which it is attached, and stationary with reference to the cooperating movable jaw 441.

Each fixed jaw 440 straddles one of the links of the chain 410 and comprises the side panels 442 positioned to house the link 443, the side panels being joined across the top face of the link 443 by the cross piece 444 which constitutes the jaw face of the fixed jaw 440. The jaw 440 is fixed to the link 443, by pins 449 and 450, which constitute the leading and trailing pivot pins, respectively, for the link 443, and which replace the usual link pivots.

The movable jaw 441 comprises a two-armed lever which pivots on the leading link pivot 449 of link 443. One arm of the lever is disposed in a trailing direction, and carries the jaw head 446 with the jaw face 447 which coacts with the jaw face 444 of the fixed jaw 440. The head 446 is provided with a notch 446' for manually opening the jaws whenever desired. The other arm of the movable jaw lever is downwardly directed, and straddles the link 443 to provide the tail pieces 448.

Each tail piece 448 provides an anchor for one end of a tension spring 452, the opposite end of each spring being anchored to one of the arms 453, as shown. Each arm 453 projects from the side panel 454 of the jaw closing member 451, attached to the link 445, spaced away from the link 443 a predetermined number of links in the leading direction of the chain. The jaw closing member 451 is attached to the link 445 by the leading and trailing pivot pins 455, 456, respectively, which function as link pivots and replace the usual link pivots for the link 445. The panels 454 are joined by cross piece 457 over the face of the chain link, the cross piece 457 and side panels 454 straddling the jaw closing link 445.

The spring 452 urges the jaw faces 447 and 444 into closed condition and holds them closed as the chain travels. The jaws are opened at predetermined points in the chain's travel, for example, by an actuating finger 479 engaging the abutment surface 458 of the tail piece 448, in a manner and by means to be described hereinafter. The side panels 442 of the fixed jaw 440 provide upwardly directed arms 459 positioned on opposite sides of the movable jaw member 441, which provide a limiting stop for the leading edge of an envelope when it is projected into the jaws 432. This prevents the envelope from becoming fouled in the throat of the jaws.

Projecting laterally from each side panel 442 of the fixed jaw 440 is the guide vane 460 which guides the travel of the chain 410 and the jaws 432 along the envelope transporting table 338 and holds the successive envelopes in the plane of the surface of the table. The jaw closing member 451 is also equipped with guide vanes 461, similar to the vanes 460, which further insure that the chain 410 maintains its proper line of travel, and that the envelopes rest on the surface of the table 338.

Chain travel

The envelope transportation table 338 comprises rearward and forward panels 464 and 465, respectively, appearing at the right and left in Figures 7, 14, 15, 16, etc., and also in Figures 26, 29 and 31. Attached to the top surface of the panel 465 is the guide rail 466 extending throughout the length of the machine from the envelope feed position opposite rollers 371 and 404 to the deposit station at 109. The guide rail 466 is held in position by the cleats 462, adjustable forwardly and rearwardly of the machine by means of the screw holes 463, to place the rail 466 in line with the forward side partitions 336 and 337 at the envelope supply station at 101, the adjustment being made in accordance with the width of the envelope. The guide rail 466 operates as a backing guide for the side edge of the envelope, i. e., the edge opposite the flap, and is provided with the overhanging ledge 467 which serves to hold the edge of the envelope down toward the surface of the table 338.

The front and rear panels 464 and 465, respectively, of the table 338, are positioned spaced apart to form a channel wide enough to permit the jaw member 440 and the jaw closing member 451 to ride freely therein, guided by the opposite edges of the respective panels 464 and 465. Attached to project downwardly from the lower surfaces of the respective panels 464 and 465, at the chain guiding edges thereof, are the chain guide rails 468 and 469, respectively, provided with the grooves 470 and 471, each of which receive a guide vane 460 of the jaw member 440 and a vane 461 of the jaw closing member 451, to guide the chain in its travel along the table 338. The grooves 470 and 471 fix the travel of the jaws to maintain the envelopes in the plane of the top surface of the table 338, as they are pulled from the feed station at 101 to the deposit station at 109.

Jaw actuation at feed station

The cam 472, Figures 6B and 25, fixed to the cross shaft 380, which, as hereinbefore explained, is driven from the main cam shaft 375 of the envelope handling mechanism to rotate once for each cycle of the machine, operates to open the set of jaws 432 which come to rest at the envelope feed station when the chain 410 stops motion during a given cycle of the machine. The cam 472 is timed to open the jaws 432 in readiness for the rollers 371 and 404 to feed the leading edge of the envelope into the jaws and is timed to close the jaws after the leading edge of the envelope has been projected well into them.

The pivot pin 473 is mounted in the bearing bracket 474, Figures 6B and 25, fixed to the movable bed plate 112. The pivot pin 473 carries the elbow-shaped lever 475 loosely rotatable thereon. The lever 475 comprises the crank arm 476 and the actuating arm 477 fixed together by means of the cross pin 478, the pin 478 spacing the actuating arm 477 out of the plane of the crank arm 476 and into the plane of the chain 410, as illustrated in Figure 6B. The actuating arm 477 is bifurcated, its tines comprising the actuating fingers 479 which open the jaw by engaging the abutment surface 458 on the tail piece 448 of the movable jaw member 441.

The cross pin 478 carries the sleeve 480 which operates as a cam follower roller coacting with the face of the cam 472, the weight of the lever 475 resting on the cam to hold it in engagement therewith. The cam 472 operates once during each cycle of the machine to actuate the bifurcated arm 477, its fingers 479 then engaging the abutment surfaces 458 to lift the movable jaw 441 away from the fixed jaw 440. This action takes place when the chain 410 has come to a stop and has placed a set of jaws 432 in position at the envelope supply station, as illustrated in Figure 25, to receive an envelope. When the envelope has been projected into the jaws, the timing of the cam 472 is such that the actuating fingers 479 retract from the abutment surfaces 458 to permit the jaws to close and grip the leading edge of the envelope.

With an envelope engaged by the set of jaws 432 the chain 410 resumes motion and advances to carry the incident set of jaws 432 away from the feed station, and to bring the next succeeding set of jaws into position at the feed station to receive an envelope during the next cycle of operation of the machine.

*Flap opening*

As the jaws 432 leave the envelope feeding station, illustrated in Figure 25, they advance toward the inserting station at 108 but they stop once in their travel to the inserting station, this stop being idle and only incidental to the timing of the machine. During their travel from the feeding station to the inserting station the flap opener, illustrated generally at 114, operates to open the envelope flap.

The mechanism for opening the flaps is illustrated in Figures 2, 3B, 7 and is shown in detail in Figures 29 and 30. It comprises an envelope deflecting hand 481 and a flap directing vane 482, the former being cam operated. As the envelope leaves the feed station its side edge, i. e., the flap edge, is positioned adjacent the rearward edge of the table 338, guided there by the rearward side partitions 334 and 335 at the envelope supply station and feeding mechanism. The flap edge of the envelope is held in position adjacent to the rearward edge of the table 338 as it travels through the machine by the guide rail 466.

The cam operated deflecting hand 481 operates in the gap 483 along the rear edge of the rear panel 464 of the envelope transportation table 338. The hand 481 is fixed to the lever arm 484 mounted to pivot in bearing brackets 485 fixed to the underside of the panel 464, see Figures 6B and 7. Mounted to pivot in the bearing bracket 486 fixed to the movable bed plate 112 is the cam follower lever 487, spring actuated toward the cam 488 by means of the tension spring 489. The lever 487 carries the cam follower roller 490 intermediate of its length, and at its end the lever is pivoted to the connecting link 491 which is pivotally connected to lever arm 484.

The cam 488 is fixed to the main envelope control cam shaft 375, and actuates the cam follower roller 490 against the tension of the spring 489 to swing the cam follower lever 487 in the clockwise direction and to the right in Figure 7. This causes the envelope deflecting hand 481 to rotate in the counterclockwise direction by actuation of the connecting link 491, and to actuate the hand 481 to deflect the flap edge of the envelope downwardly. The hand 481 engages the envelope 492 at its leading corner, immediately before it reaches the flap directing vane 482. See Figure 29. The leading edge of the envelope is caused to sink into the gap 483 in the panel 464 which tends to lift the envelope flap 493 away from the rear panel 494 of the envelope 492.

The flap directing vane 482, Figures 2, 7, 29 and 30, is supported on legs 495 near the front edge of the envelope carrier table 338. Fixed to the legs 495 is the rearwardly directed rigid arm 496 which overrides the envelope in its path of travel. At the rearward end of the arm 496 is the downwardly directed pivot bracket 497 linked with the pivot bracket 498 by means of the pivot pin 499, the brackets 498 being fixed to the top surface of the flap directing vane 482. The flap directing vane 482 extends away from the pivot 499 in the leading and trailing directions with reference to the direction of travel of the envelopes.

In the trailing direction, with reference to the direction of travel of the envelopes, is the shoe 500 in the path of the envelope, which bears on the surface of the panel 464, and which terminates with a nose 501, slightly upwardly deflected to a position between the rear panel 494 and the flap 493 of the envelope. The flap deflecting hand 481 lifts the flap of the envelope away from the rear panel to insure the nose 501 entering between them. In the opposite direction from the pivot, the leading direction with reference to the direction of travel of the envelope, is the arm 502 which projects tarnsversely from the pivot and to the side of the path of the envelope. The arm 502 is suspended over the adjacent edge of the fixed bed plate 110. Attached to the end of the arm 502 is a finger 503, preferably resilient and in the present practice of the invention, constructed of clock-spring steel, which is disposed in the direction of travel of the envelope and rides on the surface of the main bed plate 110 near the forward edge thereof. The finger 503 bears against the surface of the bed plate 110 resiliently and urges the arm 502 to swing upwardly on its pivot 499, thus urging the shoe 501 downwardly into contact with the envelope transporting platen surface in the path of the envelope in line with its flap. As the envelope 492 advances from the feeding station toward the inserting station 108, the nose 501 of the shoe 500 enters between the rear panel 494 and the flap 493. The flap 493 is guided up and over by the smooth curved edge 504 of the flap directing vane 482, until it overrides the forward edge of the main bed plate 110. As the envelope continues to travel it is pressed into contact with the surface of the bed plate 110 by the resilient finger 503.

There is a stop mechanism at the flap opening station 114, indicated generally by numeral 505, which will be described more fully hereinafter.

As seen in Figures 22 and 29, the top surface of the fixed bed plate 110 is depressed at 506, the depression being in the path of the envelope flap 493 when it is in open condition. The resilient finger 503 rides in this depression and guides the flap 493 of the envelope downwardly a trifle out of the plane of travel of the insertion and envelope. Immediately beyond the finger 503 is the insert supporting platen 296 at the inserting station, under which platen 296 the flap of the envelope is guided and held as the envelope takes position at the inserting station at 108.

The insertion transporting front guide rail 261, at its terminus at the inserting station at 108, is provided with a leg 507, directed forwardly of the machine to a position adjacent the forward edge of the main bed plate 110. Disposed in the trailing direction of envelope travel, at the bottom of the leg 507, is the horizontal panel 508, turned up at 509. The panel 508 is disposed between the resilient finger 503 and the insert carrying platen 296 to insure that the envelope flap 493 is guided to a position below the platen 296.

At this point the envelope assumes the position illustrated in Figure 20 with the envelope resting on the surface of the envelope transporting table 338 and the flap directed downwardly and under the platen 296.

*Positioning envelope at inserting station*

As the envelope enters the inserting station at 108 the set of jaws 432 open to release it, and the stop 511 is placed into position to engage the leading edge of the envelope to determine the exact position the envelope occupies at the inserting station. The opening of the jaws and the positioning of the stop 511 are timed to operate in unison in a manner and by mechanism now to be described.

Fixed to the movable bed plate 112 is the bearing bracket 512, Figures 3A, 6A and 23, which carries the cam follower lever 514 pivotally on pin 513, which lever operates to open the set of jaws 432. The lever 514 is urged in the counterclockwise direction, Figure 3A, by its own weight, and carries the cam follower roller 515 intermediate of its length. The cam follower roller 515 rides on the beveled face of the cam 516 fixed to the main cam shaft 375 of the envelope handling mechanism. At the end of the cam follower lever is the abutment surface 517 which engages the abutment surfaces 458 of the tail pieces 448 and actuates the movable jaw 441 out of engagement with the fixed jaw 440 against the tension of the jaw closing springs 452. Opening of the set of jaws 432 to release the envelope at the inserting station is accomplished by the joint action of the chain 410 moving the set of jaws 432 to its position of rest at this location, and the cam 516 actuating the lever 514 toward the approaching tail pieces 448 of the movable jaw 441. The stop 511 falls to rest on the table 338 in time to engage the leading edge of the envelope as it is released by the set of jaws 432.

The cam 518, Figures 3A, 6A and 32, also fixed to the main cam shaft 375 of the envelope handling mechanism, operates to actuate the cam follower 519, mounted to rotate on the cam follower lever 520, against the action of the tension spring 521. The cam follower lever 520 is fixed to the rock shaft 522 which rotates under action of the cam 518. The rock shaft 522, Figures 31 and 32, pivots in the bearings 523, near the forward edge of the envelope transporting table 338 and on the top surface thereof, the rock shaft 522 extending longitudinally of the platen. Fixed to the rock shaft 522 is the abutment collar 524 which coacts with the lever carrying sleeve 525. The lever 526, carried by the sleeve 525, projects from the rock shaft 522 rearwardly to overhang the path of the envelopes, and carries the stop 511 at its end. The stop 511 is bifurcated as shown to permit the sets of jaws 432 to pass freely underneath while the forward and rearward tines, 510 and 510', respectively, rest on the envelope transporting table 338 on opposite sides of the chain 410, and on the forward and rearward panels, 465 and 464, respectively, of the envelope carrier table 338.

Between the sleeve 525 and the collar 524 there is a lost motion connection 527 which permits the rock shaft 522 to continue its clockwise rotation in Figures 31 and 32 after the tines 510 and 510' have come to rest on the table 338, and to rotate in the counterclockwise direction a predetermined amount before operating to lift the stop 511 away from the table 338. This lost motion connection 527 causes the lever 526 carrying the envelope stop 511 to respond only to the highest portion 528 of the cam 518, and to rest on the table 338, while the cam follower roller 519 rides into the deepest portions 529, and over the intermediate high point 530, of the cam 518. The thrust collar 531 on the rock shaft 522 opposes the abutment collar 524 to hold the lever carrying sleeve 525 in engagement with the collar 524.

Timed with positioning of the stop 511 to engage the leading edge of the envelope is a follower actuator 533 which engages the trailing edge of the envelope to project it into engagement with the stop 511, and hold it exactly positioned. The stop 511 and actuator 533 operate to hold the envelope at the inserting station at 108 accurately positioned to receive the insert as it is projected into the envelope. The actuator 533 operates from below the table 338 swinging upwardly above the plane thereof.

Attached to the lower surface of the forward panel 465, and longitudinally thereof near the front edge of the envelope transporting table 338, is the thrust shaft 534 which slides in the bearings 535, Figures 3A, 3B, 6A and 6B. See also Figures 14, 15, 16, 32 and 33. The shaft 534 is actuated toward the right by the cam 536 on the cross shaft 380 geared, as hereinbefore explained, to the right end of the main envelope handling cam shaft 375. See Figure 3B. The cam 536 actuates the cam follower roller 537 pivotally mounted on the cam follower lever 538 intermediate of its length. The cam follower lever is pivoted on the pivot bracket 539 fixed to the movable bed plate 112 and the opposite end of the lever is connected to the collar 540 by means of the intermediate link 541, the collar 540 being fixed to the thrust shaft 534. The cam 536 operated to shift the shaft 534 to the right in Figures 3A and 3B against the tension of the spring 542 attached to the left end of the shaft 534, Figures 3A and 6A, which spring 542 actuates the shaft 534 in its movement to the left.

Attached to the rod 534 is the rearwardly projecting actuating finger 543, Figure 6A, which finger engages the crank arm 544 attached to the pivot pin 545 which rotates in bearing 546 fixed to the underside of the envelope transporting table 338. Attached to the pivot pin 545 is the bifurcated envelope actuator 533 with the tines 547 and 548, respectively, registering with the slots 549 and 550 in the rearward panel 464 longitudinally thereof, respectively forward and rearward of the machine. When the pivot pin 545 is rotated by leftward movement of the thrust shaft 534 under the action of the cam 536, the tines 547 and 548 swing through the openings in the platen 434 behind the trailing edge of the envelope which they engage to push the leading edge of the envelope into contact with the stop 511. This action is so timed that the stop 511 reaches the platen as the follower actuator 533 comes into operation, immediately after the set of jaws 432 has opened to release the envelope to control of mechanism at the inserting station.

The bearing 546, is attached to the under surface of the forward panel 465 by means of the set screw 551 slidable in the slot 552, Figure 6A, to permit the actuator 533 to be adjusted toward and away from the stop 511 when the machine is adjusted to accommodate envelopes of different lengths. As a means to complete this adjustment the actuating finger 543 is attached to the shaft 534 by means of the set screw 553 which can be retracted to permit the actuating finger to be slid along the shaft 534.

*Envelope opening mechanism*

Mechanism is provided to draw the rear and front panels 494 and 555, respectively, of the envelope to receive the insertion projected into it. The mechanism for drawing the rear and front panels 494 and 555, respectively, of the envelope away from each other comprises the upper and lower sets of vacuum cups 556 and 557, respectively. The upper set of vacuum cups is fixed to the rock shaft 522 to move therewith, Figures 16 and 31, actuated by the cam 518, Figure 32, hereinbefore described.

The upper set of vacuum cups 556 project downwardly from the manifold 558 attached to the lever arm 559 by means of the strap 560 which is adjustably attached to the lever arm 559 by screws 561 to position the vacuum cups 556 variably in accordance with envelopes of different widths. The lever 559 is fixed to the rock shaft 522 by means of set screw 559' which enables determination of the lowermost position of the vacuum cups 556, and also enables adjustment longitudinally of the rock shaft 522 to accommodate the vacuum cups to envelopes of different length.

The lower set of vacuum cups 557 project from the manifold 562 attached to the upwardly directed arm 563 of the lever 564 which pivots on the shaft 565. The shaft 565 rocks in bearings 566 attached to the undersurface of the forward panel 465 near the front of the machine. See Figures 6A and 16. The lever 564 is downwardly directed at 567, as illustrated in Figure 16, and has the intermediate portion 568 laterally directed to connect with the upwardly directed portion 563, thus comprising a U-shaped lever 564. Intermediate of its ends, the lever 564 carries the cam follower abutment block 569 which coacts with the cam 569' on the main cam shaft 375 of the envelope handling mechanism, the lever 565 being actuated by the cam 569' against the tension of the spring 570 to raise the cups 557 through the slot 549 in the rear panel 464 of the envelope transporting table 338, and into the plane of the table in contact with the face panel 555 of the envelope.

The manifolds 558 and 562 are, respectively, connected to the vacuum lines 571 and 572, which join at 573 and are connected to the valve 574 common to both sets of vacuum cups 556 and 557. The valve 574 is operated to open and close in time with the movement of the vacuum cups 556 and 557, and in time with the operation of the machine, by means of the cam 575 on the lower rear cam shaft 191. See Figures 5A, 7 and 17. The cam 575 actuates the cam follower roller 576 rotatably on the follower lever 577 intermediate of its ends. The lever pivots on the pin 208 and is connected at its opposite end to the pivot member 578 on the valve slide member 579 by means of the connecting rod 580. The action of the cam 575 to actuate the lever 577 is opposed to the tension spring 581 which actuates the cam follower roller 576 into engagement with the face of the cam 575.

In time with the operation of the vacuum cups 556 and 557, and their valve control, a holder member 582, Figure 16, engages the envelope flap 493 and presses it against the under surface of the insert carrying platen 296. The flap holder 582 slides in guideways 583 on the front face of the fixed bed plate 110, Figure 11. The flap holder 582 is actuated by the lever 584 which overrides the ledge 589, of the angle member attached to the bottom edge of the flap holder, the lever 584 being movable longitudinally of the ledge 589 when the movable bed plate 112 is moved longitudinally of the fixed bed plate 110 to adjust the machine to accommodate envelopes of different length. The lever 584 underrides the cam 585 on the main cam shaft 375 of the envelope handling mechanism. The lever 584 is pivoted at 586 on the pivot bracket 587 mounted on the movable bed plate 112. The cam 585 actuates the flap holder 582 against the action of the tension spring 588.

As the envelopes reach the inserting station at 108, and are positioned by the leading stop member 511 and the follow up actuator 533, fold engaging fingers 590 and 591, Figures 2, 14, 23, 19 and 20, respectively pivoted on the pins 592 and 593, swing laterally into the gap of the envelope formed by the rear and front panels being drawn apart by the respective sets of vacuum cups 556 and 557. The fingers 590 and 591 engage the leading and trailing folds, respectively, of the envelope, between the front and rear panels thereof.

Keyed to the rock shaft 594 which pivots in the bearing bracket 126' and auxiliary bearing bracket 554, are the crank arms 595 and 596 to actuate the fingers 590 and 591, respectively. See Figures 14 and 23. The connecting rod 597 extends from the crank arm 595 to the crank arm 598 of the lever 599 which carries the fold engaging finger 590. A similar connecting rod 600 connects the crank arm 596 with the crank arm 601 of the lever 602 which carries the fold engaging finger 591.

As the rock shaft 594 rotates in the counterclockwise direction, Figures 14 and 23, the connecting rods 597 and 600 are thrust forward to cause the fingers 590 and 591 to swing into the envelope, engage the leading and trailing folds, and hold the envelope spread lengthwise. The fingers 590 and 591 also function to hold the leading and trailing folds of the envelope in a predetermined plane which plane corresponds with the top surface of the platen 296 on which the insertion rests, ready to be projected into the envelope. The rock shaft 594 is oscillated by the cam 603 on the upper rear cam shaft 190, Figure 32, which actuates the cam follower roller 604 rotatable on the cam follower lever 605 keyed to the rock shaft 594, the action of the cam 603 being against the tension of the spring 606 which operates to hold the roller 604 into engagement with the cam 603.

The pins 592 and 593 project upward from the insertion stop rail 297 and the forwardly directed leg 507, respectively, which operate to adjust the spacing of the fingers 590 and 591 to envelopes of different length, as the rail 297 is moved for adjustment to the length of inserts. The crank arms 595 and 596 are adjustable along the rock shaft 594, and held to position of adjustment by set screws 607.

INSERTING MECHANISM

With the envelope in position at the inserting station, held open by the various mechanisms described and precisely placed to receive the insert, and with the insert in position on the platen 296 to be inserted into the open envelope, the insert is projected into the envelope by mechanism which will now be described.

Keyed to the rock shaft 163, which also comprises the shaft hereinbefore described which carries the insertion grippers 121, is the downwardly directed arm 610 which oscillates in unison with the gripper arms 164 in accordance with the oscillation of the shaft 163. See Figures 1, 2, 3B, 4 and 16. The lower end of the arm 610 is bifurcated to present bearings 611 for the shaft 612 which carries the insert projecting fingers 613. See Figures 16, 18 and 19.

The projecting fingers 613 rotate with the shaft 612 in both directions but are pivoted on the shaft with a lost motion connection 614, illustrated in Figure 18, which operates for a purpose to be described hereafter. Keyed to the shaft 612 is the lever arm 615 connected to the cam follower lever 616 by the connecting rod 617. The lever 616 pivots on the downwardly directed arm 610 at 618 and carries the cam follower roller 619 at its end. The lever 616 is urged downwardly by the tension spring 620 which holds the cam follower roller in engagement with the wiper cam 621. The wiper cam 621 comprises a face of the lever 622 which is pivoted on the stub shaft 623 projecting from the end upright bracket 126' at the inserting station. See Figure 5B. The lever 622 is actuated by the cam 624 on the upper rear cam shaft 190, by means of the cam follower roller 625 pivoted on the connecting rod 626 which is pivotally attached to wiper cam carrying lever 622.

The cam 624 operates to lift the lever 616 against the tension of the spring 620. The timing of the rotary cam 624 and the wiper cam 621 is such that, as the arm 610 begins to swing to the left, or clockwise direction in Figure 16, the wiper cam is lifted into active engagement with the follower roller 619 to lift the lever arm 615 and to rotate the finger carrying shaft 612 in the counterclockwise direction until the heads 627 of the fingers 613 rest on the surface of the platen 296. By this means the heads 627 slide along the surface of the platen 296 as the arm 610 swings to the left, the lost motion connection 614 permitting the fingers 613 to rotate on their shaft 612 sufficient to maintain the heads 627 in engagement with the platen 296 throughout the forward swing of the arm 610. Grooves 628 in the top surface of the platen 296, one between the overriding panels 305 and 306, and an additional groove along the outside of each panel, provide guide channels for the three several heads 627.

The heads 627 are forked on their ends, as shown, each fork providing a projecting lip 629 to contact the grooves 628. The insertions are engaged by the notch 630 between the lower lip 629, and the upper projecting lip 631 which overhangs the edge of the insert. The grooves 628 permit the lips 629 to underride the edge of the insert to insure that the insert is engaged by the fingers 613 and pushed thereby to the left in Figures 16 and 18.

As the arm 610 swings to the right in Figure 16 the low portion of the cam 624 permits the lever 621 to fall out of active engagement with the follower roller 619 which, under the action of the tension spring 620, actuates the lever arm 615 downwardly. The spring 620 thus rotates the shaft 612 in the clockwise direction in Figure 16 until the lost motion in the connection 614 is taken up, and thereafter the shaft 612 continues to rotate to lift the heads 627 out of the grooves 628 and above the platen 296. The heads 627 of the projecting finger ride above the surface of the platen 296 throughout the counterclockwise movement of the shaft 163, and throughout the swing of the arm 610 to the right in Figure 16.

*Envelope inserting*

The envelope transporting chain 410 and the insertion transporting chain 262 operating along lines 107 and 106, respectively, in Figure 2, move intermittently simultaneously because of their common drive, and are thus timed to deliver successive envelopes and successive inserts to the inserting station at 108 in unison, in time with the hereinbefore described mechanism for positioning the inserts and envelopes accurately for the inserting operation and also in time with the operation of the inserting mechanism. An insert, pushed by the chain 262, comes to rest on the platen 296, its leading edge in engagement with the stop rail 297. Simultaneously an envelope arrives at station 108, is released by the set of jaws 432, and is engaged between the stop 511 and the trailing pusher 533. The flap holder 582 engages the flap and holds it against the under surface of the platen 296. The upper and lower sets of vacuum cups 556 and 557 move into engagement with the top or rear and bottom or face panels of the envelope. The valve 574 operates to apply vacuum to both sets of cups which now move apart, upwardly and downwardly, carrying the rear and front panels above and below the plane occupied by the insert on the platen 296. The fold engaging fingers 590 and 591 engage the leading and trailing folds of the envelope and hold them spread apart and in the plane of the insert. All these operations took place while the arm 610 was swinging to the right in Figure 16, which is the idle stroke for the projecting fingers 613. During this stroke the fingers 613 were lifted out of the grooves 628 and held above the platen 296 to be out of the way of the insert in its travel from insertion station 105 to its position on the platen 296.

When the arm 610 has attained its extreme rearward position, to the right in Figure 16, the heads 627 of the projecting fingers 613 are permitted to fall in contact with the grooves 628, under action of the cam 624 and the wiper cam 621, and remain in contact with the grooves 628 as the arm 610 moves to the left in Figure 16. The inserts are engaged by the notches 630 in the head 627 and are pushed in front of the fingers 613 guided at their leading and trailing edges between the stop rail 297 and the oppositely disposed end leg 507 of the rail 261.

The overriding panels 305 and 306 are each equipped with downhold elements 632 and 633, respectively, the downhold elements comprising resilient fingers disposed in the direction of travel of the insert as it is projected into the envelope. See Figures 18, 19, 20 and 22. The downhold members preferably comprise clockspring steel which holds the inserts in contact with the top surface of the platen 296 and insures that the inserts maintain the proper plane of travel into the opening of the envelope. The projecting fingers 613 advance to the left in Figure 16 far enough to project the insert well into the envelope, and as they retract from the envelope in their movement to the right they leave the insertion lodged in the envelope.

If, for any reason, the insert becomes fouled in its passage from the platen 296 into the envelope, and there is a bunching of the inserts at this point, it engages the detector finger 634 which operates to stop the machine. The detector finger 634, preferably comprises a length of clockspring steel or some other resilient material, is directed downwardly, and curves forwardly as shown in Figures 15 and 19, to override the rear edge of the envelope transporting table 338, and press against it with slight pressure. The detector finger 634 is attached to the arm 635 which projects transversely from the end of the lever 318, which is the same lever as hereinbefore described in connection with the stop mechanism at the point where the insertions approach the platen 296. The detector finger 634 is adjustable along the arm 635 into the best position to perform its function, this adjustment being in accordance with envelopes of different lengths.

The insert having been projected into the envelope, the upper set of vacuum cups lowers to squeeze the back and front panels of the envelope together in time with the release of vacuum on the upper and lower sets of cups 556 and 557. In this manner the upper set of vacuum cups 556 dips twice toward the envelope transporting table 338, once to engage the rear flap of the envelope, and again to release it. This double dip is accomplished by the two low spots 529 in the cam 518, Figure 32, the intermediate high point operating to hold the set of vacuum cups 556 raised during the inserting operation.

The envelope, with the insert in it, is now ready to be moved away from the inserting station at 108. The leading stop 511 and the trailing pusher 533 retract, the former to a position above and the latter to a position below the table 338, by action of their respective cams 518 and 536. The cam 516 operates simultaneously to permit the set of jaws 432 to close and engage the leading edge of the envelope. The fold engaging fingers 590 and 591 retract out of the envelope and the envelope is ready to be transported to the deposit station at 109 when the chain 410 resumes movement.

Envelope controlled stop mechanism

Mechanism is provided to stop the machine in the event that the envelope selector, indicated generally at 349, fails to deflect the lowermost envelope from the supply stack on the envelope carrier table 330 in any given cycle, or if the envelope feeding mechanism comprising the roller 371 and the vacuum roller 404 fail to withdraw the selected and deflected envelope from the table 330 and feed it to the set of envelope transporting jaws 432, or if the jaws 432 fail to engage the envelopes as they advance away from the feeding station, illustrated in Figure 25. This detector stop mechanism, illustrated generally at 505, is located at the flap opening station at 114 and operates whenever, in any cycle, an envelope fails to advance to the flap opening station. It also operates if the flap opener comprising the flap directing vane 482 fails to open the flap of an envelope and lay it under the insert platen 296.

The envelope controlled detector stop comprises the detector finger 921, Figures 29 and 30, which is directed downwardly to project through the aperture 922 in the flap directing vane 482. The finger 921 is adapted to project through the aperture 922 in the vane 482 and through an aperture 923 in registry therewith through the main bed plate 110. Immediately below the aperture 922 and in registry therewith is the push button 924 spring actuated upwardly by the compression spring 925, and operable to operate the relay switch 926. Upon actuation of the push button 924 by the finger 921 the relay switch is operated to stop the machine in a manner as will be described more fully hereinafter. The detector finger 921 moves up and down once during each cycle of the machine and projects through the aperture 922 of the flap directing vane 482 into engagement with the flap of an envelope anytime an envelope passes through the flap opening station 114 and its flap is opened at that station. At any time an envelope fails to arrive at the flap opening station 114 or the flap opener fails to operate to open the flap of an envelope in any given cycle the detector finger 921 is free to pass through the aperture 923 in the main bed plate 110 and into engagement with the push button 924 to operate the relay switch 926.

The detector finger 921 constitutes the terminus of an arm 927, which, in the shown practice of the invention, comprises a wire bent to the shape illustrated in Figures 29, 30 and 31. The arm 927 is attached to the sleeve 928 which pivots on the rock shaft 522. The sleeve actuating collar 929 keyed to the shaft 522, rotates therewith and provides a lost motion connection between the shaft 522 and the sleeve 928 to rotate the sleeve 928 in opposite directions when the shaft 522 approaches and recedes from the end of its stroke in the counterclockwise direction, Figure 30. Thus, as the shaft 522 approaches the end of its stroke in the counterclockwise direction in Figures 23 and 30, it actuates the sleeve 928, continuing to the end of its stroke to lift the finger 921 up through the aperture 922 in the flap directing vane 482. As the shaft 522 begins its counterstroke in the clockwise direction in Figures 23 and 30, the detector finger 921 drops through the aperture 922 and into engagement with the envelope flap. At this point the sleeve 928 ceases to rotate with the shaft 522 which continues its cycle of operation as hereinbefore described. If no envelope flap is in the way of the detector finger 921 the sleeve 928 will continue its movement with the shaft 522 until the finger 921 has passed through the aperture 923 in the main bed plate 110 and has engaged and operated the push button 924 of the relay switch. A spring may be employed to actuate the detector finger 921 to operate the relay switch push button 924. The holding collar 931 keyed to the shaft 522 holds the sleeve 928 into operative engagement with the actuating collar 929.

It will be noted that the stop mechanism 505 operates before the envelope has advanced to the inserting station at 108 to stop the machine before the inserting operation for any given envelope. In this manner the defect in transportation of envelopes is detected and corrected prior to the inserting operation. This is especially important when the machine is operated to insert a particular insert in a particular envelope for a particular correspondent, as for example, when the machine is operated for preparing cheques for mailing.

THE MOISTENER

In its passage from the inserting station at 108 to the deposit station at 109 the envelope first passes the moistener indicated generally by reference numeral 117. The moistener, Figures 1, 2, 3A, 5B and shown most clearly in Figure 32, comprises a reservoir 641 which supplies liquid to the pad head 642 through the flexible duct 643. A pet cock 644 in the line to the pad head 642 operates to regulate the amount of moisture fed to the pad head 642, and also to cut off the supply of liquid at will, as for example, when the machine is idle.

The pad head 642 is adjustably mounted on the forward end of the lever arm 647, which pivots at 645 on the pivot bracket 646 mounted on the fixed bed plate 110 of the machine. Adjusting screws 648 permit proper location of the pad head 642.

The pad head 642 comprises a housing 649 which provides an inlet for the liquid passing through the flexible duct 643. The housing 649 holds the pad 650 projected downwardly therefrom, above the forward edge of the fixed bed plate 110 in the path of the envelope flap as it leaves the inserting station. Beyond the pivot 645 the lever 647 comprises a rearwardly directed arm 651 with the cam follower roller 652 rotatable thereon. The roller 652 is actuated by the cam 653 on the upper rear cam shaft 190 against the tension of the spring 654 which holds the follower roller 652 upwardly into engagement with the cam.

Along the forward edge of the bed plate 110, as an insert therein, and in the path of the envelope flap, is the perforated trough 655. The trough is disposed below the pad head 642, and in the path of the pad 650 when the lever 647 is rocked in the counterclockwise direction, Figure 32, on the pivot 645 under action of the cam 653.

The cam 653 operates in time with the travel of successive envelopes away from the inserting station at 108, and the timing is such that the pad 650 engages the envelope flap and holds it in engagement with the trough 655 as the envelope slides below the pad in wiping engagement therewith. After the envelope has passed beyond the pad 650, the pad head 642 is lifted away from the trough 655 by the cam 653 so as to be out of the way of the leading edge of the next succeeding envelope.

Excess moisture drains through the perforations in the trough 655, and is conducted by the duct 656 to the pan 657 from which it can be removed from time to time.

ENVELOPE FLAP CLOSER

As the envelope passes beyond the moistener it reaches the flap closer, indicated generally by reference numeral 118, Figures 2, 3A, 5B and 33. The flap closer comprises the flap actuating hand 658, which pivots at 659 on a bracket 660 fixed to the bottom surface of the rear panel 464 of the envelope transportation table 338, the pivot being disposed longitudinally of the platen and along its rear edge, adjacent thereto.

The hand 658 is actuated by the cam 661 on the main cam shaft 375 of the envelope handling mechanism. The lever 662, pivoted at 663 on the bearing bracket 664 fixed to the movable bed plate 112, carries the cam follower roller 665 intermediate its length. The cam 661 actuates the roller 665 to actuate the lever 662 in the clockwise direction in Figure 33 against the tension of the spring 666 which urges the roller 665 into engagement with the cam 661. Pivoted at 667 at the end of the lever 662 is the connecting rod 668 which is also pivoted to the crank arm 669 keyed to the pivot 659.

As the cam 661 actuates the roller 665 the lever 662 swings the crank arm 669 in the counterclockwise direction to rotate the hand 658 around the edge of the table 338 and over into engagement with the top surface of the panel 464. This action takes place as the envelope, upon leaving the moistener, arrives at the flap closer with the leading edge of the flap resting on the hand 658. Actuation of the hand 658 in the manner described turns the envelope flap over and into contact with the rear panel of the envelope. The envelope is in motion being transported from the inserting station 108 to the deposit station 109, and accordingly, the flap wipes under the hand 658 as it passes the flap closer 117, and is adhered to the rear panel of the envelope.

Fixed to the upright bracket 670, which projects upward from panel 465 of the table 338, is the cross arm 671 extending rearwardly across the path of travel of the envelope. See Figure 2. Attached to the cross arm 671 near the rear edge of the panel 464 is the guide vane 672. The guide vane 672 is preferably constructed of resilient material, for example, clock-spring steel, and projects downwardly and in the direction of travel of the envelope along the rear edge of the envelope carrier table 338. The vane 672 bears upon the panel 464 with slight pressure, holding the front and rear panels of the envelope pressed against the surface of the platen. By this means, as the hand 658 swings the envelope flap over onto the rear panel of the envelope, the flap is bound to pivot on the fold line, and the envelope is closed neatly.

STAMP AFFIXING MECHANISM

In its passage from the flap closing station 118 to the deposit station 109, the envelope receives an imprint, or is otherwise treated, to complete its readiness for mailing. For example, a postage stamp may be affixed to or be printed upon the envelope by suitable mechanism and the particular mechanism will depend upon the treatment the envelope is to receive at this point. In the case of affixing postage, the type of stamp to be used, i. e., whether of the printed or adhesive type, determines the mechanism used. In the embodiment shown the mechanism is provided to print a postage stamp on each envelope.

The stamp affixing mechanism employed in the embodiment shown, and seen generally at 119 in Figures 1, 2, 3A, 5B and 6A, and in detail in Figures 34, 35 and 36, is driven from the cross shaft 418, by means of the drive sprocket 675 fixed thereto, intermittently in time with the passage of the envelopes into the deposit station at 109. See Figures 5B, 6A and 38. The drive sprocket 675 drives the sprocket 676 by means of the sprocket chain 677, the sprocket 676 being fixed to the main drive shaft 678 of the stamp affixing mechanism, shown in detail in Figures 34 and 35. The main drive shaft 678 of the stamp affixing mechanism 117 rotates in bearings in the upright bracket 679 mounted on the movable bed plate 112.

Keyed to the shaft 678 to rotate therewith is the printing die 680 which presents a peripheral printing plate 681. In the instant case the printing plate comprises the fixed type 682 engraved in its surface, and the replaceable type 683. The fixed type can include any suitable matter to be printed, such as the name of the postoffice, permit number, and other information present in all stamps affixed to envelopes. The replaceable type comprises data subject to change from time to time, such as the date and year, and the price of postage.

This replaceable type may be mounted in the printing die 680 in any suitable manner. In the present embodiment it comprises the type 683, Figure 36, of any suitable material, fitted to the socket 684 and held in frictional engagement therein by means of the ball 685, backed by the compression spring 686, the spring being held in place in the spring housing 687 by means of the tension adjusting screw 688. The ball 685 is seated to project beyond the inside surface of the socket 684 in yielding engagement with the side surface of the type 683. The type 683 is backed by the backing screw 690 threaded in the hub 691 of the die 680. Purchase holes 692 are shaped to receive a suitable key, not shown, for rotating the screw 690 in either direction to drive the screw radially toward or away from the shaft 678. The position of the head abutment 694 of the screw 690 determines the position of the face of the replaceable type 683, and enables its adjustment into the surface described by the fixed type 682.

Fixed to the shaft 678 is the drive gear 695 for driving the type inking mechanism illustrated generally at 696 in Figure 35. In the upright bracket 679 is the lower rock shaft 697 which carries the pinion 698 rotatably mounted thereon, the pinion being driven by the drive gear 695.

Also mounted to pivot on the lower shaft 697 is the cradle lever 699 which carries the inking mechanism. The cradle lever comprises a downwardly directed lever arm 700 which supports the roller carrying panel 701. Bearing brackets 702 are attached to and project upwardly from each edge of the panel 701 and contain bearings for the driven inking roller 704. The tension spring 705 extends between the eye 706 in the bottom surface of the panel 701, and the pin 707 projecting from the terminus of the spacer post 708 which projects downwardly from the lower surface of the movable bed plate 112. The spring 705 tends to rotate the lever arm 699 in the counterclockwise direction, Figure 35, and thus tends to actuate the inking roller 704 downwardly and away from the printing plate 681. The adjustment screw 709 is threaded through the arm 710 which projects from the bearing brackets 702. The end of the screw 709 abuts against the top surface of the envelope carrier bed plate 112, and moves the inking roller 704 upwardly and toward the printing plate 681 against the tension of the spring 705. The set nut 711 locks the screw 709 to hold the roller 704 in position of adjustment.

Fixed to the pinion 698, to rotate therewith under drive of the gear 695, is the driving sprocket 712, which drives the driven sprocket 713 by means of the chain 714. The driven sprocket 713 is fixed to the inking roller 704 which is thus driven positively. The idler sprocket 718 rotates on the pivot pin 719 which projects from the bracket arm 720. The arm 720 is attached to the screw carrying arm 710 adjustable longitudinally of the arm 720 for movement of the idler sprocket 718 to take up slack in the chain 714.

The inking roll 704 is fed from the ink well 721 which rests on the panel lever 722, supported thereby. The lever 722 pivots at 723 on the main bracket 679 of the stamping mechanism. The lid 724 carries the inking brush 725 which extends downwardly from the lid 724 into the ink in the well 721, and which projects upwardly from the lid 724 into contact with the surface of the inking roller 704, to feed ink thereto by capillary action. The set screw 726 is threaded through the lever 722, and its end abuts against the top surface of the envelope carrier bed plate 112, to provide adjustment for the contact pressure of the brush 725 against the surface of the roller 704. The lock nut 727 binds the screw 726, and holds the brush 725 in adjusted contact pressure.

Keyed to the main drive shaft 678 of the stamp affixing mechanism by set screw 744 is the cam 731 which operates to suspend the hold-down presser roller 732 above the path of the printing die 680 until it has rotated a sufficient distance to bring the leading edge 733 of the die below and past the hold-down roller 732. The purpose of this construction is to prevent the hold-down roller from coming into the path of the oncoming die to be struck and injured thereby.

The hold-down roller 732 is mounted to pivot on the pin 734 fixed to the end of the crank arm 735 keyed to the countershaft 736 which is mounted to rotate in the upright bracket 679 above the main drive shaft 678. Keyed to the countershaft 736 is the lever arm 737 attached to the lever arm 738 by the connecting link 739 pivoted to each. The lever arm 738 pivots on the upright bracket 679 at 740 and carries the cam follower nose 741 which rides on the cam 731. The lever arm 738, extended as shown, includes the abutment member 742 at its end, adapted to be engaged by the stop screw 743 which is adjustable, as shown, to limit the lowermost position of the lever 738, and of the cam follower 741 when it rides along the low portions of the cam 731. The set screw 744 threaded into the hub of the cam 731 permits circumferential adjustment of the cam on the shaft 678 so that the follower 741 does not ride from the high surface 745 to the low surface 746 of the cam 731 until the leading edge 733 of the die 680 has passed below the roller 732.

Attached to the upper portion of the bracket 679 is the support pin 747 which carries the trigger release mechanism of the hold-down roller 732. Mounted to pivot on the pin 747 is the dog 748 swingable into position to engage the tooth 749 in the end of the crank arm 735. The dog 748 functions to hold the roller 732 off of the printing die 680 until an envelope has passed between the roller and the die, the release being actuated by the envelope as it advances. The pin 747 carries the arm 750 on the end of which the trigger 751 is pivoted at 752. The trigger 751 comprises a two-armed lever, one arm 753 of which projects into the path of the leading edge of the envelope as it is advanced along the table 338. The other arm 754 of the trigger lever is connected to the crank arm 755 by means of the connecting link 756 pivotally connected to each. The crank arm 755 is fixed to the pivot pin 757 which pivots in the bracket 758, the bracket being fixed to the pin 747. The opposite end of the pivot pin 757 carries the wiper cam 759 which underrides the dog 748 and lifts it out of engagement with the tooth 749 of the crank arm 735 when the leading edge of the envelope has actuated the arm 753 of the trigger 751. This action takes place immediately after the cam follower 741 has passed beyond the high surface 745 of the cam 731 and has passed to a position above the low portion 746. When the high portion 745 of the cam 731 again engages the follower 741 it actuates the follower to lift the crank arm 735 high enough to set the trigger 751.

Thus, as an envelope approaches the stamp affixing mechanism, the cam 731 lifts the roller 732 away from the die 680 which is being rotated to position of engagement with the roller 732. As the leading edge 733 of the die 680 passes below the roller, the cam 631 permits the roller to fall. However, it is prevented from falling into engagement with the die 680 by the dog 748 engaging the tooth 749 until such time when an envelope, advancing to receive a stamp, actuates the trigger 751 to permit the roller 732 to fall into engagement with the surface of the die 680. In the event that an envelope fails to pass through the stamping mechanism during one or more cycles of the machine, the roller 732 is withheld from engagement with the die 680. Otherwise, it would receive an impression of the ink on its surface. Operation of the stamp affixing mechanism 674 is timed to occur with the passage of an envelope from the flap closing station 118 to the deposit station at 109 because both are driven by a common drive from the cross shaft 418.

Deposit Station

After each envelope passes the flap closing station at 118, and the stamp affixing station at 119, it is carried along the path of transportation at 107 to the deposit station at 109 where it is left by the envelope transporting chain 410. In its advance from the inserting station at 108 to the deposit station at 109, the envelope comes to rest once, but this is an idle stop functioning only incidentally to the timing of the machine.

At the deposit station there is a gap in the table 338, Figures 38 and 39, large enough to accommodate the largest envelope to be handled by the machine and this gap is occupied by a two-piece platen 767, comprising the forward and rearward plates 761 and 762, respectively, in general shaped to conform with the shape of the gap 760. Upon its arrival at the deposit station, the envelope is first positioned at rest upon the platen 767 by the transporting chain 301.

The envelope transporting chain 410, with the envelope held by the set of jaws 432, pulls the envelope to and onto the platen 767. As the links 445 and 443 of the chain 410, which respectively carry the jaw closing member 451 and set of jaws 432, ride over the sprocket 420 the tail pieces 448 of the movable jaw 441 engage the lugs 763, Figures 5B and 6A, disposed on each side of the sprocket 420, and as the jaws 432 advance to this station and come to rest the lugs 763 operate to open the jaws and release the envelope. The positioning of the lugs 763 on the sprocket 420 is such as to time the opening of the jaws as the chain comes to rest, which timing coincides with the envelope reaching the platen 767.

The deposit station platen 767, as illustrated in Figure 39, is shaped to fit the gap 760 in the envelope transporting table 338, the table 338 extending beyond the gap to the end of the machine, the table 338 and the movable bed plate 112 thus providing a housing for the chain 410, and other envelope handling operating mechanism. The guard 764, Figure 39, is attached to the table 338 and provides an enclosure for the chain 410 at the end of the machine.

The deposit station platen 767 consists of the forward plate 761 and rearward plate 762, which move up and down through the gap 760, from the plane of the table 338 to a higher level, in a manner and for a purpose to be described more fully hereinafter. Fixed to the rearward panel 464, along the rear edge of the table 338, is the rearward border rail 765 disposed longitudinally of the machine, and including the end portion 766 projecting toward the front of the machine. The border rail 765 determines the position of the flap edge of the envelope at the deposit station. The end portion 766 determines the position of the leading edge of the envelope as it enters the deposit station, and is positioned with reference to the sprocket 420 to be adjacent the leading edge of the envelope when lugs 763 open the set of jaws 432.

The front border rail 768 is mounted to slide along transverse guideways 769, Figure 39, toward and away from the rail 765 and the screw and slot construction 770 holds the rail 768 in position of adjustment. This adjustment is made in accordance with the width of the envelope, the rail 768, when properly adjusted, determining the position of the side edge of the envelope opposite the flap. In the showing of Figure 39, the rail 768 is adjusted for the narrowest envelopes to be accommodated by the machine.

As an envelope enters the deposit station 109, it passes below the guide vane 771 which is preferably resilient, for example, comprising a length of clock-spring steel, positioned in the path of the envelope along its edge opposite the flap, and disposed in the direction of its travel. The vane 771 is mounted on the bracket 772 which is attached to the forward panel 465 by means of the screw 773. As noted the screw 773 can be threaded into any of several threaded holes 774 disposed in a transverse line to adjust the position of the vane for the accommodation of envelopes of different width. The vane 771 extends away from the bracket 772, longitudinally of the table 338 with its end deflected toward the plane of the table in position to guide the edge of the envelope onto the platen 767 at the deposit station, and within the confines of the front and rear border rails 768 and 765, respectively. The vane 771 continues to hold the envelope down as it advances onto the platen 767.

Mounted on the lower surface of the table 338 is the bearing bracket 775 with the pivot pin 776 mounted to pivot therein. See Figures 3A, 6A and 39. The pivot pin 776 has the crank arm 777 attached to one end thereof, the other end carrying the pusher finger 778 fixed thereto. The crank arm 777 projects across the path of the actuating arm 779, which is attached to the thrust shaft 534, the attachment being adjustable longitudinally of the shaft by means of the set screw 780. The bearing bracket 775 is attached to the bottom surface of the panel 465 by means of the screw and slot construction 775' shown in Figure 6A, to permit adjustment of the pusher finger longitudinally of the table 338 for the accommodation of envelopes of different length. This adjustment is coordinated with the adjustment of the actuating arm 779 longitudinally of the thrust shaft 534 at the time when the machine is set for a new length envelope.

It will be noted that the actuation of the crank arm 777 is timed to take place when the actuator 533 at the inserting station operates to position an envelope to receive an insert because both operations emanate from the movement of the same thrust shaft 534. The timing is such that as an envelope is deposited and released at the deposit station by opening the set of jaws 432 it takes place at the same time when an envelope is released at the inserting station by opening another set of jaws 432. The pusher finger 778 actuates the trailing edge into engagement with the end portion 766 of the rear border rail 765. The guide vane 771 cooperates to hold the envelope down, to make certain that the trailing edge of the envelope is engaged by the pusher finger 778.

In the manner described, the envelope is transported to the deposit station and onto the platen 767, confined sideways within the border rails 765, 768 along opposite side edges of the envelope, and lengthwise between the end portion 766 of the rear border rail and the pusher finger 778.

The border rails 765 and 766 extend above the plane of the table 338 and the platen 767 to enable this confinement.

The platen 767 receives the envelope when it occupies the plane of the table 338 and is movable upwardly out of the plane of the table 338 to deposit the envelope in the stack, each added envelope becoming the lowest one in the stack. The platen 767, is supported by the U-shaped member 781, the U-shaped member 781 comprising the forward beam 782 which carries the plate 761, and the rearward beam 783 which carries the plate 762, the beams 782 and 783 being joined by the bottom cross member 784, Figures 37 and 38.

Attached to the bottom member 784, and projecting downwardly from the U-shaped member 781, is the guide rod 785 which extends through a guide hole in the movable bed plate 112. Attached to the bottom surface of the bed plate 112, and projecting downwardly therefrom beyond the end of the rod 785 is the anchor rod 786. The tension spring 787 connects the ends of the guide and anchor rods 785 and 786 to draw the U-shaped member 781 downwardly toward its lowermost position. In addition to the guide rod 785 there are the forward and rearward guideways 788 and 789 disposed vertically in the respective beams 782 and 783 which function to determine the movement of the platen 767 vertically. The guideways 788 and 789 receive the pins 790 projecting laterally from the chain guide rails 468 and 469, Figure 38.

The U-shaped member is lifted against the tension of the spring 787 by the cam 791 fixed to the envelope cam shaft 375. The bearing bracket 792, projecting downwardly from the bottom member 784 of the U-shaped member 781, carries the cam follower roller 793 in position to be engaged and actuated by the cam 791. The beams 782 and 783 extend upwardly from the bottom member 784 sufficiently to permit the U-shaped member 781 to straddle the envelope transporting chain 410, and its guide rails 468, 469, without interference therewith as the platen 767 moves up and down.

Positioned to rest on the top surface of the rear border rail 765 are the flutter vanes 794 mounted loosely on the U-shaped pins 795, Figure 40. Attached to the border rail 765, as shown, are the clamps 796 which retain the flexible hold-down members 797. The hold-down members 797 are preferably constructed of sheet rubber, and project from below the clamps 796 to override the flutter vanes 794, holding them flush against the top surface of the border rail 765. A similar single flutter vane 798 is attached to the top surface of the front border rail 768, and fits loosely on the pins 799. The flutter vane 798 is held in contact with the top surface of the border rail 768 by means of the flexible hold-down members 801, which project from below the clamps 800. The flutter vanes 794 and 798 are of similar construction and operate in a similar manner to engage the under surfaces of the lowermost envelope at opposite side edges, to support the stack of envelopes at the deposit station 109.

The flutter vanes 794 and 798, respectively, are positioned in the respective cut outs 802 and 803 of the plates 762 and 761, respectively, of the platen 767. Thus, as the platen 767 is lifted by the action of the cam 791, it is raised to a position above the plane of the flutter vanes 794 and 798. With an envelope resting on the platen 767 the edges of the envelope actuate the respective flutter vanes 794 and 798 upwardly which slide and rotate on the pins 795 and 799 out of the way of the envelope until it is lifted beyond the range of the flutter vanes. Thereupon, the flutter vanes snap into engagement with the top surfaces of the forward and rear border rails 768 and 765, respectively, actuated by the respective hold-down members 797 and 801, to provide a support for the envelope as the platen 767 is lowered to the level of the table 338. Thus, each time the platen 767 lifts an envelope upward from the level of the envelope transporting table 338, it deposits the envelope as the lowermost one in the stack resting on the flutter vanes 794, 798.

Attached to the border rails 765 and 768, respectively, are the upright side partitions 804 and 805, the latter being movable toward and away from the former for adjustment to accommodate envelopes of different width, when the front border rail 768 is moved in the guideway 769. The end partition 806 is attached to the end portion 766 of the border rail 765 in a manner similar to the partitions 804 to limit the leading edge of the stack of envelopes. The trailing end partition 807 is movable toward and away from the end partition 806. The trailing end partition 807 comprises the supporting base 808 attached to the forward panel 465 of the envelope transporting table 338, by the screw and slot attachment 809 disposed longitudinally of the table 338. The arm 810 projects upwardly from the foot 808, and the transverse portion 811 projects from the upper terminus of the arm 810 laterally across the line of travel of the envelopes toward the deposit station. The partition 807 terminates in an upright portion 812 projecting upwardly from the end of the transverse portion 811.

The partitions 804, 805, 806, and 807 operate to confine the stack of envelopes at the deposit station, the weight 813 being rested on top of the stack of envelopes to hold them confined.

Attached to the bracket 814, fixed to the panel 465, Figure 39, is the unit counter 815. The finger 816 of the unit counter 815 projects rearwardly in the path of the notch 817 in the forward plate 761 of the envelope deposit platen 767. Each time the platen 767 is lifted by the cam 791 to lift an envelope and deposit it in the stack, the envelope engages and actuates the finger 816 to register on the unit counter that an additional envelope was deposited in the stack. In the downward movement of the platen 767 the finger 816 passes through the notch 817 in the plate 761 and is not actuated.

DRIVE MECHANISM

Referring now to Figures 1, 3B, 4, 5A, and 6B, there is shown the main drive motor 820, which rests on the table 821 supported on the beams 822 attached to the legs 111 of the machine. The main drive motor 820 drives the stub shaft 823 through the belt 824. The stub shaft 823 is a driver of a train of reduction gearing, the detailed construction of which is unimportant for an understanding of the present invention, and is therefore not shown. The reduction gearing is enclosed in a housing 825. The main drive shaft 175 is driven from the reduction gearing enclosed in the housing 825, and projects out of the housing in opposite directions longitudinally of the machine, as illustrated in Figures 1, 3B, 5A, 5B, 6A and 6B.

At one end the shaft 175 carries the crank 176, Figures 6A and 14, which produces the intermittent drive for the insertion transporting chain 262, and the envelope transporting chain 410, as hereinbefore described. The crank 176 also provides the drive for the oscillating shaft 163 which carries the grippers 121 at the several insertion stations 102, 103, 104 and 105, and insert actuating arm 610 at the inserting station 108. The sprocket 372, which drives the envelope cam shaft 375 through the sprocket chain 373, Figures 6A and 14, is disposed at the same end of the shaft 175 with the crank 176. The end of the shaft 175, which projects from the opposite end of the housing 825, Figure 6B, carries the sprocket 189 which, through the chain 192, drives the respective upper and lower back cam shafts 190 and 191 of the insertion side of the machine. See Figure 7. The drive mechanism described operates the various mechanisms of the machine synchronized in timed relationship with each other.

Backlash control

Mechanism, indicated generally at 826, is provided to take up backlash between the main drive shaft 175, and the various mechanisms driven thereby, the backlash control mechanism being located on the cross shaft 418, which drives the envelope transporting chain 410, and which is driven from the cross drive shaft 286, which also drives the insertion transporting chain 262.

As illustrated in Figures 3A, 6A and 38, and in detail in Figure 41, the backlash control mechanism 826 comprises the leading and trailing abutment arms 827 and 828, respectively, keyed to the shaft 418. The arm 827 provides an abutment face 829 on its trailing surface with reference to its direction of travel, which is the counterclockwise direction in Figure 3A and the clockwise direction in Figure 41. The arm 828 has an abutment face 830 on its leading surface with reference to its direction of travel.

The bearing bracket 831, fixed to the movable bed plate 112, carries the pivot pin 832 on which the levers 833 and 834 pivot freely. The lever 833 is the trailing stop lever and it projects upwardly and terminates with the lateral face 835 disposed to snap into position behind the abutment surface 829 of the trailing abutment arm 827. The lever 834 is a leading stop lever which also projects upwardly and terminates in an abutment face 836 disposed in the path of the abutment surface 830 of the leading abutment arm 828.

The cam follower lever 837 is pivoted at 838 in the bearing bracket 839 fixed to the movable bed plate 112 near the rearward edge thereof. The cam follower lever 837 projects forwardly below the cam 840 fixed to the main cam shaft 375 of the envelope handling mechanism. The guide bracket 841, fixed to the movable bed plate 112, guides the cam follower lever in its vertical movement under action of the cam 840. The forward end of the cam follower lever 837 projects in overriding relationship with the actuating finger 842 which is attached to and projects from the leading abutment lever 828.

The cam 840 is timed to actuate the cam follower lever 837, and through it to actuate the leading abutment levers 828 by deflecting the finger 842. This operates to move the abutment face 836 of lever 834 out of abutting relationship with the abutment surface 830 of the arm 828, moving out of the path of the arm to permit the shaft 418 to rotate. This takes place once during each cycle of the machine, and it takes place precisely at the moment before the envelope transporting chain 410 begins one of its intermittent movements. The shaft 418 is now free to rotate, and to move the abutment surface 829 out of engagement with surface 835 of the lever 833. The lever 833 is now permitted to fall. The support arm 844, projecting laterally from the bearing bracket 419, carries the stop screw 844' adjustable to position its end to limit the distance that the lever 833 can fall. The tension spring 845 urges the lever 833 into engagement with the stop screw 844'.

After the shaft 418 has rotated sufficiently, for the arm 828 to pass beyond reach of the lever 834, the cam 840 permits the cam follower lever 837 to move upwardly, under the weight of the leading stop levers 834, which tends to move toward the shaft 418. The upper ledge 843 of the guide bracket 841 limits the movement of the lever 834 toward the shaft 418 and holds it suspended in the path of the abutment arm 828 as it completes a revolution with the shaft 418. The shaft 418 makes one complete revolution for each cycle of the machine and upon completion of each revolution the abutment surface 830 of the arm 828 engages the abutment face 836 of the stop lever 834, whereas the abutment face 835 of the stop lever 833 falls behind the abutment surface 829 of the trailing abutment arm 827.

By means of the described backlash takeup mechanism, the shaft 418, including all the mechanism in the chain of mechanism which drives the shaft, in addition to collateral mechanism driven from this chain of mechanism, is stopped precisely at a predetermined point in their several positions at the completion of any given cycle. The parts are held in this position until their intermittent movement is resumed. Each set of jaws 432 of the envelope transporting chain 410 stops precisely in position to cooperate with mechanism at the various stations. At the feed station a set of jaws 432 is precisely in position to receive an envelope from the feed roller 371. At the inserting station a set of jaws is precisely in position to position the envelope to be actuated by the follower fingers 533. Likewise, at the deposit station at 109 a set of jaws is precisely positioned to enable the follower finger 778 to actuate an envelope. In a like manner the pins 295 of the insertion transporting chain 262 are precisely placed for the chain to receive insertions from each of the supply stations 102, 103, 104 and 105.

Electric circuit

The main motor 820 and the vacuum pump motor 848, Figure 42, receive their power from the line 846. See also Figure 1. Closing of the switch 847 gives power to the vacuum pump drive motor 848, which operates continuously, even though the main drive motor 820 is not in operation. The vacuum power motor 848, it will be noted, is connected directly across the line, whereas the circuit of the main drive motor 820 passes through the relay switch 849. The line switch 847 closes the circuit of the primary winding 850 of the transformer 851. The secondary winding 852 of the transformer is in circuit with the starting switch 853, the handle 854 of which projects upwardly through the envelope transporting table, as seen in Figures 2, 3B and 7.

When the starting switch 853 is operated it closes the circuit of the relay coil 855 to actuate the armature 856. Movement of the armature 856 closes the main motor line circuit through the relay switch 849. Movement of the armature 856 a..so closes the switch 857, to close the holding circuit shunted across the starting switch 853, the push button of the starting switch 853 being spring actuated to open the circuit therethrough immediately upon release of the handle 854. The relay switch 849 thus maintains an active line circuit for motor 820, and the switch 857 maintains a holding circuit through the secondary winding 852 of the transformer 851, which circuit is through the relay coil 855.

The circuit through the secondary winding 852 of the transformer 851 includes a number of additional switches in series. There is a switch 858 for each insertion supply station 102, 103, 104 and 105, operated to open when a plunger 241 engages and actuates its incident push button 242, Figures 7 and 8, due to the improper selection of an insertion at the corresponding station. The opening of any one of the switches 858 opens the circuit of the secondary winding 852 to deenergize the relay coil 855 and permit the armature 856 to actuate to open the motor circuit switch 849, and also to open the holding circuit switch 857. At the same time that any switch 858 is opened, a corresponding light switch 859, comprising the switch 252 in Figure 13, at that insertion station is closed to close the circuit through the auxiliary secondary winding 860 of the transformer 851 to light the electric light 255 of the incident insertion supply station. The light 255 provides a signal to notify which insertion supply station 102, 103, 104 or 105, requires attention. Upon the correction of the defect at the incident supply station the machine is again set in operation by actuation of the handle 854 to close the starting switch 853, and energize the coil 855 which closes the relay switches 849 and 857 to close the circuit to the motor 820, and the holding circuit.

In circuit with the secondary winding 852 is the additional stop switch 861 operated when the plunger 321, Figure 15, engages and actuates the push button 322 due to a bunching of the insertions as they pass into the inserting station at 108, or a similar bunching of the insert as it is projected into the envelope in the inserting operation. Operation of the switch 861 takes place responsive to actuation of either the detector finger 317 or the detector finger 634, both mounted on the same lever 318. Opening of the switch 861 opens the circuit of the secondary winding 852 to de-energize the relay coil 855 to open the circuit of the motor 820 and simultaneously to open the holding circuit switch 857. Adjustment of the defective transportation of insertion to the platen 296, or defective inserting into the envelope, closes the switch 861, and the circuit through the secondary winding 852 of the transformer 851. This circuit is again completed by actuation of the handle 854 to close the starting switch 853 which energizes the coil 855, to close the switches 849 and 857, which closes the line circuit of the motor 820, and also closes the holding circuit.

A stop switch 862, in the circuit of the secondary winding 852, operates electrically in the same manner as switch 861, to stop the machine whenever the machine fails to feed an envelope in proper sequence, or fails to open the flap of an envelope to enable it to receive an insert. This switch is operated by the finger 921 at the flap opening station. When the improper envelope feed is corrected, the switch 862 is closed to set the circuit in the same manner as switch 861, for the machine to start by operation of the starting switch handle 854.

There is the additional manually operable switch 863 in circuit with the secondary winding 852 operated by manipulation of the handle 864. The handle 864 comprises a bar, Figures 1, 2, 3B, 6A, 6B, 7 and 15, which extends along the front of the machine within easy reach of the operator. The handle 864 is attached to the set of levers 865 fixed to the rock shaft 866. Also fixedly attached to the rock shaft 866 is the lever arm 867 with the abutment finger 868 in position to engage the push button 869, projecting from the switch box 870, which houses switch 863. The push button 869 is spring actuated to close the switch 863 upon release of the handle 864, and to maintain the switch open only when the handle is depressed. Operation of the switch 863 to open the circuit through the secondary winding 852 functions to de-energize the coil 855 to permit the armature 856 to fall, and to open the circuit in the motor 820, and to open the holding circuit switch 857.

The switch box 870 also houses the starting switch 853. The push button 871 of the starting switch 853 is spring pressed outwardly to open the switch. The handle 854 comprises a lever loosely pivoted on the rock shaft 866, Figure 7, one arm projecting upwardly through the envelope carrier table 338. The other arm projects downwardly and provides the abutment finger 872 in position to actuate the button 871 to close the switch, the switch opening immediately upon release of the handle 854 incident to the spring actuation of the push button.

The coil 855, as also the motor energizing relay switch 849, and the holding circuit switch 857, are enclosed in the housing 873 at the right of the machine, Figure 1. Alongside the housing 873 is the housing 874 containing the line switch 847.

*The brake*

Supported on the table 821, beside the main motor 820, is the brake mechanism indicated generally in Figures 1, 3B and 6B, by reference number 876. It comprises the upwardly directed left and right brake shoe carrying arms 877 and 878, respectively, operated by the vacuum operated actuator 879, connected by vacuum line 880 to the valve 881. The valve 881 is connected through the line 882 with the vacuum tank 883, Figure 1, and includes an additional passage for atmospheric pressure connected with the actuator 879 through line 884. When the relay coil 855 is energized, in a manner as hereinbefore described in detail, to actuate the armature 856 to close the motor energizing switch 849, and to close the holding circuit switch 857, the movable element 885 of the valve 881, which movable element is attached to the armature 856 to move therewith, operates to open the air line 884 to the actuator 879 and shut off the vacuum line 880. See Figures 43 and 44. This operation applies the brake in a manner to be hereinafter described. Thus, whenever the machine stops, the brake is applied, and is automatically released when the motor 820 starts to drive the machine.

The brake 876 comprises the brake drum 886, keyed to the shaft 887 of the motor 820. Oppositely disposed brake shoes 888 and 889 are mounted to pivot on the respective levers 877 and 878, Figure 42, intermediate of their lengths. The lever 877 pivots on the clevis 891 fixed to the base plate 890. The lever 878 pivots on a similar clevis 892, also fixed to the base plate 890. The levers 877 and 878 are connected at their ends by the rod 893 pivoted at 894 to the lever 878, and held in engagement with the lever 877 by the arcuate shoe 895 seated in the notch 896 in the end of the lever 877. The shoe 895 provides the abutment 897 as a seat for the compression spring 898. The opposite end of the spring 898 opposes the abutment member 899. The spring 898 and the abutment members 897 and 899 surround the stem 935 of the connecting rod 893, which projects through the arcuate shoe 895, as shown, the parts being held in position by the winged nut 936 operative to adjust the tension of the spring 898. The spring 898 operates to draw the ends of the levers 877 and 878 toward each other to actuate the brake shoes 888 and 889 into holding engagement with the drum 886.

Because the respective levers 877 and 878 are freely pivoted in the clevises 891 and 892, and the shoes 888 and 889 are freely pivoted on the respective levers, it follows that the brake is self-equalizing. A nut and set screw construction 937 on the lever 877 is adjustable to limit the fall of the left brake shoe 860 out of line with the center of the brake drum 886. Similar nut and set screw construction 938 on the lever 878 provides similar limiting adjustment for the right brake shoe 889. Attached to the lever 877 is the clevis 939. Pivoted to the connecting rod 893 is the set of push rods 940. Between the clevis 939 and the push rods 940, and pivotally attached to each at its opposite ends, is the connecting toggle link 941, which carries the actuating arm 942 rigidly attached thereto. The actuating arm 942 extends to a point above the brake actuator 879, which also rests on the platen 890.

The actuating rod is pivotally connected at its end with the lengthwise adjustable connecting link 943 which is linked to the stem 944 of the piston 945. The piston reciprocates in the cylinder 946 under pressure differential in the upper and lower chambers 947 and 948, respectively, above and below the piston 945. The chamber 947 is under atmospheric pressure because of the constantly open air passage 949. The lower chamber 948 is selectively under atmospheric pressure or vacuum responsive to the action of the valve 881.

Projecting upwardly from the brake supporting platen 890, and toward the right, is the stop carrying bracket 950, with the arm 951 at its end disposed laterally across the plane in which the lever 878 moves. Threaded in the arm 951 is the set screw 952, which carries the lock nut 953 to lock it in position of adjustment. The set screw 952 projects toward the right lever 878, the end of the screw being positioned to abut the back of the lever 878 when the lever is actuated to withdraw the shoe 889 from contact with the brake drum 886.

While the machine is in operation, and the relay coil 855 is energized to close the motor circuit switch 849, and the holding circuit switch 851, the valve stem 885 is positioned connecting the vacuum line 882 to the tank 883 with the vacuum line 880 from the valve 881 to the cylinder chamber 948. Atmospheric pressure in the upper chamber 947 now holds the piston 945 down, and the brake 876 is released.

When the relay coil 855 becomes de-energized by any of the stop switches 858, 861, 862 or 863 becoming opened, in the manner hereinbefore explained, to open the motor energizing switch 849 and stop the motor 820, the vacuum valve stem 885 moves to close the fluid connection between vacuum lines 880 and 882, and to open the line 884 to the atmosphere. Pressures in the upper and lower chambers 947 and 948, against the opposite faces of the piston 945, are now equal and opposite. The compression spring 898 now operates to draw levers 877 and 878 toward each other to press the brake shoes 888 and 889 into engagement with the brake drum 886 on opposite sides thereof. This stops rotation of the motor shaft 887 instantly, the action being transmitted through the belt 824, the reduction gearing housed at 825, and the main drive shaft 175 to stop all elements of the machine immediately.

As the starting switch 953 is manually actuated to energize the relay coil 855, to close the motor energizing switch 849, the vacuum valve stem 885 is actuated with the armature 856 to close the atmospheric line 884, and open the vacuum line through 880 and 882 to the cylinder chamber 948. The piston 945 is accordingly actuated downwardly to pull the actuating arm 942 downwardly against the pressure of compression spring 898. The toggle link 941, pivoting on the clevis 939, actuates the push rod 940 to move the connecting rod 893 to the right against the compression of spring 898. Responsive to this action the lever 878 is moved to the right to withdraw the brake shoe 889 from engagement with the drum 886. The lever 878 moves to the right until it engages the abutment end of the set screw 952 whereupon continued movement of the piston 945 downwardly causes the toggle link 941 to push the clevis 939 to the left, and to move the lever 877 to the left against compression of the spring 898 to release the brake shoe 888 from engagement with the drum 886. Release of both brake shoes 889 and 888 is virtually instantaneous, taking place in the time required for the piston 945 to move down under vacuum applied to the chamber 948.

Vacuum mechanism

The vacuum drive motor 848, unlike the main motor 820, is in direct circuit with the power line 846. It operates upon closing of the line switch 847, and continues to operate while the line switch 846 is closed, even though the relay switch 849 is opened to stop the main motor 820. The motor 848 rests on the lower table 955, Figures 1 and 43, and drives vacuum pump 956 through the belt 957. The pump 956 operates to maintain a vacuum in the tank 883 through line 958, with the check valve 959 in line to prevent loss of vacuum through the pump. The muffler 960 is connected to the vacuum pump 956 to reduce noise to a minimum. The line 961, from the vacuum tank 883, connects through the line 882 with the brake operating valve 881, and with the several cam actuated valves 153, 363 and 574.

Valve 153 connects with the several sets of vacuum cups 137 through line 154, the manifold 151, and the several lines 152. There is a set of vacuum cups 137 for each insertion supply station 102, 103, 104 and 105, and each line 152 is provided with a pet cock 156 to render its station inoperative.

Valve 363 connects with the set of vacuum cups 350 at the envelope supply station at 101, through line 362.

Valve 575 connects with the upper and lower sets of vacuum cups 556 and 557, respectively.

through the line 573, the respective branching lines 571 and 572, and the respective upper and lower manifolds 558 and 562.

Each line 154, 362 and 573 is provided with a filter 962, to catch dust and the like, and prevent foreign matter from passing into the vacuum tank 883, and the pump 956.

MACHINE ADJUSTMENT

The machine is constructed for ready adjustment in conformity with envelopes of different sizes and the mechanism for making this adjustment will now be described.

As hereinbefore explained, the main bed plate 110, which carries the insertion transporting mechanism, and the inserting mechanism, rests on the legs 111 of the machine. The envelope handling mechanism, comprising the envelope supply table 330, the envelope transporting table 338, the envelope transporting chain 410, and the envelope deposit station 109, all carried by the movable bed plate 112 which rests on the bracket 965 at the right of the machine in Figures 3B and 4, and the bracket 966, Figures 3A and 32 at the left. The bracer rod 967, Figures 1, 3A and 3B, connects the brackets 965 and 966 and holds them steadily in spaced relationship. The movable bed plate 112 is mounted to slide on the brackets 965 and 966 longitudinally of the machine, parallel to the fixed bed plate 110, being guided in its movement by the pin 968 through bracket 966 and through the slot 969 in the bed plate 112. See Figures 6A and 32. The pin 968 holds the movable bed plate 112 tightly in position on the brackets 965 and 966 and is manually operable by means of the handle 970 to release the bed plate 112 to permit its movement parallel to the fixed bed plate 110.

Attached to the bottom surface of the movable bed plate 112 at the right end thereof, Figures 3B and 4, is the bearing 971. The hand screw 972 rotates in the bearing 971 and is threaded in the fixed nut 973 attached to the right bracket 965. Collars 974 and 975, respectively to the right and left in Figure 3B, hold the bearing 971 in fixed position relative to the screw 972 longitudinally thereof. The handle 976 enables the screw 972 to be manually rotated in the nut 973 in the clockwise direction in Figure 4 to slide the movable table on the brackets 965 and 966 to the left in Figures 3A and 3B, and in the counterclockwise direction in Figure 4, to slide the bed plate 112 to the right in Figures 3A and 3B. The screw 972 cooperates with the slot 969 to guide the movable bed plate 112 in its movement parallel with the fixed bed plate 110.

The set screw 977 is threaded laterally into the nut 973 and is provided with the handle 978 similar to the handle 970, the set screw 977 operating to hold the screw in fixed position in the nut 973. Thus, the handles 978 and 970 can be operated to hold the bed plate 112 in fixed position of adjustment relative to the fixed bed plate 110 parallel thereto.

When it is desired to adjust the machine to accommodate envelopes of different sizes, the handles 970 and 978 are manipulated to release the movable bed plate 112 to permit it to slide on the brackets 965 and 966. The insertion stop rail 297 at the inserting station 108, Figure 20, is thereupon adjusted toward or away from the forwardly directed leg 507 according to the size of the new envelope to be accommodated by the machine, which adjustment obviously conforms with the size of the inserts to be projected into the envelope. The handle 976 is thereupon rotated to shift the movable bed plate 112, guided by the pin 968 and the hand screw 972, until the envelope stop member 511 is positioned in line with the insertion stop rail 297. As the envelope carrier bed plate 112 is moved in this manner the envelope handling cam shaft 375 will slide in the bearing 377 and the sprocket 374, and the bevel gear 412 will slide longitudinally of the envelope transporting drive shaft 413, Figure 3B, to maintain drive of the envelope transporting mechanism and envelope cam controlled mechanism by the main drive shaft 175.

To complete the adjustment, the trailing partition 339 is moved toward or away from the leading partition 333 to adjust the envelope supply station to accommodate the new size envelope. Likewise the trailing end partition 807 at the envelope deposit station is moved toward or away from the leading end partition 806. The actuator follower fingers 533 and 778, at the inserting and deposit stations, respectively, are adjusted in accordance with the envelope size, and a corresponding adjustment at each point is made on the thrust shaft 534. The side partitions 336 and 337 at the envelope supply station, and also the border rail 768 at the envelope deposit station, are adjusted in accordance with any variation in the width of the envelope. Similarly the guide rail 466 on the envelope transporting table 338 is adjusted in accordance with any change in envelope width. The end partitions 124 at each of the insertion supply stations 102, 103, 104 and 105 are adjusted toward and away from each other in accordance with the new length of insertion material at any supply station. The back partitions 125 are adjusted toward or away from the forward partition 123 at each insertion supply station in accordance with the width of insertion material at that particular station. A corresponding adjustment is made of the forward insertion guide rail 261 toward or away from the guide rail 260 to vary the channel between the rails in accordance with variation in width of insertion material. All adjustments being made, as hereinbefore explained, the handles 970 and 978 are tightened to hold the movable bed plate 112 fixed relative to the fixed bed plate 110.

It will be noted that the first adjustment made is the insert stop rail 297, Figure 22, at the inserting station at 108, which adjustment is made toward or away from the lateral end 507 of the forward insertion transportation guide rail 261. The pivots of the envelope fold engaging fingers 591 and 590 are respectively mounted on the elements 297 and 507, Figure 20. Accordingly, the first adjustment is made accurately according to the length of the envelope. Other adjustments are made dependent upon this first adjustment.

OPERATION

The operation of the machine is fully automatic.

Envelopes are placed at the envelope supply station at 101, Figures 1, 2 and 3B, with the face panel resting on the table 330, the flaps directed upwardly, and the flap edge toward the rear on the table 330, the envelopes being stacked within the upright partitions 333, 334, 335, 336, 337 and 339. A supply of insertion material is placed at each insertion supply station 102, 103, 104 or 105 to be operated, the insertions being stacked on the table 122 within the partitions 123, 124 and 125. Each supply station receives a different piece of insertion material, the number of insertion supply stations being placed into operation depending upon how many different pieces of insertion material are to be placed in each envelope. Any insertion supply station not in operation receives no supply. The vacuum control pet cock 156 of that station is closed and the hook 250 is positioned to engage the pin 249 to hold the knife edge carrying arm 240 against oscillating with the shaft 224.

The line switch 847, Figure 1, is operated to close the line circuit. This sets the vacuum pump drive motor 848 in operation which builds up and maintains a vacuum in the tank 883. The handle 854 is now manipulated to close the starting switch 853 which starts the motor 820. The machine now operates through successive cycles, the insertion transporting chain gathering successive insertions at each of the insertion supply stations, 102, 103, 104 and 105 and transporting them to the platen 296. Simultaneously envelopes are removed from the table 330 and transported by the chain 410 to the inserting station, where they are opened and successive inserts projected into them from the platen 296. From the inserting station at 108 the envelopes are transported to the deposit station at 109, their flaps being closed, and a stamp affixed to each, while in transit to the platen 767 at the deposit station. The platen 767 projects successive envelopes up into the deposit stack.

The hereinbefore disclosure is of a machine comprising one practical and preferred embodiment of the invention. Obviously the structure shown and described in detail may be varied and modified without departing from the spirit of the invention, the scope of which is not to be measured by the machine as disclosed, but by the accompanying claims.

What I claim is:

1. In an envelope handling machine, means to transport inserts successively to a position in a predetermined plane to be inserted into successive envelopes, means to transport envelopes successively to a position adjacent to the inserts and disposed to receive them, means operable in said predetermined plane to engage the end folds on the inside of said envelope and to hold them in said plane, and means on opposite sides of said plane and movable oppositely therefrom to engage the opposite panels of the envelope and draw them apart whereby the opening of said envelope is disposed on opposite sides of said plane.

2. In an envelope handling machine, means to transport inserts successively to a position in a predetermined plane to be inserted into successive envelopes, means to transport envelopes successively to a position adjacent to the inserts and disposed to receive them, mechanical means to engage the end folds of each envelope and hold said folds in said predetermined plane, pneumatic means to engage the opposite panels of the envelope and draw them apart to open the envelope, the fold engaging means positioning the envelope opening in the plane of the insert, and the panel engaging means holding the respective panels on opposite sides of the plane of the insert.

3. In an envelope handling machine, means to transport inserts successively to a position in a predetermined plane to be inserted into successive envelopes, means to transport envelopes successively into a position adjacent to the inserts and disposed to receive them, means to engage the opposite panels of each envelope to draw them apart to open the envelope, means operating in said predetermined plane entering the envelope to engage the inside of the end folds to hold them spread apart, the fold engaging means positioning the envelope opening in the plane of the insert, and the panel engaging means holding the respective panels on opposite sides of the plane of the insert.

4. In an envelope handling machine, means to transport inserts successively to a position in a predetermined plane to be inserted into successive envelopes, means to transport envelopes successively to a position adjacent to the inserts and disposed to receive them, means for holding the end folds of the envelope in said predetermined plane, means to engage the flap of each envelope and hold it out of the plane of the insert, means to engage the panel on the flap side and the opposite panel of the envelope and draw them apart, and to hold the panels out of and respectively on opposite sides of the plane of the insert.

5. In an envelope stuffing machine, means forming an inserting station comprising a fixed insert platen having a planiform insert supporting top to which inserts are successively supplied, and an envelope platen to which envelopes are successively supplied, juxtaposed thereto, having its envelope supporting surface depressed below the plane of the top of said insert platen, upper and lower suckers movable to and from a common plane parallel to the top of said insert platen and substantially at the same level, the lower suckers operating through an opening in the envelope platen on opposite sides of an envelope positioned above said envelope platen whereby the opposite panels of said envelope are pulled apart by said suckers on opposite sides of the plane of the top of the insert platen, fingers synchronized with said suckers movable arcuately in the plane of the top of said insert platen into said envelope when opened by said suckers, into engagement with the inner end folds of said envelope for holding said envelopes spread with the end folds in the plane of the top of said insert platen, the top of said insert platen having grooves extending from front to back, pushers synchronized with said suckers movable forwardly in said grooves toward the open mouth of said envelope, and rearwardly above the top of said insert platen whereby they push the insert into the envelope on the forward stroke but are out of the way of the next insert deposited upon said platen while said pushers are executing their rearward stroke.

6. In an envelope stuffing machine, means forming an inserting station comprising a fixed insert platen having a planiform insert supporting top to which inserts are successively supplied, and an envelope platen to which envelopes are successively supplied with the panel having the closing flap in the down position the closure flap being open, said envelope platen being juxtaposed with respect to said insert platen, having its envelope supporting surface depressed below the plane of the top of said insert platen, upper and lower suckers movable to and from a common plane parallel to the top of said insert platen and substantially at the same level, the lower suckers operating through an opening in said envelope platen on opposite sides of an envelope positioned above said envelope platen, whereby the opposite panels of said envelope are pulled apart by said suckers on opposite sides of the plane of the top of the insert platen, the lower suckers being positioned to engage said envelope in a region closer to said insert platen than said upper suckers, fingers synchronized with said suckers movable arcuately in the plane of the top of said insert platen into said envelopes when opened by said suckers, into engagement with the inner end folds of said envelope for holding said envelopes spread with the end folds in the plane of the top of said insert platen, the top of said insert platen having grooves extending from front to back, pushers synchronized with said suckers movable forwardly in said grooves toward the open mouth of said envelope, and rearwardly above the top of said insert platen whereby they push the insert into the envelope on the forward stroke but are out of the way of the next insert deposited upon said platen while said pushers are executing their rearward stroke.

7. Envelope stuffing machine comprising an envelope handling unit and an insert handling unit, the former including an envelope magazine, means at an inserting station, and a conveyor for receiving envelopes successively supplied to it from said envelope magazine, said envelope conveyor comprising a series of grippers for seizing the leading ends of successive envelopes and bringing them successively to said inserting station, means at said inserting station engageable with said grippers to release the envelopes at said inserting station, aligned with reference to the leading end regardless of the length of the envelope, the insert handling unit including an insert magazine and a conveyor parallel to the envelope conveyor for receiving inserts successively supplied to it from said insert magazine, said insert conveyor comprising a series of pushers for pushing the trailing ends of successive inserts and bringing them successively to said inserting station in confronting relation to said envelope, aligned with respect to the trailing ends, common intermittent driving means for moving said grippers and said conveyor toward said inserting station, and stopping said grippers and pushers at said inserting station, back lash inhibiting means for said driving means effecting precise stopping of said grippers and pushers at said inserting station, and means for adjustably shifting said envelope handling unit relative to said insert handling unit to bring said inserts into length registry with said envelopes according to the length of said inserts.

8. In an envelope stuffing machine, means constituting an inserting station at which successive inserts and the open mouths of successive envelopes are brought into confronting registering positions, an insert magazine, a conveyor in operative proximity to said insert magazine for receiving inserts and transporting inserts successively withdrawn from said magazine to said inserting station, said magazine having an opening in its lower portion adjacent said conveyor exposing the lower face of the lowermost of a stack of inserts, a gripper arm with normally open jaws mounted to oscillate over said conveyor toward a gripping point adjacent said magazine, suckers synchronously driven with said gripper arm engageable with the exposed face of the bottom insert and movable to draw the leading edge of said insert into the jaws of said gripper arm at said gripping point, means for closing said jaws on said insert at said gripping point, a micrometer switch operating device comprising two cooperating rollers between said magazine and gripping point between which rollers an envelope must pass when moved by a gripper, a switch closing member carrying one of said rollers and responsive to excessive movement or lack of movement of said roller for closing a machine stopping circuit, said switch closing member being positioned to be engaged by said gripper arm upon the approach of said jaws to said magazine, for holding it away from circuit closing position and holding said rollers separated whereby they will not engage the leading edge of the insert while being withdrawn by said gripper arm.

9. In an envelope stuffing machine, juxtaposed insert and envelope platens at an inserting station, insert and envelope conveyors for bringing inserts and envelopes respectively and in step by step succession to said platens, said insert conveyor comprising pusher elements engaging the inserts for pushing them toward the insert platen, inserting pushers for pushing inserts into envelopes at said inserting station, and a detector stop at said inserting station for detecting bunching up of the inserts, both longitudinally and transversely through misadventure in the respective conveying and inserting operations, comprising a lever pivotally mounted intermediate its ends having one end overlying said insert platen, with resilient fingers, one extending downwardly in the direction of longitudinal movement of said inserts, and with its free end in close proximity to the insert platen, the other extending downwardly in the direction of transverse movement of said inserts, with its free end in close proximity to the insert platen adjacent the point where said inserts approach the mouth of the envelope, means at the opposite end of said lever for adjusting the balance of said lever to determine the sensitivity of movements of said lever responsive to undue thickness of the inserts, either longitudinal or lateral, due to bunching, and means engaged by said lever responsive to undue tilt of said lever for operating a switch for stopping the machines.

10. In an envelope stuffing machine, an envelope conveyor, a supply station at one end and an inserting station at an intermediate point in the travel of said conveyor, said conveyor including a chain having upstanding grippers at intervals, the jaws of which grippers face in the direction of said supply station, a platen at said inserting station having a slot to pass said grippers, the latter projecting above said platen, means at the supply station for shooting an envelope between the open jaws of a gripper, means for closing the jaws on the leading edge of said envelope, means for causing the conveyor to come to a stop with the gripper at a precise point relative to said platen, means for opening the jaws at said point while still retaining the envelope between said jaws, a stop synchronized with said jaw opening means, contacting said platen on opposite sides of said gripper in a precise transverse position ahead of said envelope for determining the longitudinal position of said envelope on said platen, means for pushing said envelope while within said jaws into contact with said stop, means synchronized with the envelope positioning mechanism for pushing an insert into said envelope, and means for closing said jaws upon the aligned stuffed envelope prior to the movement of said gripper beyond said inserting station.

11. In an envelope stuffing machine, a conveyor extending from a supply stack through an inserting station, including a gripper, a selector for deflecting the lowermost envelope from said supply stack, means for withdrawing the selected and deflected envelope and feeding it to said gripper, means for closing said gripper on said envelope, a flap opening vane at an intermediate point in the path of travel of said envelope from said supply stack to said inserting station, and a machine stopping detector finger projectable through a hole in said flap opening vane into operative relation to a switch actuating device which controls the operation of said machine, means for reciprocating said finger in synchronism with the normal presence of a flap between said vane and switch actuating device, the intervention of a flap preventing contact of said finger with said switch actuating device, the absence of a flap due to failure of said selector, feeding means, or gripper to handle an envelope, or said vane to open the flap, permitting said finger to operatively engage said switch actuating device.

12. In an envelope stuffing machine, a conveyor for transporting an envelope step by step from a supply station past an insert station, at which it is stuffed, to a deposit station, said conveyor having a gripper engageable with the leading edge of the envelope for transporting it, a vertically reciprocable deposit platen at said deposit station, a stuffed envelope magazine overlying said deposit platen having a check valve in the form of upwardly opening flutter vanes opening through contact of an envelope therewith, pushed upwardly beyond said vanes by said platen, and supporting the stack clear of said platen when the latter is in normal receded position, means for releasing said gripper from said envelope and depressing said gripper below the plane of said envelope at a point anterior to said deposit platen, and a pusher engaging the trailing edge of said envelope for pushing said envelope upon said platen.

13. In an envelope stuffing machine, as claimed in claim 12, said platen having a peripheral notch normally overlain by an envelope on said platen, counter mechanism having a finger overlying said platen in vertical registry with said notch, engaged by said envelope on the upward movement of said platen for making a count, but passing freely through said notch upon descent of the empty platen.

14. In an envelope stuffing machine, a continuously rotating drive shaft, a train of gearing connected shafting driven from said drive shaft through the intermediary of means for converting the continuous motion of said drive shaft into step by step motion of said train of shafting, an insert conveyor chain and an envelope conveyor chain driven step by step from different members of said train of shafting, each having conveyor elements requiring precise positions of stoppage for the proper functioning of said machine, and overrun and backlash preventing mechanism for securing precise stopping positions for said elements, comprising a trailing abutment arm and a leading abutment arm fixed to one member of said train of shafting, pivoted trailing and leading stop levers arranged to fall simultaneously and precisely upon opposite sides of the respective arms between successive steps of movement, and means operable between successive steps of movement to lift the leading stop lever to release said leading stop arm, permitting resumption of the step by step movement of said chain and train of shafting.

ALBERT H. WILLIAMS.